United States Patent
Katz

(10) Patent No.: US 6,335,965 B1
(45) Date of Patent: *Jan. 1, 2002

(54) VOICE-DATA TELEPHONIC INTERFACE CONTROL SYSTEM

(75) Inventor: Ronald A. Katz, Los Angeles, CA (US)

(73) Assignee: Ronald A. Katz Technology Licensing, L.P., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/306,456

(22) Filed: Sep. 14, 1994

Related U.S. Application Data

(63) Continuation of application No. 08/058,452, filed on May 7, 1993, now Pat. No. 5,359,645, which is a continuation of application No. 07/680,879, filed on May 5, 1991, now Pat. No. 5,224,153, which is a continuation-in-part of application No. 07/481,403, filed on Feb. 20, 1990, now Pat. No. 5,014,298, and a continuation-in-part of application No. 07/335,923, filed on Apr. 10, 1989, which is a continuation-in-part of application No. 07/312,792, filed on Feb. 21, 1989, now Pat. No. 5,073,929, which is a continuation of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, said application No. 08/058,452, is a continuation-in-part of application No.07/194,258, which is a continuation-in-part of application No. 07/018,244, which is a continuation-in-part of application No. 06/753,299.

(51) Int. Cl.$^7$ .............................................. H04M 11/00

(52) U.S. Cl. ............................... 379/93.12; 379/88.16; 379/88.21; 379/265

(58) Field of Search .............................. 379/92, 97, 93, 379/88, 67, 142, 95, 93.12, 91.01, 91.02, 92.01, 92.03, 93.02, 93.03, 93.17, 93.23, 93.25, 88.01, 88.18, 88.2, 88.25

(56) References Cited

U.S. PATENT DOCUMENTS

| | | |
|---|---|---|
| 3,727,186 A | 4/1973 | Stephenson |
| 4,599,493 A | 7/1986 | Cave |
| 4,769,834 A | 9/1988 | Billinger et al. |
| 4,829,563 A | 5/1989 | Crockett et al. |
| 4,881,261 A | 11/1989 | Oliphant et al. |
| 4,899,375 A | 2/1990 | Bauer et al. |
| 4,942,598 A | 7/1990 | Davis |

OTHER PUBLICATIONS

Bell Labs News, vol. 21, No. 40, Oct. 5, 1981 (A21710762).
Bell Labs News, vol. 25, No. 36, Sep. 30, 1985 (A21724662).
Bell Labs News, vol. 26, No. 31, Aug. 18, 1986 (A21706398).
Bell Labs News, vol. 27, No. 33, Aug. 17, 1989 (A21710741).
Bell of Pennsylvania Press Release, Mar. 13, 1984 (A21725876).
Dorros, Irwin et al., "Reaching into the Future with Stored Program Control," Bell Laboratories Record, Dec. 1980, pp. 387–393 (A21710507).

(List continued on next page.)

Primary Examiner—Stella Woo

(57) ABSTRACT

In an audio-digital telephone interface system, selective operation prompts a caller with oral instructions to provide: digital control signals, digital data signals (numeric) or audio signals. Inbound and outbound operations are involved and inbound callers are qualified as by automatic number identification (ANI) signals and consumable key operation. A data cell is loaded in accordance with an operating program and the resulting data packet is flagged depending on the presence of audio signals. Data packets are returned to storage, as for subsequent addressing to call up, as to process or cue a caller. The illustrative format receives and organizes order data for goods or services or to isolate a subset or a sub-subset, of callers.

82 Claims, 3 Drawing Sheets

OTHER PUBLICATIONS

Voice, News, vol. 4, No. 9, Oct. 1984 (A21708913).
Voice News, vol. 6, No. 7, Jul./Aug. 1986 (A21707730).
Voice News, vol. 7, No. 2, Feb. 1987 (A21707730).
Voice News, vol. 7, No. 3, Mar. 1987 (A21707834).
Voice News, vol. 7, No. 5, May 1987 (A21714110).
Voice News, vol. 7, No. 10, Oct. 1987 (A21724749).
"Network Communications Applications and Services," AT&T Communications Consultant Liaison Program, Issue 1, Jun. 1984.
Basinger, R. G., et al., "Calling Card Service—Overall Description and Operational Characteristics", The Bell System Technical Journal, Sep. 1982.

Confalone, D. E., et al, "Calling Card Service—TSPS Hardware, Software, and Signaling Implementation", The Bell System Technical Journal, Sep. 1982.

Eigen, D.J., et al., "Calling Card Service—Human Factors Studies", The Bell Technical Journal, Sep. 1982.

Lexis Search, Nov. 1, 1984, re: System 85 Computer Process.

Lexis Search, Jan. 28, 1985, re: Rolm Releases Four–Channel Phonemail Voice Message Unit.

ns based on recognizing the need in such systems to accommodate voice signals as to provide recorded audio data, as for subsequent use. Accordingly, the system of the present invention accommodates a caller to identify digital control signals, digital data signals and audio signals, all in an organized format as to accomplish a record for subsequent processing or use.

VOICE-DATA TELEPHONIC INTERFACE CONTROL SYSTEM

This is a continuation of application Ser. No. 08/058,452 filed May 7, 1993 and entitled "Voice-Data Telephonic Interface Control System", issued Oct. 25, 1994 as U.S. Pat. No. 5,359,645, which was a continuation of application Ser. No. 07/680,879, filed May 5, 1991 and entitled "Voice-Data Telephonic Interface Control System", issued Jun. 29, 1993 as U.S. Pat. No. 5,224,153, which is a continuation-in-part of application Ser. No. 07/481,403 filed Feb. 20, 1990 and entitled "Voice-Data Telephonic Control System", issued May 7, 1991 as U.S. Pat. No. 5,014,298 which was a continuation-in-part of application Ser. No. 07/312,792 filed Feb. 21, 1989 and entitled "Voice-Data Telephonic Control System", issued Dec. 17, 1991 as U.S. Pat. No. 5,073,929, which was a continuation-in-part of application Ser. No. 07/194,258 filed May 16, 1988 and entitled "Telephonic-Interface Statistical Analysis System", issued Jul. 4, 1989 as U.S. Pat. No. 4,845,739, which was a continuation-in-part of application Ser. No. 07/018,244 filed Feb. 24, 1987 and entitled "Statistical Analysis System For Use With Public Communication Facility", issued Dec. 20, 1988 as U.S. Pat. No. 4,792,968, which was a continuation-in-part of application Ser. No. 06/753,299 filed Jul. 10, 1985 and entitled "Statistical Analysis System For Use With Public Communication Facility", now abandoned. Also, this application is a continuation-in-part of application Ser. No. 07/335,923 filed Apr. 10, 1989, and entitled "Telephonic-Interface Statistical Analysis System", which is a continuation of application Ser. No. 07/194,258 filed May 16, 1988, and entitled "Telephonic-Interface Statistical Analysis System", now U.S. Pat. No. 4,845,739, which is a continuation-in-part of application Ser. No. 07/018,244 filed Feb. 24, 1987, and entitled "Statistical Analysis System For Use With Public Communication Facility", now U.S. Pat. No. 4,792,968, which is a continuation-in-part of application Ser. No. 06/753,299 filed Jul. 10, 1985, and entitled "Statistical Analysis System For Use With Public Communication Facility", now abandoned. The benefit of the earlier filing dates in the United States is claimed under 35 U.S.C. §120.

BACKGROUND AND SUMMARY OF THE INVENTION

As the use of computer techniques has steadily grown, related telephonic communication techniques also have expanded. In that regard, telephone systems have been developed for effectively transmitting digital data in forms commonly utilized by computer apparatus. At a more personal level, the traditional push buttons of telephone instruments have been utilized to provide digital signals at a remote location for both data and control functions. Consequently, various operations have been performed.

In the typical operation of a telephone instrument as a digital input device, voice messages prompt callers to provide data and control signals by actuating the alphanumeric buttons of a conventional telephone. Detailed forms of such systems have been proposed in association with computers to provide various services, and one such system is disclosed in U.S. Pat. No. 4,792,968 issued Dec. 20, 1988, to Ronald A. Katz from an application Ser. No. 07/018,244 filed Feb. 24, 1987.

Although traditional systems for interfacing an individual person at a telephone terminal with a computer or data processor have been effective, such systems have been somewhat limited in application. In general, the present invention is based on recognizing the need in such systems to accommodate voice signals as to provide recorded audio data, as for subsequent use. Accordingly, the system of the present invention accommodates a caller to identify digital control signals, digital data signals and audio signals, all in an organized format as to accomplish a record for subsequent processing or use.

To consider a specific example, systems have been proposed in the past for interfacing individual telephone terminals with computers, as for sales applications. Individual callers might dial to accomplish a computer interface, then provide ordering data by actuating the telephone terminal buttons to specify goods or services. One such system is disclosed in a co-pending related patent application entitled "Telephone Interface Statistical Analysis System", filed May 16, 1988, and bearing a Ser. No. 07/194,258 (now U.S. Pat. No. 4,845,739) and a related prior application, now U.S. Pat. No. 4,792,968. In the use of such systems, the need is recognized for improved capability regarding audio data.

In general, the present invention comprises a telephone computer interface system accommodating digital and vocal telephonic communication, the system being expanded to accommodate and flag audio data distinct from digital data. In using the disclosed system, either outbound or inbound calling operations attain an interface with a central data processing system. Depending on the course of communication during the interface, various states are implemented for the central system to receive and identify: digital control signals, digital data signals and audio or voice, signals. Somewhat conventional operation may involve automated vocal communications to cue the caller and keypad digital communications from the caller. Generally, data received from the caller is set in memory for subsequent use or processing. The data may be addressed as to cue a remote terminal or to isolate a set or subset. Callers may be qualified by automatic number identification (ANI) signals checked against an assigned consumable key number. Thus, the system accommodates flexible control and data accumulation (including cued audio) to accommodate any of various specific interface applications or formats.

BRIEF DESCRIPTION OF THE DRAWINGS

In the drawings, which constitute a part of this specification, an exemplary embodiment exhibiting various objectives and features hereof is set forth. Specifically.

DESCRIPTION OF THE ILLUSTRATIVE EMBODIMENT

As required, a detailed illustrative embodiment of the present invention is disclosed herein. However, physical communication systems, data formats and operating structures in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
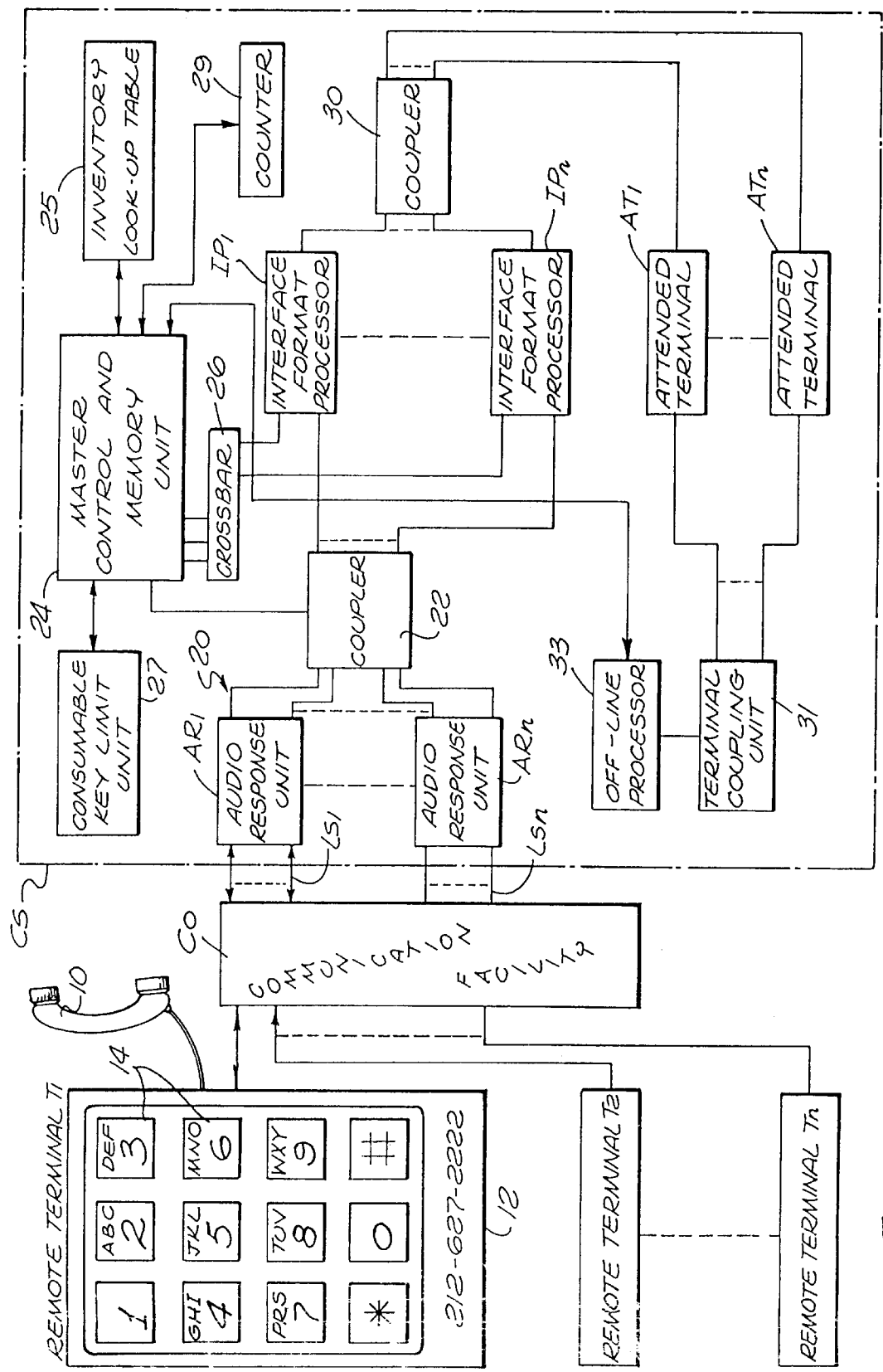
FIG. 1 is a block diagram of a system constructed in accordance with the present invention.

Referring initially to FIG. 1, a series of remote terminals T1–Tn (telephone instruments) are represented (left). The terminals T1–Tn may be similar and accordingly only the terminal T1 is shown in any detail. The indicated terminals T1–Tn represent the multitude of telephone terminals existing in association with a communication facility CO which may comprise a comprehensive public telephone network.

The communication facility CO, accommodating the individual terminals T1–Tn, is coupled to a central processing station CS generally indicated by a dashed-line block. Within the station CS as illustrated, processors are provided to interface the terminals T1–Tn so as to accomplish a desired operating format, and accordingly accumulate data relating to individual callers.

Calls to and from the terminals T1–Tn are individually processed in accordance with a specific format to accomplish a data cell or packet. For example, the objective of a call may be to order an item of merchandise to implement a mail-order operation. Similarly, a service may be specified and ordered. Accordingly, the interface accomplishes data as a cell for processing the order. In other exemplary formats, the system may function for public polls, lotteries, auctions, promotions and games.

At any instant of time, the collective interface involving the communication system CO and the processing station CS may involve several thousand calls. Accordingly, the station CS may take the form of a sizeable computer or mainframe capable of simultaneously controlling smaller units or directly operating to process many calls involving individual interfaces. Although numerous possible configurations are available, for purposes of explanation, the central station CS of the disclosed embodiment includes a control unit functioning with a plurality of audio response units and associated individual processors and attended terminals.

Essentially, the system of the present invention accumulates data from the remote terminals T1–Tn in cells, which data may include audio data and digital data (numerical) flagged or otherwise distinguished for subsequent expedient processing. Accordingly, the system enables a person at a terminal (T1–Tn) to provide data in both audio and digital forms. For audio transmissions, the person utilizes the telephone handpiece (microphone) while for digital communications, the person utilizes the telephone push buttons (keypad).

Considering the exemplary telephone terminal T1 of FIG. 1 in greater detail, a handpiece 10 (microphone and earphone) is shown along with a panel 12 provided with a rectangular array of individual push buttons 14 in a conventional configuration. Of course, the handpiece 10 accommodates analog signals while the panel 12 is a digital apparatus. As disclosed in detail below, a person is informed or cued through the handpiece 10 (earphone) to provide data in accordance with a specific format. In accordance herewith, the person may provide signals utilizing either the buttons 14 or the handpiece 10 (microphone).

In conventional telephone structures, alphabetic and numeric designations are provided on the buttons 14. For example, several of the buttons 14 carry three letters along with a decimal digit. Specifically, the button designated with the numeral "2" also carries the letters "A", "B" and "C". Thus, the buttons 14 encompass: the numerals "0–91", the symbols "*" and "#" and the alphabet except for the letters "Q" and "Z".

At this stage, some specific aspects of the communication interface are noteworthy. Essentially, by telephonic dialing, the communication facility CO is coupled selectively to certain of the terminals T1–Tn through audio response units AR1–ARn. For example, as a result of dialing a specific telephone number at one of the remote terminal units T1–Tn, the communication facility CO couples the actuated terminal through one line of several sets of lines LS1–LSn to one of the audio response units AR1–ARn. Note that automatic call distributors may be utilized as well known in the art.

From the audio response units AR1–ARn, incoming lines 20 are received through a coupler 22 for communication with individual interface format processors IP1–IPn. Note that the interface processors IP1–IPn are illustrated as separate and distinct units; however, as mentioned above, it is to be recognized that various structural processing combinations may be used, based on time sharing, parallel processing, compiler techniques, bus technologies and other well known computer techniques to accomplish the objective processing as explained in detail below. In some instances, certain of the structure and functions of the processors IP1–IPn can be variously incorporated in the units AR1–ARn. Of course, specific arrangements and configurations will likely be implemented based on available hardware and software development.

The coupler 22 is also connected to a master control and memory unit 24 which is associatively coupled to a look-up table 25, a consumable key limit unit 27, a subset counter 29 and through a crossbar 26 to each of the processors IP1–IPn. Note that both the function and structure of crossbars for selectively interconnecting multiple parallel structures are well known in the computer arts. For a detailed description of crossbars, see the book, "High-Performance Computer Architecture" by Harold S. Stone, published by Addison-Wesley Publishing Company, 1987.

The coupler 22 essentially functions as a switch as well known in the prior art to establish line couplings from one line of an audio response unit (AR1–ARn) to one of the interface processors IP1–IPn. The operation of the coupler 22 is implemented in association with the control unit 24 which may be programmed to execute control and memory functions as detailed below.

Again, the division of functions between the unit 24, the units AR1–ARn and the processors IP1–IPn may vary considerably depending on available structures and techniques. The disclosed system is merely exemplary in that regard.

Generally, in a sales format, the interface processors IP1–IPn receive basic record data from the unit 24 and order data from the terminals T1–Tn. In a multiple format configuration, program data may be stored in the processors IP1–IPn or supplied from the unit 24. In any event, in accordance with a program or format, a packet of data is collected in a processor IP1–IPn during an interface. After being organized in a call and flagged, the data packet is returned from an interface processor IP1–IPn to the unit 24 for subsequent use or processing. For outbound operation, the unit 24 functions as an automatic dialer to attain desired connections through the units AR1–ARn in accordance with stored telephone numbers.

Again, considering a sales format, typically individual data cells or packets of data are organized and returned to the unit 24 for processing which ultimately involves performing a service or instructions for shipping merchandise and billing. In some formats, during the course of interfaces with certain callers, the need may arise for person-to-person oral communication. In accordance herewith, to accommodate that need, the interface processors IP1–IPn may be individually associated through a coupler 30 with an attended terminal AT1–ATn. For processing operations as mentioned above, the terminals AT1–ATn may be connected through a coupling unit 31 to an off-line processor 33, also connected to the control and memory unit 24.

Recapitulating to some extent, the general operation of the system of FIG. 1 involves the development and maintenance of individual data packets or cells drawn from the unit 24 to the individual processors IP1–IPn during interface communications with individual remote terminals T1–Tn. In the exemplary format as treated below, each data cell manifests a merchandise order identifying specific goods, a specific customer, a shipping destination and other related data. In accordance herewith, data in individual cells may include flagged audio data. In any event, the operation of the system involves the organized accumulation of mail-order data (some of which may be audio) in the unit 24 addressable for subsequent use by the processor 33, as to implement billing and delivery of services or merchandise.

Figure 2:
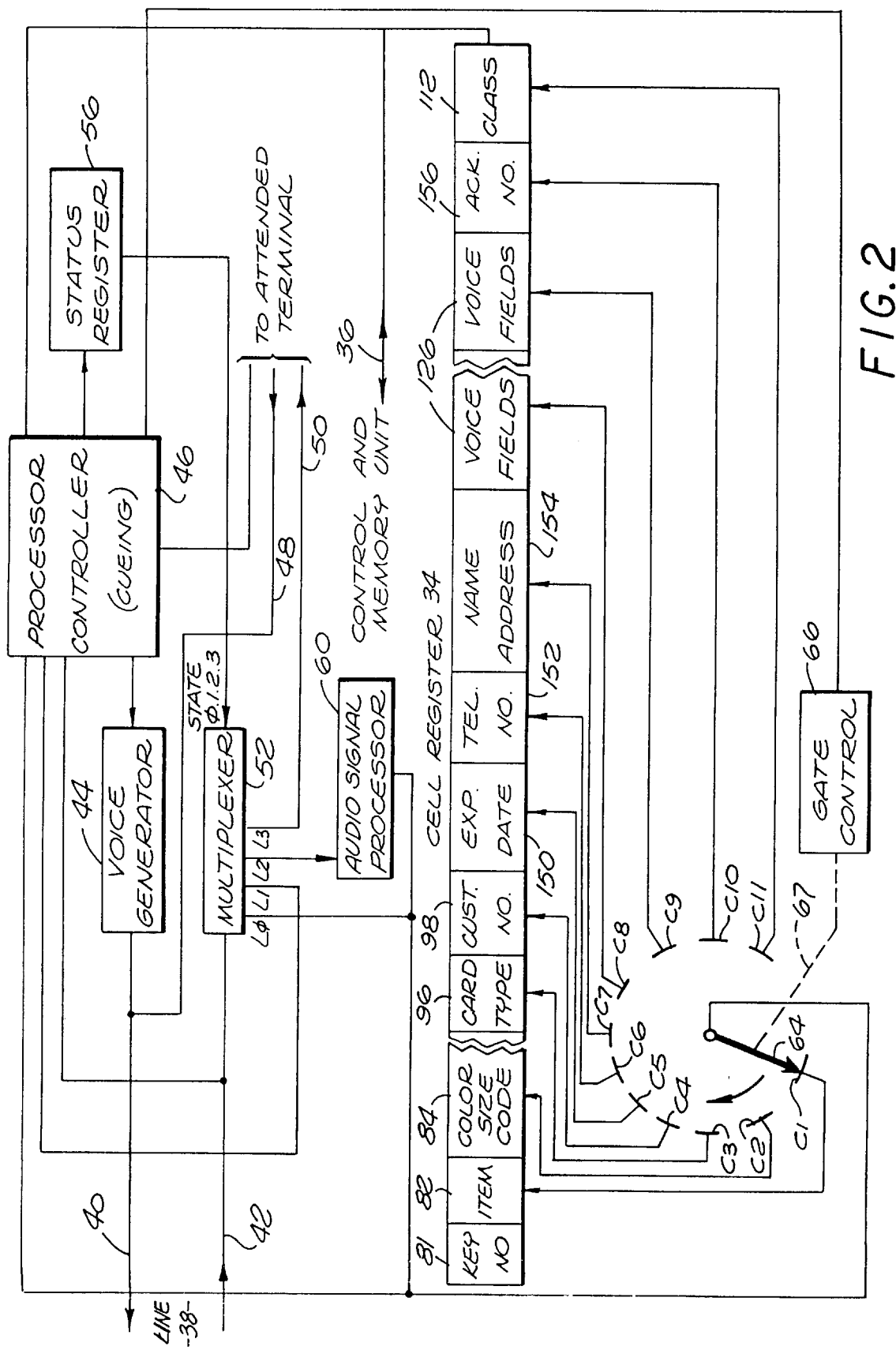
FIG. 2 is a block and schematic diagram of a component in the system of FIG. 1.

As explained in detail below, the data cells (manifesting individual orders) are developed in the individual processors IP1–IPn. Structural details of an exemplary processor are shown in FIG. 2 and will now be considered. A cell register 34 (FIG. 2, center) is divided into fields to illustrate an exemplary data format. Specifically, the cell register 34 defines several separate fields for data components manifesting an exemplary order. Record data for some of the fields may reside in the master control and memory unit 24 (FIG. 1) before the occurrence of any telephone interface. However, other fields are loaded or modified during the period of the interface with a caller at one of the remote terminals T1–Tn providing elements of the data.

Generally, variously accumulated record data is initially loaded into the cell register 34 from the control and memory unit 24 (FIG. 1) through a bus 36 (FIG. 2, right center) that is connected through the crossbar 26 (FIG. 1) to the unit 24. The same bus 36 accommodates movement of a completed or modified data cell to memory (in the unit 24).

As suggested above, some fields in the cell register 34, as those pertaining to a specific merchandise order, are always loaded by data resulting from the interface and received through a two-way line 38 (FIG. 2, upper left). That is, a caller is steered through the interface interval, being prompted or cued to provide responses selectively in the form of: (1) digital control signals, (2) digital data signals or (3) audio signals. Also, in certain applications digital ANI telephone signals may be received through the line 38 indicating the telephone dialing number of the caller. Specifically, ANI (automatic number identification) signals may be provided from the communication facility CO (FIG. 1) automatically indicating the telephone number for the calling terminal T1–Tn. The ANI signals may be treated either as control or data signals on being received through an audio response unit (AR1–ARn, FIG. 1), the coupler 22,and the line 38 (FIG. 2).

Generally, control signals in the line 38 are utilized for the controlled registration of digital data signals and audio signals as appropriate to each specific interface. Of course, the data and audio signals also are received through the line 38.

For convenience of illustration and explanation, the line 38, connected to the coupler 22 (FIG. 1) is shown to include two separate communication paths, specifically an outgoing path 40 (FIG. 2) and an incoming path 42. Of course in practice, the two paths would comprise a common two-way or bidirectional line. For outbound calls, the master control and memory unit 24 (FIG. 1) supplies dialing signals through the coupler 22 and a unit (AR1–ARn) to the facility CO. As indicated above, an automatic dialer structure is incorporated as well known in the art. On completion of a connection to a terminal T1–Tn, the unit 24 actuates a processor IP1–IPn through the crossbar 26. Thus, an addressed data packet is used to advise, inform or cue a person at a connected remote terminal (T1–Tn). In some cases, for example inbound calls, an audio response unit AR1–ARn may perform some preliminary operations, after which calls are referred to a processor IP1–IPn through the coupler. Usually, coupling a remote terminal T1–Tn to a processor IP1–IPn initiates an interface format.

During an interface operation, as with the processor IP1 for example, the connection through the coupler 22 and the audio response unit AR1–ARn remains active. For example, the outgoing communication path 40 (FIG. 2) is provided with voice signals from a voice generator 44 that is in turn controlled by a processor controller 46. Generally, the controller 46 may possess some substantial computing capability along with storage. Accordingly, it responds to an operating program as disclosed in detail below to accomplish an interface format.

The outgoing communication path 40 of the line 38 also is connected to one of the attended terminals AT1–ATn. The signal route in FIG. 2 is to the path 40 either from a line 48 or the voice generator 44. With respect to the incoming path 42, signals are provided through a multiplexer 52 to provide various lines L0, L1, L2 or L3 exclusively active. The line L3 or line 50 is coupled to an attended terminal AT1–ATn (FIG. 1). As indicated above and explained in detail below, under various circumstances, signals from persons at terminals are variously transferred, including transfer to an attended terminal (AT1–ATn, FIG. 1). Thus, the status of an interface may vary, one status or state designating an interconnection of one of the remote terminals T1–Tn with an attended terminal, that is, one of the terminals AT1–ATn.

The status of an interface with a caller is indicated by a status register 56 (FIG. 2, upper right) which is controlled by the process controller 46 and in turn controls the multiplexer 52. The status register 56 basically comprises a two-bit counter capable of indicating four states to control the lines L0–L3 from the multiplexer 52, as indicated below.

| State | Operation | Active Multiplexer Line |
| --- | --- | --- |
| "0" | Cue data signals (digital) | L0 |
| "1" | Cue control signals (digital) | L1 |
| "2" | Cue audio signals | L2 |
| "3" | Actuate live interface | L3 |

The states "0", "1" and "2" indicate operations to prompt persons to provide signals digitally. Alternatively, any of the states may be used merely to inform a person where no response is to be received. As indicated above, in the state "3", the caller speaks directly with an operator to provide information in an audio form. The other states accommodate computer interface signals. Implementing the different states, the multiplexer 52 (controlled by the status register 56) selectively activates one of the four lines L0, L1, L2 or L3 to receive a specific class of signals from the path 42.

Generally, the control signals received in the line L1 are applied to actuate the controller 46. The data or information signals received in the lines L0 and L2 are provided to the cell register 34 through a gating network 62 (lower left). Several connections are involved. The line L3 is coupled to an attended terminal (AT1–ATn, FIG. 1) through a line 50.

The line L0 (digital data) is connected to the controller 46 and to a movable contact 64 of the gating network 62. The line L1 is connected only to the controller 46. The line L2 (audio) is connected through an audio processor 60 to the controller 46 and to the movable contact 64.

The gating network 62 is illustrated in an electromechanical form for ease of explanation with the movable contact 64 displaceable to engage each of the stationary contacts C1–C11 in sequence. However, in an actual embodiment, a well known analogous solid-state configuration would be employed.

In accordance with the symbolic representation of the gating network 62, the movable contact 64 is driven by a gate control 66 to sequentially encounter stationary contacts C1–C11 which are coupled to fields of the register 34. A mechanical drive connection is indicated by a dashed line 67, the gate control 66 being actuated by the process controller 46 as described in detail below. Somewhat more specifically, the operations directed by the controller 46 are illustrated in FIG. 3 and will now be considered in detail.

Figure 3:
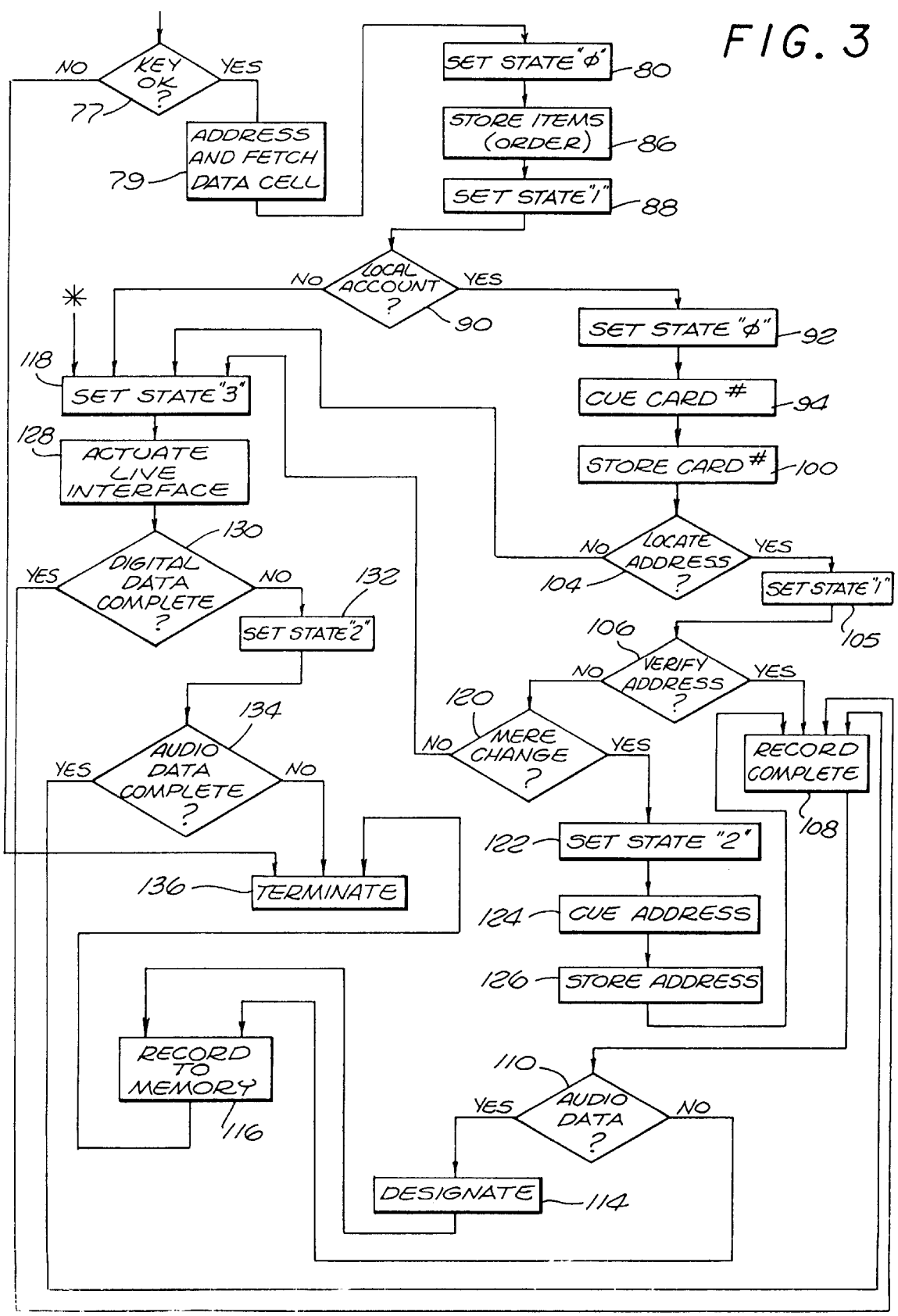
FIG. 3 is a flow diagram illustrating the operating process of the structure represented in FIG. 2.

The flow diagram of FIG. 3 implements an exemplary mail-order format for a sales organization with existing "local" customers of record (identified by telephone number, credit card number, etc.) acceptable for credit transactions. To pursue an example, customers are provided with a "special" catalog from which a single order may be placed for each telephone terminal. Thus, customers are assigned a consumable key of "one" to accordingly limit ordering.

Calls from customers are coupled through an audio response unit, e.g. unit AR1 (FIG. 1) and the coupler 22 to the master control unit 24. In one format, the customer is recognized by a telephone number manifest by automatic number identification (ANI) signals. Customer data is fetched to the consumable key limit unit 27 based on the calling telephone number. The call is then tested to proceed conditionally on the key not being previously used or consumed. The test is illustrated by a block 77 (FIG. 3) and is executed by the unit 27 with reference to a field 81 of the data packet as shown in the register 34 (FIG. 2). If there has been a previous call, the instant call is terminated as indicated. Otherwise, the data cell is fetched from the unit 24 to a cell register, e.g. register 34 (FIG. 2). The operation is indicated by the block 79 (FIG. 3). Thus, calls to a specific format number are limited to "one". Of course, consumable keys may be set to accomplish any desired limitation with respect to a specific format. Format interface operation follows approval of a call.

At the beginning of an interface operation, the processor involved, e.g. processor IP1 (FIG. 2) is set to state "0" as indicated by the block 80 (FIG. 3). That state, also indicated by the status register 56 (FIG. 2) controls the processor 46 so that a caller is cued for digital data signals to be formed by use of the buttons 14 at the caller's remote terminal. Specifically, the caller might be cued: "Please indicate your first item by keying in the three-digit catalog number." The audio is reproduced at the terminal.

As will be described in detail below, identification for an item is stored in a field 82 (FIG. 2) of the cell register 34. Similarly, color, size and code data for selected items are cued and stored in a field 84. Of course, other items may be ordered with the consequence that they are recorded in further of the fields 82 and 84 of the cell register 34. The operation also is represented by the block 86 in FIG. 3 and might be cued: "Please indicate your next item or push button '3' to indicate you are finished."

At the conclusion of the item ordering, the system sets state "1" (cue control) in the status register 56 (FIG. 2) as indicated by block 88 (FIG. 3). Note that the state "1" also may be attained by a period of silence from the caller. In any event, the subsequent operation involves a junction, as indicated by the block 90, a determination to be made by whether or not the caller is a customer of record, e.g. "local account?" As an example, the caller might be cued: "If you have a local account, please push button '1'; if not, please push button '2'."The resulting digital control signals set the course for subsequent operations as implemented by the controller 46. Of course, the indication may be confirmed or originated from the data packet.

If a caller has a local account, for example, implying that the caller's address is in the data packet, the system status is reset to state "0" (cue data) as indicated by block 92. In that event, the system resumes the accumulation of non-vocal digital data by cueing for the card number as indicated by the block 94. Note that with the indication of a local account, a designating code (customer I.D. number) is set in the field 98 of the cell register. Concurrently, the expiration date for the customer's account or card is stored in the field 150. These operations are indicated by the block 100 (FIG. 3).

Pursuing the example, the system is again set in state "1" to cue for control signals as indicated by the block 104 (FIG. 3). Specifically, as indicated by a junction block 104, a search is made for the customer's identification number. If the number is found, another control signal is cued. Specifically, as indicated by the block 106, the customer's address is verified. If the proper address is confirmed to be registered for the customer, the record is completed as indicated by the block 108. This operation, performed by the unit 46, may involve inventory verification or other internal operations as described in detail below.

Next, the system operation progresses to an internal decision block 110 to test whether or not audio data has been received. Essentially, the audio test simply queries whether or not the status register 56 has been set to manifest the existence of the states "1" or "3" to enter audio data. Control in that regard is by the controller 46 (FIG. 2).

In the example-as treated to this point, neither states "2" nor "3" has occurred. However, depending on the determination, a field 112 (FIG. 2) of the cell register 34 is set with one of the two possibilities. If audio data had been entered, the block 114 would indicate a class designation of binary "1" in the field 112. Conversely, a class representative "0" is entered in the field 112 for orders involving no audio data. The operation next proceeds to record the loaded cell in memory as indicated by the block 116.

The operation as outlined to this point has covered routine orders, i.e. customers with local accounts placing orders that can be processed entirely on the basis of digital control signals and digital data, signals (no audio) entered digitally as outlined above. the accommodation of other orders involving audio communication will now be considered.

Generally, audio operations involve either the introduction of a person-to-person interface, as for example for a new customer, or audio signal interface, as for example to record a new address for an existing customer. During any format operation, these operations may be actuated variously in combination with digital data control and recording. Such operations may involve proceeding through a block 118 (FIG. 3, upper left); however, other possibilities exist. One such possibility occurs when a caller indicates that his record address is not correct. Specifically in that regard, the junction block 106 (FIG. 3, right center) queries "verify address?" The cue or prompt might take the form: "According to our records, you are Mr. John Henry with a billing and shipping address of 10 Beverly, Los Angeles, Calif." A "no" response results in another test as indicated by the block 120 questioning whether or not the present situation is merely a case of an altered address. If so, the system proceeds from a "yes" determination of the block 120 to obtain an audio record of the new address. As indicated by the block 122, state "2" is set and the caller is cued to state his new address as indicated by the block 124. The address is processed by the audio processor 60 (FIG. 2) and stored as audio data as indicated by the block 126 (FIG. 3). The operation then proceeds on the basis of a complete record as indicated by the block 108. Note that in this instance audio data is registered in the cell 34 (FIG. 2) specifically in voice fields 126 with the status register 56 (FIG. 2, upper left) indicating state "2". Consequently, the junction block 110 (FIG. 3, lower right) indicates the presence of audio data with the result that the cell register 34 stores a class "1" bit to indicate the order data includes audio data.

Returning to the block 118 (FIG. 3, upper left) the operation for the case of a complex address change involves setting the operating state "3" i.e. actuating a live interface. Other patterns also may lead to that operating sequence. For example, as suggested above, patterns for a line operator interface may include a non-local account or failure to locate account data. Also, throughout the interval of an interface, a caller may prompt a direct personal contact simply by depressing the telephone button designated "*". Accordingly, as indicated in FIG. 3 at block 118, the occurrence of an asterisk signal (*) sets state "3" with operation proceeding from block 118 to activate a live interface as indicated by the block 128. The controller also may initiate state "3" as when meaningless data is received.

It is noteworthy that in an operating system, at any specific time, the demand for operators may exceed the number of operators. In that event, callers who cannot be accommodated are cued to punch in their telephone numbers and/or other data, and/or record via audio or numeric signals such data as to return calls when operators are available. The logic of such an operation is embodied in the block 128, "actuate live interface".

When a live interface is actuated involuntarily for a caller in accordance with the system as described, an incentive is offered to keep the caller on the line. Specifically, the operation involves the step represented by the block 118 (FIG. 3) "set state '3'" and the counter 29 (FIG. 1, upper right). The master control unit 24 might actuate the unit AR1 to produce an audio message at the terminal T1 as follows: "You are being transferred to a live operator. Please stay on the line as you may win a valuable prize." Immediately, the unit 24 increments the counter 29. If a specified count is attained, e.g. "1000", the caller is awarded a premium.

In the example, if the caller is the thousandth to be transferred, the unit 24 actuates the unit AR1 to produce an announcement; "You have won a $100 credit for your next order. Please stand by."

If the caller is not the one-thousandth to be transferred, as the transfer is wade, the caller is informed: "Sorry, no winner, but here is our operator." Essentially, transferred calls are a subset of callers, involuntarily transferred calls are a sub-subset and winners are still another subset.

Once an operator contact has been established several possibilities exist. One possibility is that the operator completes the contents of the cell register 34 (FIG. 2) without audio data. Essentially, an operator, active at one of the attended terminals, e.g. terminal AT1 (FIG. 1) has direct control of the cell register 34 (through the controller 46, FIG. 2) along with a data display and may be able to enter digital data manifesting the order. That possibility is indicated by the junction block 130 (FIG. 2), "digital data complete?"

If the data can be completed without audio record signals, the system operation proceeds to the block 108 (record complete). If the order record is not completed void of audio data, operation proceeds in state "3". Again, under control of a live operator, the system may follow different paths to produce an ultimate determination of whether or not the audio data provides a complete order as indicated by the decision block 134. In that regard, an operator may perfect an order record on the basis of a bank credit card or a new customer accommodation. In any event, if an order is not completed, the operation simply terminates as indicated by the block 136. Conversely, a completed order returns operation to block 108 indicating the record is complete.

Exemplary operating patterns of interfaces are treated in detail below; however, after addressing individual caller data, the disclosed embodiment reproduces audio messages at the connected remote terminal. As the interface proceeds, the system cues a remote terminal, as with voice instructions to prompt: (1) digital control signals, (2) digital data signals and (3) audio signals for digital recording. Depending on the control signals, and the format, various patterns are selected with the objective of completing data in the cell register for subsequently processing the individual order. Of course, the processing generally includes data for shipping merchandise and billing the customer.

Consider now a detailed exemplary operation with the attendant operations in the structures of FIGS. 1 and 2 to accomplish the process as illustrated in FIG. 3. Preliminarily, assume the system is programmed to process orders from XYZ COMPANY for items of merchandise identified to customers as from catalog, newspaper or other advertising. Established customers of the XYZ COMPANY are identified by customer number, telephone number, name and address in the master control and memory unit 24 (FIG. 1). Assume initially that such a customer actuates the telephone terminal T1 to accomplish an interface through: the communication system CO, one of the audio response units AR1–ARn and the coupler 22 with one of the interface format processors IP1–IPn.

Note that the initial phase of an inbound call may be variously implemented. For example, call signals provided to an audio response unit AR1–ARn may include representations of the caller's number and accordingly access a file on the caller. In accordance with automated number identification equipment designated ANI embodied in the communication facility CO, the caller's number may be provided in a digital form. The master control and memory unit 24 then accesses the caller's cell accordingly to address individual caller data. As described above, the data may be tested before transfer to the cell register 34 with the interface being conditioned on the test. That is, as indicated above, a customer may be limited to a specified number of order calls with regard to a particular catalog or offer. Thus, the interface may involve several tests, one of which is preliminary to setting the addressed customer data in the register 34. An example will illustrate.

An offering may be made to potential customers regarding goods or services in limited amounts. For example, customers might be offered one or two purchases, but no more. Accordingly, the data cells for such customers would be set to allow only one or two purchases as specified. Specifically, for example, the field 81 (key number) for each potential customer key number would be set at "one". Upon the occurrence of a call by a customer, an individual associated data cell would be addressed using the caller's telephone number provided by automatic number identification (ANI) equipment. From within the master control and memory unit 24, the field 81 (key number) of the cell would be checked by the consumable key limit unit 27. If the consumable key number had been reduced to "zero" or incremented to "one" as programmed to indicate a previous call, the call would be rejected by the active audio response unit AR1–ARn. Otherwise, the call would be accepted and the consumable key number would be incremented or decremented by the unit 27.

With the acceptance of the call, the data cell would be set in a cell register of a selected interface format processor, e.g. processor IP1, register 34 (FIG. 2). The direct interface would then proceed.

Recognizing the various possibilities, assume that at the outset of the direct interface, the voice generator 44 (FIG. 2, upper left) is actuated by the process controller 46 to greet the caller. For example, the voice generator 44 might cue the caller as follows: "Thank you for calling XYZ COMPANY telephone merchandise service. Please push three buttons on your telephone to identify your first item by catalog number."

Signals representative of three decimal digits identifying an item are supplied from the line 42 (FIG. 2, upper left) to the multiplexer 52. As the status register 56 is in the "0" state, the signals pass from the multiplexer 52 through the moving contact 64 and the stationary contact C1 to be registered in field 82, "item".

In the illustrative format, the customer next is prompted to digitally enter data indicating choices of color, size, special code and so on. For receiving such data, the gate control 66 actuates the gating network 62 in synchronism with the cue to the second position so that the item data is provided through the contact C2 to the field 84. Following a similar pattern, the caller may identify several item designations which are registered in the item fields 82 and 84 of the cell register 34. Note that items are checked in relation to inventory by the controller 46 acting through the unit 24 (FIG. 1) and the associated inventory look-up table 25.

When the caller indicates entry of the last item (as by an interval of silence or a signal) the voice generator 44 is actuated by the controller 46 to complete the interface as predetermined. In one format, the process controller 46 has the caller's telephone number from an ANI communication from the facility CO which addressed the caller's data record. Various information then may be confirmed or supplemented in the register 34. Note that the system as disclosed is adaptable to accommodate: first-time callers, callers of record and callers with out-dated records. Various payment arrangements for goods or services also are available.

As an alternative, consider a format using a customer's credit card number to access the file. Initially, the operation of the controller is to cue for the method of payment. Specifically, for example, the caller might be cued: "If you wish this order billed to your XYZ COMPANY credit card, please push '1'. Otherwise, push '2'." Accordingly, with a credit card confirmation, the process controller 46 sets the card type in the field 96 advancing the process of FIG. 3 to proceed from the decision block 90.

Assuming the caller possesses a credit card of XYZ COMPANY, the voice generator 44 (FIG. 2) states a request (cues) for the number. For example: "Please use your telephone buttons to key in your card number." In synchronism with the cue, the gating network 62 and the status register 56 are set. Accordingly, signals representative of the digits forming the card number are received through the line 42 (FIG. 2, upper left), the multiplexer 52 and the line L0 to the gating network 62 (lower left). As the gate control 66 is set by the process controller 46, the movable contact 64 dwells on the stationary contact C4, and the customer's number is stored in the field 98.

As an alternative to the caller's telephone number for addressing individual data, the customer's number may be utilized, In either event, individual data cells are addressed for record data to load other fields, e.g. fields 150, 152, 154, etc. Generally, if a record for the customer's card is located in the unit 24 (FIG. 1), the information is returned via the bus 36 (FIG. 2, right center) and registered in the cell register 34. Alternatively, the data may be confirmed by the caller and entered through the gating network 62.

In the disclosed embodiment, the data includes the expiration date of the card placed in field 150, the is customer's telephone number set in field 152 and the customer's name and address set in the field 154. The telephone number may be useful if a live interface is prompted or, as indicated above, it may be used as an address to locate a particular file or data.

Considering the stage-by-stage confirming operation, the location of a customer's record prompts the controller 46 (FIG. 2) to actuate the gate control 66 setting the movable contact 64 to dwell in sequence at the contacts C5, C6 and C7. With confirmation, the customer's card expiration date, telephone number and address are supplied to the fields 150, 152 and 154. For example, the customer's address is supplied from the controller 46 to the voice generator 44. Consequently, as indicated above, the caller might be prompted as follows: "According to our records, you are Mr. John Henry with a billing and shipping address of 10 Beverly, Los Angeles, Calif. If our information is correct, please push '1'; if not, please push '2'." This operation is symbolized in FIG. 3 by the block 106 (right center).

Of course, the confirmation of a customer can be broken into even smaller communications if desired. Note that in cueing the caller for confirmation, the status register 56 is set to manifest state "1" indicating that control signals are being cued. Consequently, the response from the caller is passed through the multiplexer to line L1 and then to the process controller 46.

If the caller indicates the information is correct, the process controller 46 supplies the address data of record to the field 154.

If there are no voice fields, the controller 46 actuates the gate control 66 to set the movable contact 64 at the stationary contact C10. The operation of completing the record then involves providing an acknowledgement number through the contact C10 to the field. The acknowledgement number also may be communicated to the caller by the process controller actuating the voice generator 44. Specifically, an acknowledgement number is set in the field 156 and is vocalized to the caller. Of course, as with other data from storage, it may be confirmed, e.g. "Please repeat your acknowledgement number." Note that callers in a winning or other special set or subset may be identified by coded acknowledgement numbers.

As the final step in the sequence, the movable contact 64 is actuated to engage the stationary contact C11 through which the process controller 46 supplies a signal indicative of binary "0" manifesting that the order data does not include an audio component, i.e. the voice fields 126 are blank.

With the order complete, the contents of the cell register 34 is transferred through the bus 36 to the master control and memory unit 24. As indicated above, subsequent processing may involve subsequent operations to: place related calls, fill orders and bill charges. Specifically for example, referring to FIG. 1, the manually attended terminals AT1–ATn may be actuated to control the processor 33 through the coupling unit 31. The processor 33 is operated in cooperation with the unit 24 to process individual orders. Note that the audio data stored in cells is flagged for selection as explained in detail below.

To illustrate an alternate course in the process as generally described above, assume that the customer has a valid credit card record with the XYZ COMPANY; however, the address of record is incorrect. In processing an interface with such a customer, the operation would be as described above except that the junction represented by the block 106 (FIG. 3, right center) would determine an incorrect address. Consequently, with the system in state "1", a control signal manifesting an incorrect address is supplied through the line L1 to the process controller 46 setting up an alternate operation. Specifically, the next step involves determining whether the verification failure may be corrected by a mere change of address as indicated by the block 120 (FIG. 3). To implement the operation, the process controller 46 (FIG. 2) actuates the voice generator 44 to cue the caller for control signals. For example, the cue may be stated: "If it is simply a matter of correcting or changing your address, please push '1'. Otherwise, push '2'."

If the caller actuates the "1" button, a control signal is provided through the multiplexer 52 and the line L1 to the process controller 46 indicating a simple address correction. As a result, the process controller 46 sets the status register 56 to state "2" (see block 122, FIG. 3). As a consequence, in the system of FIG. 2, the input path 42 is coupled through the multiplexer 52 to the line L2 for supplying audio signals to the audio signal processor 60. Note that during this phase of operation, the process controller 46 actuates the gate controller 66 to set the movable contact 64 at the stationary contact C8 or C9 for recording audio data in the voice fields 126.

In the configuration as described, on cue, the oral statement of the caller's address is provided as an analog signal which may be variously transmitted through the communication facility CO (FIG. 1) to ultimately reach the line 38 (path 42) (FIG. 2, upper left). From the path 42, the representative analog signal is supplied through the multiplexer 52 and the line L2 to the audio signal processor 60 which may variously process the data and encodes the analog signals in a digital format. Accordingly, digital signals indicative of the caller's correct address are registered in the fields 126 of the cell register 34.

With the proper address stored, the customer's record is complete in the cell register 34 and the process proceeds to the operations represented by block 108 (FIG. 3, right center). Specifically, an acknowledgement number is revealed and stored in the field 156 of the cell register 34. As audio signals are involved, the field 112 registers a binary "1" indicative of that class of data cell (audio).

Note that data words stored in the cell register 34 may be variously segregated or processed based on their classification as registered in the field 112. For example, it may be desirable to segregate class "1" and class "0" orders for distinct off-line processing. In that regard, as class "0" orders have no audio data, they involve somewhat simpler process operations in that no human action is involved. Conversely, class "1" orders in the disclosed system are contemplated to involve human processing to convert spoken words to digital data.

To pursue another possible course of operation, assume that prompting or cueing a customer regarding his altered address does not involve a mere change. That is, assume the decision block 120 (FIG. 3, central) produced a control signal manifesting "no", i.e. more than a mere change is involved and a live contact interface is desirable. Upon such an occurrence, state "3" is set as indicated by the block 118 (FIG. 3). As indicated above, several other possibilities may set the operation of state "3". In any event, the status register 56 (FIG. 2) is set by the controller 46 to manifest state "3". Consequently, the status register 56 controls the multiplexer 52 actuating communication through the line L3 to the lines 48 and 50 coupled to one of the attended terminals AT1–ATn (FIG. 1).

In the configuration of state "3", the process controller 46 along with the lines 48 and 50 are linked to one of the attended terminals AT1–ATn enabling an operator to speak directly with a caller and concurrently set data into the data cell register 34 through the controller 46. Note that the attended terminals AT1–ATn include a display and, accordingly, the controller 46 cooperatively drives the display with the cell register to indicate the state of the interface and the caller's data. Thus, unconventional orders are processed with the system in state "3" as described above, the process flowing from the block 118 (FIG. 3, upper left).

Of course, numerous possibilities exist for completing an order with an attended terminal. In that regard, the contents and control of the cell register 34 is by the attended terminal and the problem may simply be one of communication in which case the order data may be completed either with or without audio data.

Recapitulating to some extent, a live interface is prompted from several situations. One case involves the caller depressing the "*" button. Also, if the caller does not have credit with the XYZ COMPANY (not a local account) a live interface is prompted. In that regard, an alternative credit card as a bank card may be employed. Accordingly, data is received in either an audio or non-audio form.

Consider a bank credit card order with reference to FIG. 2 in which the cell register 34 receives alternate information. In this situation, the field 96 may store an indication of an acceptable bank card. Specifically, fields 96, 98 and 150 respectively store a bank card type, the bank card number and the expiration date. It may be further advisable to store the caller's telephone number in field 152. The caller's name and address will be stored; and in that regard, either the field 154 may be utilized by the operator at an attended terminal or an audio record may be keyed for storage in one or more fields 126. If the order is completed by an operator, the system proceeds as explained above with the final steps of indicating an acknowledgement number and designating the class of the order. Thereafter, as in other examples, the contents of the cell register is returned to the master control and memory unit 24 (FIG. 1) for subsequent processing. Note, class "1" orders also may be stored, as in a processor IP1–IPn until completed (without audio data).

It may be seen that the system accomplishes telephonic interfaces utilizing various operations in accordance with control signals prompted by cues from a voice generator. That is, the system alternately may cue a caller to provide: digital data, control data or audio data. Concurrent with the cueing operations, the system assumes a state for compatibly processing responses. Specifically, if control signals are cued, the system is controlled accordingly. If data signals are cued, the system registers such data in either an audio or non-audio format. Furthermore, depending upon the detailed operation of the system, order data is developed as in individual cells for subsequent off-line processing. Individual packets or cells of such data are classified as disclosed above, and such classifications may be effectively utilized to segregate or perform various other processing operations.

In view of the above description, it will be apparent that the system of the present invention may be effectively used in telephonic interfaces to accommodate flexibility and control by a caller. Although the disclosed embodiment is directed to a sales operation, it will be apparent that the system may be variously embodied to accommodate any of a variety of telephonic interface operations, e.g. poll, game format, information service and so on. Furthermore, it will be apparent that while the disclosed embodiment comprises specific elements and configurations, any of a variety of structure might well be utilized. Accordingly, the scope hereof is deemed to be as set forth in the claims below.

What is claimed is:

1. A method for controlling voice or data or both types of communications for use with a communication facility including remote terminals for individual callers, wherein said remote terminals include a digital input device for providing digital responsive signals, said method comprising the steps of:

receiving caller number identification signals indicative of at least a portion of a caller's number from said communication facility;

cuing select ones of said remote terminals to prompt selective actuation by individual callers of said digital input device to provide responsive signals;

selectively identifying said responsive signals from said select ones of said remote terminals as digital data signals or digital control signals, wherein certain of said responsive signals can serve as digital data signals, digital control signals, or both, said responsive signals including signals indicative of a customer identification number for an individual caller that may be utilized to access a file for said individual caller;

testing at least a portion of said customer identification number for approval;

recording said caller number identification signals provided from said communication facility as additional data for said individual caller;

transferring a call from said individual caller to an attended terminal and displaying at least a portion of data stored in said file to an operator at said attended terminal under control of said responsive signals indicative of said customer identification number and displaying at least a portion of the customer identification number wherein the operator at said attended terminal is capable of entering data to facilitate completion of the call from said individual caller; and automatically providing a connection with another one of said remote terminals in accordance with stored telephone numbers.

2. A method as defined in claim 1, further comprising the step qualifying callers with respect to limited use.

3. A method as defined in claim 1, further comprising the steps of:

providing a plurality of format configurations, and selecting one from said plurality of format configurations.

4. A method as defined in claim 1, further comprising the step of:

recognizing first time caller.

5. A method as defined in claim 4, further comprising the step of:

upon recognizing the first time caller, transferring said first time caller to the attended terminal.

6. A method as defined in claim 5, further comprising the step of:

testing said caller number identification signals to identify said first time caller prior to transferring said first time caller to said attended terminal.

7. A method according to claim 1, further comprising the step of:

receiving caller credit card number data signals as certain of said responsive signals.

8. A method according to claim 7, wherein said receiving step also includes receiving credit card expiration date data signals as certain of said responsive signals.

9. A method according to claim 8, wherein the credit card number data signal and the credit card expiration date data signals are verified.

10. A method according to claim 7, wherein the caller credit card number signals are verified.

11. A method according to claim 7, wherein for billing purposes said caller credit card number data signals are indicative of said customer identification number.

12. A method according to claim 11, wherein said caller credit card number data signals are tested for approval.

13. A method according to claim 12, wherein said caller credit card number data signals are tested for limited use.

14. A method according to claim 1, wherein access to said file for said individual caller is controlled at least in part by said caller number identification signals.

15. A method according to claim 1, wherein said data entered by said operator includes data provided by said individual caller.

16. A method according to claim 1, wherein said customer identification number is the same as said at least a portion of said caller's number.

17. A method as defined in claim 7, further comprising the step of:

recognizing a first time caller.

18. A method as defined in claim 17, further comprising the step of:

upon recognizing said first time caller, transferring said first time caller to the attended terminal.

19. A method as defined in claim 1, wherein said caller number identification signals control processing of at least certain of said digital data signals.

20. A method according to claim 1 wherein said remote terminals include a voice communication device for providing audio responsive signals, and said method further comprises the steps of:

selectively identifying said responsive signals as digital data signals, digital control signals, or audio signals; and recording said audio signals in digital format.

21. A method according to claim 20, further comprising the step of:

reproducing recorded audio signals as caller voice data at a remote terminal.

22. A method according to claim 20, further comprising the step of:

subsequently processing recorded audio signals.

23. A method according to claim 1 wherein said certain of said data stored in said file for said individual caller includes address data.

24. A method according to claim 1, further comprising the step of:
displaying caller name data at the attended terminal.

25. A method according to claim 1, further comprising the step of:
displaying caller address data at the attended terminal.

26. A method according to claim 1, further comprising the step of:
displaying caller telephone number data at the attended terminal.

27. A method according to claim 1, wherein in the testing step, said customer identification number is tested against the file including negative file data.

28. A method according to claim 1, wherein the responsive signals further include an additional form of caller identification data.

29. A method according to claim 28 wherein the additional form of caller identification data is a caller credit card number.

30. A method according to claim 28 wherein the additional form of caller identification data is a caller customer number data.

31. A method for controlling voice or data or both types of communications for use with a communication facility including remote terminals for individual callers, wherein said remote terminals include a digital input device for providing digital responsive signals, said method comprising the steps of:
receiving caller number identification signals indicative of at least a portion of a caller's number from said communication facility;
cuing select ones of said remote terminals to prompt selective actuation by an individual caller of said digital input device to provide responsive signals;
selectively identifying said responsive signals from said select ones of said remote terminals as digital data signals or digital control signals, wherein certain of said responsive signals can serve as digital data signals, digital control signals, or both, said responsive signals including signals indicative of a customer identification number for the individual caller that may be utilized to access a file for said individual caller; testing at least a portion of said customer identification number for approval;
recording said caller number identification signals from said communication facility as additional data for said individual caller;
transferring a call from said individual caller to an attended terminal and displaying at least a portion of data stored in said file to an operator at said attended terminal under control of said responsive signals indicative of said customer identification number and displaying at least a portion of the customer identification number wherein the operator at said attended terminal is capable of entering data to facilitate completion of the call from said individual caller; and
generating computer acknowledgement numbers to identify the transaction for the system and individual callers and providing said computer acknowledgement numbers to the individual callers.

32. A method according to claim 31, wherein the transaction is an order transaction.

33. A method according to claim 32, wherein the order transaction relates to a mail order.

34. A method for controlling voice-data communications with a system operating a format for use with a communication facility including remote terminals for use by certain individual callers, wherein said remote terminals include a digital input device for providing digital responsive signals, said method comprising the steps of:
interfacing said certain individual callers with an interface unit of said system operating the format;
prompting said individual callers via a voice generator to provide responsive signals representative of identification data via said digital input device of said remote terminals;
receiving from said individual callers responsive signals representative of caller identification data;
comparing said caller identification data received against a file on said individual callers to determine if said caller identification data received is already of record;
utilizing said caller identification data received to access the file to locate other data associated with said caller identification data;
transferring at least certain of said individual callers to an attended terminal;
displaying at said attended terminal at least a portion of the other data associated with the caller identification data; and
providing computer generated acknowledgement numbers to said individual callers to identify transactions to the individual callers and the system.

35. A method according to claim 34, wherein said, caller identification data provided by said individual caller includes customer number data.

36. A method according to claim 34, further comprising the step of:
selecting the format from a multiple configuration of formats.

37. A method according to claim 34, wherein the displaying step includes:
displaying at least a portion of the data entered by said individual callers and stored during an instant call.

38. A method according to claim 34, wherein the displaying step includes:
displaying at least a portion of the data stored prior to an instant call.

39. A method according to claim 34, wherein the displaying step includes:
displaying at least a portion of the data stored prior to the instant call and at least a portion of the data entered by the callers during the instant call.

40. A method according to claim 34 wherein the responsive signals provided by the individual callers include credit card number data and credit card expiration date data and both are verified.

41. A method according to claim 34, wherein the data displayed includes caller order data.

42. A method according to claim 41 wherein the caller order data displayed is entered during the instant call.

43. A method according to claim 34, wherein the data displayed includes caller telephone number data.

44. A method according to claim 43 wherein the caller order data displayed relates to previously stored data.

45. A method according to claim 44 wherein the previously stored data includes caller credit card data which is further displayed.

46. A method according to claim 44 wherein the previously stored data includes expiration date data which is further displayed.

47. A method according to claim 34, wherein the caller identification data is a caller's bank credit card number.

48. A method according to claim 34 wherein said caller identification data is compared against the file including negative file data.

49. A method according to claim 34 wherein the responsive signals provided by the individual callers include caller card number data.

50. A method according to claim 34, wherein the responsive signals provided by the individual callers include credit card expiration date data.

51. A method according to claim 34, wherein said other data displayed includes caller name data.

52. A method according to claim 51 wherein the data displayed further includes caller address data.

53. A method according to claim 51 wherein additional data relating to the call is order data.

54. A method according to claim 53 wherein the order data includes item number data.

55. A method according to claim 54 wherein the individual callers further provide data relating to the item number.

56. A method according to claim 55 wherein the further data relates to a color of the item.

57. A method for controlling voice-data communications with a system operating a format for use with a communication facility including remote terminals for use by certain individual callers, wherein said remote terminals include a digital input device for providing digital responsive signals, said method comprising the steps of:

interfacing said certain individual callers with an interface unit of said system operating the format;

prompting said individual callers via a voice generator to provide responsive signals representative of identification data via said digital input device of said remote terminals;

receiving from said individual callers responsive signals representative of caller identification data and order data provided as additional data relating to the call including data indicative of an item and further data relating to the item number, wherein the further data relates to a size of the item;

comparing said caller identification data received against a file on said individual callers to determine if said caller identification data received is already of record;

utilizing said caller identification data received to access the file to locate other data associated wit said caller identification data;

transferring at least certain of said individual callers to an attended terminal;

displaying at said attended terminal at least a portion of the other data associated with the caller identification data, wherein said other data displayed includes caller name data; and providing computer generated acknowledgement numbers to said individual callers to identify transactions to the individual callers and the system.

58. A method for controlling voice-data communications with a system operating a format for use with a communication facility including remote terminals for use by certain individual callers, wherein said remote terminals include a digital input device for providing digital responsive signals, said method comprising the steps of:

interfacing said certain individual callers with an interface unit of said system operating the format;

prompting said individual callers via a voice generator to provide responsive signals representative of identification data via said digital input device of said remote terminals;

receiving from said individual callers responsive signals representative of caller identification data;

comparing said caller identification data received against a file on said individual callers to determine if said caller identification data received is already of record;

utilizing said caller identification data received to access the file to locate other data associated with said caller identification data;

transferring at least certain of said individual callers to an attended terminal;

displaying at said attended terminal at least a portion of the other data associated with the caller identification data; and providing computer generated acknowledgement numbers to said individual callers.

59. A method for controlling voice-data communications with a system operating a format for use with a communication facility including remote terminals for use by certain individual callers, wherein said remote terminals include a digital input device for providing digital responsive signals, said method comprising the steps of:

interfacing said certain individual callers with an interface unit of said system operating the format;

prompting said individual callers via a voice generator to provide responsive signals representative of identification data via said digital input device of said remote terminals;

receiving from said individual callers responsive signals representative of caller identification data;

comparing said caller identification data received against a file on said individual callers to determine if said caller identification data received is already of record;

utilizing said caller identification data received to access the file to locate other data associated with said caller identification data;

transferring at least certain of said individual callers to an attended terminal;

displaying at said attended terminal at least a portion of the other data associated with the caller identification data;

generating with a computer and providing acknowledgement numbers to said individual callers to identify transactions to the individual callers and the system; and wherein the acknowledgement numbers are provided to the individual callers as confirmation data relating to transactions.

60. A method for controlling voice-data communications with a system operating a format for use with a communication facility including remote terminals for use by certain individual callers, wherein said remote terminals include a digital input device for providing digital responsive signals, said method comprising the steps of:

interfacing said certain individual callers with an interface unit of said system operating the format;

prompting said individual callers via a voice generator to provide responsive signals representative of identification data via said digital input device of said remote terminals;

receiving from said individual callers responsive signals representative of caller identification data;

comparing said caller identification data received against a file on said individual callers to determine if said caller identification data received is already of record;

utilizing said caller identification data received to access the file to locate other data associated with said caller identification data;

transferring at least certain of said individual callers to an attended terminal;

displaying at said attended terminal at least a portion of the other data associated with the caller identification data;

providing computer generated acknowledgement numbers to said individual callers and wherein the computer generated acknowledgement numbers are provided to the individual callers as confirmation data relating to transactions.

61. A method for controlling voice-data communications for use with a communication facility including remote terminals for individual callers, wherein said remote terminals include a digital input device for providing digital responsive signals, said method comprising the steps of:

cuing select ones of said remote terminals via a voice generator to prompt selective actuation by callers of said digital input device to provide responsive signals;

receiving said responsive signals including signals indicative of a customer identification number for an individual caller that may be utilized to access a file for said individual caller or receiving said responsive signals including signals indicative of other data;

testing at least a portion of said customer identification number for approval;

processing the other data for the individual caller utilizing multiple comparative operations;

confirming with said individual caller, via the voice generator, certain of said data stored in said file for said individual caller; and transferring a call from said individual caller to an attended terminal and displaying at least a portion of data stored in said file at said attended terminal under control of said responsive signals indicative of said customer identification number wherein said attended terminal has a capability for data to be entered to facilitate completion of the call from said individual caller.

62. A method according to claim 61 further comprising the step of:

receiving caller number identification signals indicative of at least a portion of a caller's number from said communication facility.

63. A method according to claim 62 further comprising the step of:

utilizing the caller number identification signals as additional data for the individual caller.

64. A method according to 61, wherein at least a part of the data stored in the file is audio data.

65. A method according to claim 64 wherein the audio data is at least in part utilized to accomplish at least part of the confirming step via an audio response unit.

66. A method according to claim 61 wherein at least part of the data stored in the file is caller address data.

67. A method according to claim 61 wherein at least part of the data stored in the file is caller name data.

68. A method for controlling voice-data communications for use with a communication facility including remote terminals for individual callers, wherein said remote terminals include a digital input device for providing digital responsive signals, said method comprising the steps of:

receiving a call from said individual caller at an automated system for controlling the voice-data communications with said individual caller and receiving data entered by said individual caller;

testing said data entered by said individual caller against a file of negative file data;

prompting said individual caller via a voice generator with stored data from a database of stored data for said individual caller;

also subsequently testing for acceptable credit transactions;

transferring a call from said individual caller to an attended terminal and transferring and displaying at least a portion of the data entered by said individual caller; and displaying at the attended terminal, at least a portion of the data entered by said individual caller as well as at least a portion of the data stored in said database.

69. A method according to claim 68, wherein said test for acceptable transactions includes a test for a valid credit card number provided by said individual caller.

70. A method according to claim 68, wherein said test for acceptable transactions includes a test of expiration date data.

71. A method according to claim 68, wherein said prompting step prompts said individual caller for address data.

72. A method according to claim 68, wherein said prompting step prompts said individual caller for data related to a stored credit card number.

73. A method according to claim 68, wherein said prompting step prompts said individual caller for data indicating a name of the credit card.

74. A method according to claim 68, wherein display at the attended terminal includes credit card number data for said individual caller.

75. A method according to claim 68, wherein the display at the attended terminal includes expiration date data for said individual caller.

76. A method according to claim 68, wherein the display at the attended terminal includes shipping address data for said individual caller.

77. A method according to claim 68, wherein the data stored in said database includes voice data.

78. A method according to claim 68, further comprising the step of:

generating and providing acknowledgement numbers to said individual callers.

79. A method according to claim 68 wherein the acknowledgement numbers are provided to callers as confirmation data relating to transactions.

80. A method for controlling audio-digital data communications for use with a communication facility including remote terminal for individual callers, wherein said remote terminals include an audio device for providing audio responsive signals and a digital input device for providing digital responsive signals, said method comprising the steps of:

receiving calls from select remote terminals and caller number identification signals relating to the remote terminals that are automatically provided by the communication facility;

testing the caller number identification signals against stored calling number identification signals to ensure their validity;

prompting the individual callers via a voice generator to provide responsive signals;

receiving personal identification data entered by the individual callers via the digital input device;

verifying the personal identification data entered by the individual callers before they are allowed further audio-digital data communication;

storing the audio responsive signals and the digital responsive signals provided by the individual callers; and subsequently processing after calls are terminated either stored audio responsive signals or both the stored audio responsive signals and stored digital responsive signals after testing the caller number identification signals and the personal identification data.

81. A method according to claim 80 wherein only the stored audio responsive signals are utilized for subsequent processing by transmission of the stored audio responsive signals to a remote terminal.

82. A method according to claim 80 wherein both the stored audio and the stored digital signals are utilized for subsequent processing by transmission of the stored audio and the stored digital signals to a remote terminal.

* * * * *

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

<u>Title page,</u>
Item [30], Related U.S. Application Data, "07/680,879, filed on May 5, 1991" should be -- 07/680,879, filed on April 5, 1991 --.

Item [56], References Cited, U.S. PATENT DOCUMENTS, the following references should be added:

| | |
|---|---|
| 3,644,675 | Waltington |
| 4,071,698 | Barger Jr. et al |
| 4,302,810 | Bouricius et al |
| 4,549,047 | Brian et al |
| 4,585,906 | Matthews et al |
| 4,763,191 | Gordon et al |
| 4,785,408 | Britton et al |
| 4,792,968 | Katz |
| 4,845,739 | Katz |
| 4,852,154 | Lewis et al |
| 4,866,756 | Crane et al |
| 4,996,705 | Entenmann et al |
| 5,014,298 | Katz |
| 2,941,161 | Scantlin |
| 3,060,275 | Meacham et al. |
| 3,076,059 | Meacham et al. |
| 3,082,402 | Scantlin |
| 3,128,349 | Boesch et al. |
| 3,159,818 | Scantlin |
| 3,249,919 | Scantlin |
| 3,299,210 | Bandy |
| 3,337,847 | Olsson et al. |
| 3,347,988 | Marill et al. |
| 3,371,162 | Scantlin |
| 3,381,276 | James |
| 3,482,057 | Abbott et al. |
| 3,515,814 | Morgan |
| 3,557,311 | Goldstein |
| 3,568,157 | Downing et al |
| 3,569,939 | Doblmaier et al. |
| 3,571,799 | Coker, Jr., et al. |
| 3,573,747 | Adams et al. |
| 3,581,072 | Nymeyer |
| 3,618,038 | Stein |
| 3,624,292 | Guzak, Jr. |
| 3,647,973 | James et al. |
| 3,651,480 | Downing et al. |
| 3,656,113 | Lince |
| 3,665,107 | Kopec et al. |
| 3,675,513 | Flanagan et al. |
| 3,697,702 | Buonsante et al. |
| 3,781,810 | Downing |
| 3,792,446 | McFiggins et al. |
| 3,858,032 | Scantlin |

UNITED STATES PATENT AND TRADEMARK OFFICE
CERTIFICATE OF CORRECTION

PATENT NO.    : 6,335,965 B1
DATED         : January 1, 2002
INVENTOR(S)   : Ronald A. Katz It is certified that error appears in the above-identified patent and that said Letters Patent is hereby corrected as shown below:

Item [56], References Cited, U.S. PATENT DOCUMENTS, cont'd,

| | |
|---|---|
| 3,870,821 | Steury |
| 3,914,747 | Barnes et al. |
| 3,920,908 | Kraus |
| 3,928,724 | Byram et al. |
| 3,974,338 | Luzier et al. |
| 3,982,103 | Goldman |
| 3,989,899 | Norwich |
| 3,991,406 | Downing et al. |
| 4,009,342 | Fahrenschon et al. |
| 4,012,599 | Meyer |
| 4,024,345 | Kochem |
| 4,088,838 | Nakata et al. |
| 4,108,361 | Krause |
| 4,150,255 | Theis et al. |
| 4,152,547 | Theis |
| 4,160,125 | Bower et al. |
| 4,187,498 | Creekmore |
| 4,200,770 | Hellman et al. |
| 4,201,887 | Burns |
| 4,223,183 | Peters, Jr. |
| 4,232,199 | Boatwright et al. |
| 4,260,854 | Kolodny et al. |
| 4,270,024 | Theis et al. |
| 4,303,804 | Johnson et al. |
| 4,307,266 | Messina |
| 4,317,961 | Johnson |
| 4,320,256 | Freeman |
| 4,323,770 | Dieulot et al. |
| 4,328,396 | Theis |
| 4,338,494 | Theis |
| 4,339,798 | Hedges et al. |
| 4,355,372 | Johnson et al. |
| 4,371,752 | Matthews et al. |
| 4,389,546 | Glisson et al. |
| 4,393,277 | Besen et al. |
| 4,405,829 | Rivest et al. |
| 4,420,656 | Freeman |
| 4,427,848 | Tsakanikas |
| 4,439,635 | Theis et al. |
| 4,451,700 | Kempner et al. |
| 4,475,189 | Herr et al. |
| 4,494,197 | Troy et al. |
| 4,511,764 | Nakayama et al. |
| 4,517,410 | Williams et al. |
| 4,518,827 | Sagara |
| 4,539,435 | Eckmann |
| 4,539,436 | Theis |
| 4,544,804 | Herr et al. |
| 4,547,851 | Kurland |
| 4,559,415 | Bernard et al. |
| 4,559,416 | Theis et al. |
| 4,591,664 | Freeman |
| 4,592,546 | Fascenda et al. |
| 4,594,476 | Freeman |

UNITED STATES PATENT AND TRADEMARK OFFICE
CERTIFICATE OF CORRECTION

PATENT NO.   : 6,335,965 B1
DATED        : January 1, 2002
INVENTOR(S)  : Ronald A. Katz It is certified that error appears in the above-identified patent and that said Letters Patent is hereby corrected as shown below:

Item [56], References Cited, U.S. PATENT DOCUMENTS, cont'd,

| | |
|---|---|
| 4,598,367 | DeFrancesco et al. |
| 4,603,232 | Kurland et al. |
| 4,625,079 | Castro et al. |
| 4,635,251 | Stanley et al. |
| 4,645,873 | Chomet |
| 4,649,563 | Riskin |
| 4,654,482 | DeAngelis |
| 4,665,502 | Kreisner |
| 4,669,730 | Small |
| 4,677,552 | Sibley, Jr. |
| 4,685,123 | Hsia et al. |
| 4,688,170 | Waite et al. |
| 4,692,817 | Theis |
| 4,696,028 | Morganstein et al. |
| 4,696,029 | Cohen |
| 4,715,061 | Norwich |
| 4,719,647 | Theis et al. |
| 4,722,526 | Tovar et al. |
| 4,748,668 | Shamir et al. |
| 4,757,267 | Riskin |
| 4,782,510 | Szlam |
| 4,783,796 | Ladd |
| 4,783,800 | Levine |
| 4,788,716 | Zebe |
| 4,789,928 | Fujisaki |
| 4,791,664 | Lutz et al. |
| 4,797,911 | Szlam et al. |
| 4,799,156 | Shavit et al. |
| 4,800,583 | Theis |
| 4,815,031 | Furukawa |
| 4,815,741 | Small |
| 4,853,882 | Marshall |
| 4,856,050 | Theis et al. |
| 4,876,592 | Von Kohorn |
| 4,876,717 | Barron et al. |
| 4,893,330 | Franco |
| 4,897,867 | Foster et al. |
| 4,908,761 | Tai |
| 4,908,850 | Masson et al. |
| 4,922,520 | Bernard et al. |
| 4,922,522 | Scanlon |
| 4,942,599 | Gordon et al. |
| 4,942,616 | Linstroth et al. |
| 4,943,995 | Dandelin et al. |
| 4,955,047 | Morganstein et al. |
| 4,959,783 | Scott et al. |
| 4,961,217 | Akiyama |
| 4,969,183 | Reese |
| 4,974,252 | Osborne |
| 4,975,945 | Carbullido |
| 4,989,233 | Schakowsky et al. |
| 4,992,940 | Dworkin |
| 3,246,082 | Levy |
| 3,393,272 | Hanson |

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, U.S. PATENT DOCUMENTS, cont'd,

| | |
|---|---|
| 3,556,530 | Barr |
| 3,688,126 | Klein |
| 3,794,774 | Kemmerly et al. |
| 3,909,553 | Marshall |
| 3,934,095 | Matthews et al. |
| 3,947,972 | Freeman |
| 3,950,618 | Bloisi |
| 4,017,835 | Randolph |
| 4,078,316 | Freeman |
| 4,090,038 | Biggs |
| 4,145,578 | Orriss |
| 4,191,860 | Weber |
| 4,194,089 | Hashimoto |
| 4,243,844 | Waldman |
| 4,255,618 | Danner et al. |
| 4,264,924 | Freeman |
| 4,264,925 | Freeman et al. |
| 4,277,649 | Sheinbein |
| 4,290,141 | Anderson et al. |
| 4,314,103 | Wilson |
| 4,345,315 | Cadotte et al. |
| 4,355,207 | Curtin |
| 4,376,875 | Beirne |
| 4,398,708 | Goldman et al. |
| 4,439,636 | Newkirk et al. |
| 4,468,528 | Reece et al. |
| 4,489,438 | Hughes |
| 4,521,643 | Dupuis et al. |
| 4,523,055 | Hohl et al. |
| 4,532,378 | Nakayama et al. |
| 4,566,030 | Nickerson et al. |
| 4,570,930 | Matheson |
| 4,577,062 | Hilleary et al. |
| 4,577,067 | Levy et al. |
| 4,578,700 | Roberts et al. |
| 4,580,012 | Matthews et al. |
| 4,584,602 | Nakagawa |
| 4,587,379 | Masuda |
| 4,611,094 | Asmuth et al. |
| 4,625,276 | Benton et al. |
| 4,630,200 | Ohmae et al. |
| 4,630,201 | White |
| 4,634,809 | Paulsson et al. |
| 4,658,417 | Hashimoto et al. |
| 4,674,044 | Kalmus et al. |
| 4,697,282 | Winter et al. |
| 4,706,275 | Kamil |
| 4,745,468 | Von Kohorn |
| 4,756,020 | Fodale |
| 4,761,684 | Clark et al. |
| 4,788,682 | Vij et al. |
| 4,788,715 | Lee |
| 4,797,913 | Kaplan et al. |
| 4,805,209 | Baker, Jr., et al. |

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, U.S. PATENT DOCUMENTS, cont'd,

| | |
|---|---|
| 4,812,843 | Champion III, et al. |
| 4,815,121 | Yoshida |
| 4,827,500 | Binkerd et al. |
| 4,893,328 | Peacock |
| 4,896,345 | Thorne |
| 4,907,079 | Turner et al. |
| 4,937,853 | Brule et al. |
| 4,972,461 | Brown et al. |
| 5,001,710 | Gawrys et al. |
| 5,003,574 | Denq et al. |
| 3,594,004 | Barr |
| 3,998,465 | Mascola |
| 4,121,052 | Richard |
| 4,586,707 | McNeight et al. |
| 4,781,377 | McVean et al. |
| 2,902,541 | Singleton |
| 3,394,246 | Goldman |
| 3,544,769 | Hedin |
| 3,617,638 | Jochimsen et al. |
| 3,696,335 | Lemelson |
| 3,800,283 | Gropper |
| 3,881,160 | Ross |
| 3,889,050 | Thompson |
| 3,912,874 | Botterell et al. |
| 3,918,174 | Miller et al. |
| 4,054,756 | Comella et al. |
| 4,117,278 | Ehrlich et al. |
| 4,162,377 | Mearns |
| 4,191,376 | Goldman |
| 4,241,942 | Bachman |
| 4,242,539 | Hashimoto |
| 4,299,637 | Oberdeck et al. |
| 4,348,554 | Asmuth |
| 4,360,827 | Braun |
| 4,451,087 | Comstock |
| 4,490,583 | Bednarz et al. |
| 4,555,594 | Friedes et al. |
| 4,562,342 | Solo |
| 4,567,359 | Lockwood |
| 4,582,956 | Doughty |
| 4,591,190 | Clark |
| 4,614,367 | Breen |
| 4,652,998 | Koza et al. |
| 4,663,777 | Szeto |
| 4,671,512 | Bachman et al. |
| 4,677,553 | Roberts et al. |
| 4,694,490 | Harvey et al. |
| 4,704,725 | Harvey et al. |
| 4,716,583 | Groner et al. |
| 4,764,666 | Bergeron |
| 4,766,604 | Axberg |
| 4,774,655 | Kollin et al. |
| 4,788,718 | McNabb et al. |
| 4,796,293 | Blinken et al. |

UNITED STATES PATENT AND TRADEMARK OFFICE
CERTIFICATE OF CORRECTION

PATENT NO.   : 6,335,965 B1
DATED        : January 1, 2002
INVENTOR(S)  : Ronald A. Katz It is certified that error appears in the above-identified patent and that said Letters Patent is hereby corrected as shown below:

Item [56], References Cited, U.S. PATENT DOCUMENTS, cont'd,

| | |
|---|---|
| 4,797,910 | Daudelin |
| 4,842,278 | Markowicz |
| 4,847,890 | Solomon et al. |
| 4,882,473 | Bergeron et al. |
| 4,894,857 | Szlam et al. |
| 4,899,375 | Bauer et al. |
| 4,942,598 | Davis |
| 4,964,157 | Aoshima |
| 4,965,825 | Harvey et al. |
| 4,969,185 | Dorst et al. |
| 5,017,917 | Fisher et al. |
| 5,018,736 | Pearson et al. |
| 5,023,904 | Kaplan et al. |
| 5,046,183 | Dorst et al. |
| 5,083,272 | Walker et al. |
| 5,097,528 | Gursahaney et el. |
| 5,109,414 | Harvey et al. |
| 5,127,003 | Doll, Jr. et al. |
| 5,146,491 | Silver et al. |
| 5,181,238 | Medamana et al. |
| 5,233,654 | Harvey et al. |
| 5,255,183 | Katz (Penina) |
| 5,263,723 | Pearson et al. |
| 5,333,185 | Burke et al. |
| 5,335,277 | Harvey et al. |
| 5,351,276 | Doll Jr., et al. |
| 5,353,335 | D'Urso et al. |
| 3,787,632 | Male et al. |
| 3,940,569 | Schonbrun |
| 3,987,252 | Vicari |
| 4,068,099 | Mikkola |
| 4,087,638 | Hayes et al. |
| 4,090,034 | Moylan |
| 4,160,129 | Peyser et al. |
| 4,192,972 | Bertoglio et al. |
| 4,221,933 | Cornell et al. |
| 4,255,619 | Saito |
| 4,360,875 | Behnke |
| 4,401,856 | Curtin et al. |
| 4,428,296 | Scheuchzer et al. |
| 4,445,001 | Bertoglio |
| 4,517,412 | Newkirk et al. |
| 4,518,824 | Mondardini |
| 4,549,291 | Renoulin |
| 4,585,903 | Schiller et al. |
| 4,591,665 | Foster et al. |
| 4,600,809 | Tatsumi et al. |
| 4,611,096 | Asmuth et al. |
| 4,625,081 | Lotito et al. |
| 4,640,991 | Matthews et al. |
| 4,672,660 | Curtin |
| 4,685,127 | Miller et al. |
| 4,747,124 | Ladd |
| 4,759,056 | Akiyama |

UNITED STATES PATENT AND TRADEMARK OFFICE
CERTIFICATE OF CORRECTION

PATENT NO.   : 6,335,965 B1
DATED        : January 1, 2002
INVENTOR(S)  : Ronald A. Katz It is certified that error appears in the above-identified patent and that said Letters Patent is hereby corrected as shown below:

Item [56], References Cited, U.S. PATENT DOCUMENTS, cont'd,

| | |
|---|---|
| 4,761,808 | Howard |
| 4,791,666 | Cobb et al. |
| 4,797,818 | Cotter |
| 4,805,207 | McNutt et al. |
| 4,878,240 | Lin et al. |
| 4,893,325 | Pankonen et al. |
| 4,896,346 | Belfield et al. |
| 4,899,373 | Lee et al. |
| 4,908,852 | Hird et al. |
| 4,922,519 | Daudelin |
| 4,933,965 | Hird |
| 4,989,234 | Schakowsky et al. |
| 5,036,535 | Gechter et al. |
| 5,199,062 | Von Meister et al. |
| 5,222,120 | McLeod et al. |
| 5,299,260 | Shaio |
| 5,303,298 | Morganstein |
| 5,303,299 | Hunt et al. |
| 5,354,069 | Guttman et al. |
| 5,418,844 | Morrisey et al. |
| 3,553,378 | Solomon, et al. |
| 3,829,628 | Tripsas |
| 4,565,903 | Riley |
| 4,581,486 | Matthews, et al. |
| 4,750,199 | Norwich |
| 4,761,807 | Matthews, et al. |
| 4,782,519 | Patel, et al. |
| 4,785,473 | Pfeiffer, et al. |
| 4,799,255 | Billinger, et al. |
| 4,856,066 | Lemelson |
| 4,932,021 | Moody |
| 4,951,307 | Willard |
| 4,959,855 | Daudelin |
| 5,033,076 | Jones, et al. |
| 5,033,088 | Shipman |
| 5,054,059 | Stern, et al. |
| 5,125,024 | Gokcen, et al. |
| 5,148,474 | Haralambopoulos, et al. |
| 5,164,981 | Mitchell, et al. |
| 5,168,548 | Kaufman, et al. |
| 5,179,585 | MacMillan, Jr., et al. |
| 5,181,236 | LaVallee, et al. |
| 5,186,471 | Vancraeynest |
| 5,214,689 | O'Sullivan |
| 5,236,199 | Thompson, Jr. |
| 5,289,531 | Levine |
| 5,327,554 | Palazzi, III, et al. |
| 5,361,295 | Solomon, et al. |
| 5,369,685 | Kero |
| 5,416,830 | MacMillan, Jr., et al. |
| 5,511,112 | Szlam |
| 5,561,710 | Helms |
| 5,623,536 | Solomon, et al. |
| 5,651,048 | Leeuw |

UNITED STATES PATENT AND TRADEMARK OFFICE
CERTIFICATE OF CORRECTION

PATENT NO.     : 6,335,965 B1
DATED          : January 1, 2002
INVENTOR(S)    : Ronald A. Katz It is certified that error appears in the above-identified patent and that said Letters Patent is hereby corrected as shown below:

Item [56], References Cited, U.S. PATENT DOCUMENTS, cont'd,

| | |
|---|---|
| 5,768,348 | Solomon, et al. |
| 4,689,742 | Troy et al. |
| 4,710,955 | Kauffman |
| 4,832,341 | Muller |
| 4,835,630 | Freer |
| 4,850,007 | Marino et al. |
| 4,881,261 | Oliphant et al. |
| 4,916,726 | Morley, Jr. et al. |
| 4,926,462 | Ladd et al. |
| 5,000,486 | Rua, Jr. et al. |
| 5,003,595 | Collins et al. |
| 5,128,984 | Katz |
| 5,351,285 | Katz |
| 5,403,999 | Entenmann et al. |
| 5,415,416 | Scagnelli et al. |
| 5,475,205 | Behm et al. |
| 5,490,207 | Schorr |
| 5,537,143 | Steingold et al. |
| 5,599,046 | Behm et al. |
| 5,709,603 | Kaye |
| 5,787,156 | Katz |
| 5,790,636 | Marshall |
| 5,815,551 | Katz |
| 5,835,576 | Katz |

Item [56], References Cited, FOREIGN PATENT DOCUMENTS, the following items should be added:

| | | | |
|---|---|---|---|
| 66113/81 Pat. No. 543302 | 07/16/1981 | Australia | |
| 1,162,336 | 02/14/1984 | Canada | |
| 1,022,674 | 12/13/1977 | Canada | |
| 1,025,118 | 01/24/1978 | Canada | |
| 1,056,500 | 06/12/1979 | Canada | |
| 1,059,621 | 07/31/1979 | Canada | |
| 1,225,759 | 08/18/1987 | Canada | |
| 2,009,937-2 | 08/21/90 | Canada | |
| Pub. 0 120 322 | 02/27/1984 | EPC | |
| Pub. 0,249,575 | 12/16/1987 | EPC | |
| Pub. 0,295,837 | 12/21/1988 | EPC | |
| Pub. 0,342,295 | 11/23/1989 | EPC | |
| Pub. 0,434,181 | 06/26/1991 | EPC | |
| 0 229 170 A | 07/22/87 | EPC | |
| 0 568 114 A | 11/03/93 | EPC | |
| 0 620 669 A | 10/19/94 | EPC | |
| 0 249 795 | 12/1987 | EPC | |
| EP 0 382 212 B1 | 07/1998 | EPC | |
| EP 0 382 670 B1 | 04/1997 | EPC | |
| EP 0 438 860 B1 | 09/1996 | EPC | |
| 0 451 693 A2 | 10/1991 | EPC | |
| 0 451 695 A2 | 10/1991 | EPC | |
| 0 453 831 A2 | 10/1991 | EPC | |

UNITED STATES PATENT AND TRADEMARK OFFICE
CERTIFICATE OF CORRECTION

PATENT NO.    : 6,335,965 B1
DATED         : January 1, 2002
INVENTOR(S)   : Ronald A. Katz It is certified that error appears in the above-identified patent and that said Letters Patent is hereby corrected as shown below:

Item [56], FOREIGN PATENT DOCUMENTS, cont'd,

| | | |
|---|---|---|
| 0 454 363 A2 | 10/1991 | EPC |
| 0 217 308 A2 | 04/08/87 | EPC |
| 0 917 335 A2 | 05/19/99 | EPC |
| 9002131 | 08/21/90 | France |
| 2 575 016 | 07/1986 | France |
| OS 2929416 | 02/05/81 | Germany |
| OS 3726366 | 02/11/88 | Germany |
| DE 4005365 A1 | 08/23/90 | Germany |
| 32 25 562 | 01/19/84 | Germany |
| 1162484 | 04/1967 | Great Britain |
| 2253542 | 09/1992 | Great Britain |
| 2 252 270 B | 08/1992 | Great Britain |
| Pub. 52-17740 | 09/02/1977 | Japan |
| Pub. 56-152365 | 11/25/1981 | Japan |
| Pub. 62-239757 | 10/20/1987 | Japan |
| 500138/88 | 01/14/88 | Japan |
| 298158/90 | 12/20/90 | Japan |
| 41855/91 | 02/22/91 | Japan |
| 246067/1988 | 10/13/88 | Japan |
| 009353/1988 | 01/16/88 | Japan |
| 117436/1989 | 05/10/89 | Japan |
| 54-62708 | 05/21/79 | Japan |
| 52-17739 | 02/09/77 | Japan |
| 59-83270 | 05/14/84 | Japan |
| 62-92654 | 04/28/87 | Japan |
| 62-98848 | 05/08/87 | Japan |
| 63-114442 | 05/19/88 | Japan |

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], FOREIGN PATENT DOCUMENTS, cont'd,

| | | |
|---|---|---|
| WO93/05483 | 03/18/1993 | PCT |
| WO 82/02132 | 06/1982 | PCT |
| WO 89/11768 | 11/1989 | PCT |
| WO 90/10989 | 09/1990 | PCT |
| WO 90/11661 | 10/1990 | PCT |
| WO 91/15818 | 10/1991 | PCT |
| WO 92/06548 | 04/1992 | PCT |
| WO 92/09164 | 05/1992 | PCT |
| WO 92/15166 | 09/1992 | PCT |
| WO 87/00370 | 01/15/87 | PCT |
| WO 87/00375 | 01/15/1987 | PCT |
| WO88/02966 | 04/21/1988 | PCT |
| WO88/05985 | 08/11/1988 | PCT |
| WO89/02139 | 03/09/1989 | PCT |
| WO89/09530 | 10/05/1989 | PCT |
| 2184327A | 06/17/87 | United Kingdom |
| 2 230 403 A | 10/17/90 | United Kingdom |

Item [56], References Cited, OTHER PUBLICATIONS, the following references should be added:

Lexis Search Results (Great American Potato-Chip giveaway/Raisin Bran Game/Giants Baseball Trivia -- Dial Info):

"In The Chips" AdWeek, July 22, 1985
"San-Fran-Police-League", Business Wire, Aug. 2, 1985
"Similar Campaigns", DM News, Dec. 15, 1985

"Phone Offers Action At Push Of Button", Advertising Age, Feb. 6, 1986

Boies, Stephen J., "A Computer Based Audio Communication System", Computer Sciences Department, Thomas J. Watson Research Center, Yorktown Heights, New York, USA, pp. 701-704 - (Article) (Undated)

Winckelmann, W.A., "Automatic Intercept Service", Bell Laboratories Record, May 1968, Vol 46, No. 5, pp. 138-143 - (Article)

"Proposed Agreement Between National Enterprises Board (N.E.B.) and Delphi", Jan. 30. 1979

Voysey, Hedley, "Nexos wins rights to comms engine", Computing, Sept. 6, ??, Vol. 7, no. 36 - (Article)

"Appraisal Of The Fair Market Value Of Delphi Communications", Apr. 30, 1980 - (Study)
Delphi Communications - (Charts and Exhibits)

"Voice-Response System Improves Order Entry, Inventory Control", Communication News, Aug. 1976 - (Article)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"Periphonics VOICEPACK" - (Brochure) (Undated)

"The Voice Response Peripheral That Turnes Every Touch-Tone Telephone Into A Computer Terminal", Periphonics Corporation - (Brochure) (Undated)

Rabin, Jeff, "Minorities Seek 30% Share of All Lottery Operations", Sacramento Bee, April 12, 1985 - (Article)

Advertisements (Dial Giants Baseball Trivia Game): San Francisco Chronicle, July 3, 1984
Curtis, Cathy, "976 numbers let you dial-a-whatever", San Francisco Business Journal, Nov. 26, 1984 - (Article)

Ferrell, Jane, "Three little numbers for instant information", San Francisco Chronicle, Aug.15, 1984 - (Article)

"Dallas Telephone Call-In Game Uses Computer Voice Interface", Sept. 24, 1984 - (Press Release)

Rivest, R.L., et al., "A Method for Obtaining Digital Signatures and Public-Key Cryptosystems", Communications of the ACM, Feb. 1978, Vol. 21, No. 2, pp. 120-126 - (Article)

Finnigan, Paul F, "Audiotex: The telephone as data-access equipment", Data Communications, 1987, pp. 155-161 (Article)

Ozawa, Y., et al., "Voice Response System and Its Applications", Hitachi Review, Dec. 1979, Vol. 28, No. 6, pp. 301-305 - (Article)

"AT&T 2: Reaches agreement with Rockwell (ROK)", Aug. 26, 1986 - (Press Release)

"AT&T: Expands Computer speech system product line", April 14, 1986 - (Press Release)

Adams, Cynthia, "Conversing With Computers", Computerworld on Communications, May 18, 1983, Vol. 17, No. 20A, pp. 36-44 - (Article)

Hester, S.D., et al., "The AT&T Multi-Mode Voice Systems - Full Spectrum Solutions For Speech Processing Applications", Sept. 1985, pp. 1-10 - (Proceedings Of The 1985 AVIOS Conference)

Davidson, Leon, "A Pushbutton Telephone For Alphanumeric Input", Datamation, Apr. 1966, pp. 27-30 - (Article)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Advertisement: Cuervo Gold Beach Chair, VoiceMail Int'l, '83

"Digital's All-In-1 Voice Messaging", Digital - (Brochure) (Undated)

"Access Voice and Mail Messages From One Familiar Source", Insight, - (Article) (Undated)

"Get The Message...!" "New VoiceMail Features", Voicemail International, Inc., Oct. 1984 - (Article)

Brochures (TWA Crew Scheduling/PSA's Reservation System/Universal Studios Program/Dow Phone): "AVIAR The communication system that keeps you flying", VoiceMail Int'l, - (Brochure) (Undated)

"TWA VOICEMAIL, Flight Attendants Users Guide" Aug. 1986, - (Brochure)

Holtzman, Henry, "Voice Mail Soars At TWA", Modern Office Technology (Reprint), Mar. 1986, - (Article)

"Bid Results via VOICEMAIL - Flight Deck Crew Members", May 1, 1985 (Script)

Borden, W.S., "Flight Attendant Self Input Of Monthly Bids Via Touch Tone Telephone", In-Flight Services Bulletin, Sept. 15, 1985 - (Memo)

"Look Ma, no operators! Automatic voice system doesmany airline jobs", Air Transport World, Oct. 1986 - (Article)

"1,000,000 Shares Common Stock" Voicemail International, Inc.,, Jan 10, 1984 - (Public Offering Summary)

Levinson, S.E., et al., "A Conversational-Mode Airline Information and Reservation System Using Speech Input and Output", The Bell System Technical Journal, Jan. 1980, Vol. 59, No. 1, pp. 119-137

Emerson, S.T., "Voice Response Systems - Technology to the Rescue for Business Users", Speech Technology, Jan/Feb '83, pp. 99-103 - (Article)

Moslow, Jim, "Emergency reporting system for small communities", Telephony, Feb. 11, 1985, pp. 30-32, 34 - (Article)

Rabiner, L.R., et al., "Digital Techniques for Computer Voice Response: Implementation and Applications", Proceedings Of The IEEE, Apr. 1976, Vol. 64, No. 4, pp. 416-432 - (Article)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Moosemiller, J.P., "AT&T's CONVERSANT™ I Voice System" Speech Technology, Mar/Apr. 1986, pp. 88-93 - (Article)

Frank, R.J., et al., "No. 4 ESS: Mass Announcement Capability", The Bell System Technical Journal, July/Aug. 1981, Vol. 60, No. 6, Part 2, pp. 1049-1081 - (Chapter from a Book)

"Chapter I General Description" D.I.A.L. PRM/Release 3 - Version 2 Mar. 1987 (Product Reference Manual)

"Announcing Release 3.3" D-A-S-H- D.I.A.L. Application and Support Hints, Jan/Feb. Mar. 1987, Vol. 3, No. 1 - (Brochure)

"D.I.A.L. Software Relase 4", OPCOM, Jan. 1988, Version 1 - (Product Reference Manual)
Brady, R.L., et al., "Telephone Identifier Interface", IBM Technical Disclosure Bulletin, Oct. 1976, Vol. 19, No. 5, pp. 1569-1571 - (Article)

Corbett, A.J., "Telephone Enquiry System Using Synthetic Speech", University of Essex, Dec. 1974, (Thesis)

Yoshizawa, K., et al., "Voice Response System for Telephone Betting", Hitachi Review, June 1977, Vol. 26, No. 6 - (Article)

Sagawa, S., et al., "Automatic Seat Reservation By Touch-Tone Telephone", Second USA Japan Computer Conference, 1975, Vol. 2, pp. 290-294 - (Article)

Smith, S.L., "Computer-Generated Speech and Man-Computer Interaction", Human Factors, 1970, 12(2), pp. 215-223 - (Article)

Newhouse, A., et al., "On The Use Of Very Low Cost Terminals", University of Houston, pp. 240-249 - (Paper) (Undated)

Mullen, R.W., "Telephone - home's 'friendliest' Computer", Inside Telephone Engineer And Management, May 15, 1985, Vol 89, No. 10, - (Article)

"Telephone Computing Entering Service Bureau Business", American Banker, July 5, 1979 - (Article)

Kutler, Jeffrey, "Technology, System Sharing Improve Phone Banking Outlook", American Banker, Dec. 7, 1979, Vol. CXLIV, No. 237 - (Article)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Kutler, Jeffrey, "Phone Bill Paying Accessed by Pioneer", American Banker, Dec. 7, 1979, Vol. CXLIV, No. 237 - (Article)

"User's Guide", Dowphone (Undated)

"Audiotex Information From Dow Jones", The Computer Review, Nov. 1984, Vol. 2, No. 1 - (Article)

"Dow Phone Adds Innovest Systems' Technical Analysis Reports" IDP Report, Jan. 3, 1986 - (Report)

Perdue, R.J., et al., "Conversant 1 Voice System: Architecture and Applications", AT&T Technical Journal, Sept/Oct. 1986 - (Article)

Martin, James, "Design of Man-Computer Dialogues", IBM System Research Institute, Chapter 16, pp. 283-306 - (Chapter from a Book) (Undated)

Kaiserman, D.B., "The Role Of Audio Response In Data Collection Systems", Proceedings of the Technical Sessions, Paleis des Expositions, Geneva, Switzerland, June 17-19, 1980, pp. 247-251 - (Article)

Boies, S.J., et al., "User Interface for Audio Communication System", IBM Technical Disclosure Bulletin, Dec. 1982, Vol. 25, No. 7A, pp. 3371-3377 - (Article)

Kramer, J.J., "Human Factors Problems in the Use of Pushbutton Telephones for Data Entry", Bell Telephone Laboratories, Holmdel, N.J., April 74, pp. 241-258 - (Paper)

Cox, Jr., Floyd, "Flora Fax", Jan. 22, 1986 - (Letter and Advertisements)

Isayama, Tetsuya, "Automatic Response Processing Equipment as a Multi-media Communication Node", Japan Telecommunications Review, 1987, Vol. 29, No. 1, pp. 29-36 - (Article)

Imai, Y., et al., "Shared Audio Information System Using New Audio Response Unit" Japan Telecommunications Review, Oct. 1981, Vol. 23, No. 4, pp. 383-390 - (Article)

"Distrust of computer kills home service plan" (date and source missing)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"Automatic Call Distributor/Management Information System: Interface between 1/1AESS™ Switch Central Office and Customer Premises Equipment", Bell Communications Research, Dec. 1986, Technical Reference TR-TSY-000306, Issue 1 - (Article)

"Comparison Of ACD Systems", Connection, Feb. 1990 - (Chart)

"ACD Comparison", Aspect, Feb. 2, 1990 - (Final Report)

Lanzeter, Ygal, "Automatic Number Identification System For Step-By-Step Exchanges", The Ninth Convention of Electrical and Electronics Engineers In Israel, April 1975 - (Paper)

Flanagan, J.L., et al., "Speech Synthesis", Chapters 1, 39, 42, 45 and 46 - (Chapter from a Book)

"Bell Atlantic's Bolger Wants To Be Free", Telephony, July 14, 1986 - (Article)

"Advanced New Cable TV Technology Developed For Impulse-Pay-Per-View", June 3, 1985 - (Search)

Noll, M.A., "Introduction to Telephones & Telephone Systems", Second Edition, Chapter 9 - (Chapter from a Book)

"Proposal for Kome Mediavoice Interactive Phone/Database Marketing System",
"Mediavoice Startup Software Package For Kome"
"Optional Mediavoice Software Packages For Kome"
"Why ATI Mediavoice Is The Choice For Success" - (Proposal)

Meade, Jim, Dec., 29, 1992 - (Letter)

"All About Voice Response", Datapro Research Corporation, Delran, N.J., March 1972 and Sept. 1974 - (Article)

"Voice Response in Banking Applications", Datapro Research Corporation, Delran, N.J., Oct. 1974 and Feb. 1983 - (Article)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Schiller, T.R., "Field Craft Technician Communication With A Host Computer Synthesized Voice", Proceedings AVIOS '86 Voice I/O Systems Applications Conference, Sept. 16-18, 1986

Rabin, Richard, "Telephone Access Applications: The Growth Market For Voice Processing", Proceedings AVIOS '86 Voice I/O Systems Applications Conference, Oct. 6-8, 1987

Schuster, E.R., "B.R.U.T.U.S. Better Registration Using Touch-Tone phones for University Students", Proceedings AVIOS '86 Voice I/O Systems Applications Conference, Oct. 4-6, 1988

"Exxon's Next Prey. IBM and XEROX", BusinessWeek, April 28, 1980, pp. 92-96 and 103 - (Article)

Weinstein, S.B., "Emerging Telecommunications Needs of the Card Industry", IEEE Communications Magazine, July 1984, Vol. 22, No. 7, pp 26-31 - (Article)

"Riding Gain", Broadcasting, March 7, 1983 - (Article)

Pickup, Mike, "Bank from home, by screen or by phone", Building Society Gazette, July 1988 - (Article)

Pickup, Mike, "Voice Response", Computer Systems, Sept. 1986 - (Article)

Rabiner, L.R., et al., "Isolated and Connected Word Recognition - Theory and Selected Applications", IEEE Transaction Communications, May 1981, Com. 29, No. 5, pp. 621, 622, 633, 644-646, 655-659 - (Article)

Takahashi, K., et al., "The Audio Response System for Telephone Reservation", U.D.C.
Oka, Y., et al., "Development of Ventilating Equipment for Shinkansan Train", U.D.C. - (Articles in Japanese)

UNITED STATES PATENT AND TRADEMARK OFFICE
CERTIFICATE OF CORRECTION

PATENT NO.   : 6,335,965 B1
DATED        : January 1, 2002
INVENTOR(S)  : Ronald A. Katz It is certified that error appears in the above-identified patent and that said Letters Patent is hereby corrected as shown below:

Item [56], References Cited, OTHER PUBLICATIONS, cont'd,

Pagones, M.J., et al., "New services follow increased digitization on the long-haul transmission network", AT&T Bell Laboratories Record, 1983, Vol. 61, pp. 25-33 - (Article)

"New phone service tells customer who's calling", Bell Laboratories Record, 1984, Vol. 62, p. 9 - (Article)

Hirschman, C.B., et al., "LASS: Putting the telephone customer in charge", Bell Laboratories Record, 1985, Vol. 63, pp. 10-16 - (Article)

"AT&T building communications network for Defense Department" and "AT&T inaugurates pay-per-view TV", Bell Laboratories Record, 1986, Vol. 64, p. 2 - (Article)

"Power To...", Dialogic Corporation, Littleton Road, - (unidentifiable Article)

"Representative Customer List For Interface Technology's Total Entry System", "Toes Solutions - Pharmaceutical Manufacturer", "The Voice Response Solution For Answering Customer/Sales Calls", "Toes Solutions - Orthopedic Equipment" and "Toes Solutions -Convenience Store" - (Articles)

Lummis, R.C., "Speaker Verification: A Step Toward the "Checkless" Society", Bell Laboratories Record, pp. 254-259 - (Article)

Flanagan, J.L., et al., "Synthetic voices for computers", IEEE Spectrum, Oct. 1970, Vol. 7, No. 10, pp. 22-45 - (Article)

Rabiner, L.R., et al., "Computer Synthesis of Speech by Concatenation of Formant-Coded Words", The Bell System Technical Journal, May/June 1971, pp. 1541-1558 - (Chapter from a Book)

Flanagan, J.L., et al., "Wiring Telephone Apparatus from Computer-Generated Speech", The Bell System Technical Journal, Feb. 1972, pp. 391-397 - (Chapter from a Book)

Hornsby, Jr., Thomas G., "Voice Response Systems", Modern Data, Nov. 1972, pp. 46-50 - (Article)

Diffie, W., et al., "New Directions in Cryptography", IEEE Transactions On Information Theory, Nov. 1976, Vol. IT-22, No. 6, pp. 644-654 - (Article)

Rosenthal, L.H., et al., "Automatic voice response: interfacing man with machine", IEEE Spectrum, July 1974, Vol. 11, No. 7 - (Article)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Rosenthal, L.H., et al., "A Multiline Computer Voice Response System Utilizing ADPCM Coded Speech", IEEE Transactions on Acoustics, Speech, and Signal Processing, Oct. 1974, Vol. ASSP-22, No. 5, pp. 339-352 - (Article)

Flanagan, James L., "Computers that Talk and Listen: Man-Machine Communication by Voice", Proceedings for the IEEE, April 1976, Vol. 64, No. 4, pp. 405-415 - (Article)

Maisel, Ivan, "To Put Your Baseball Savvy On The Line, Pick Up The Phone And Call", Sports Illustrated, Sept. 3, 1984 - (Script)

Brown, Merrill, "Hollywood Saga: Who Bought J.R.?", The Washington Post, Final Edition, Oct. 14, 1984 - (Script)

"SPECIAL-OLYMPICS; Teams with baseball trivia expert Brad Curtis", Business Wire, Sept. 30, 1985 - (Script)

Lucas, W.A., et al., "The Spartanburg Interactive Cable Experiments In Home Education", Rand Corp., U.S. Department of Commerce, National Technical Information Service, Feb., 1979 - (Publication)

Martin, James, "Viewdata And The Information Society", - (Book)

Gawrys, G.W., "Ushering In The Era Of ISDN", AT&T Technology, 1986, Vol. 1, No. 1, pp. 2-9 - (Article)

Cummings, J.L., et al., "AT&T Network Architecture Evolution", AT&T Technical Journal, May/June 1987, Vol. 66, Issue 3, pp. 2-12 - (Article)

Yates, C.E., "Telemarketing And Technology: Perfect Business Partners", AT&T Technology, 1987, Vol. 1, No. 3, pp. 48-55 - (Article)

Herr, T.J., "ISDN Applications In Public Switched Networks", AT&T Technology, 1987, Vol. 2, No. 3, pp. 56-65 - (Article)

"Only the best. Only from Florafax", Florafax - (Advertisement)

Aldefeld, B., et al., "Automated Directory Listing Retrieval System Based on Isolated Word Recognition", Proceedings of the IEEE, Nov. 1980, Vol. 68, No. 11, pp. 1364-1379 - (Article)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Rabiner, L.R., et al., "On the Application of Embedded Training to Connected Letter Recognition for Directory Listing Retrieval", AT&T Bell Laboratories Technical Journal, March 1984, Vol. 63, No. 3, pp. 459-477 - (Chapter from a Book)

Rosenberg, A.E., et al., "Recognition of Spoken Spelled Names for Directory Assistance Using Speaker-Independent Templates", The Bell System Technical Journal, April 1980, Vol. 59, No. 4, pp. 571-592 - (Chapter from a Book)

"The Voicestar Series By Periphonics", Periphonics, Jan. 1986 - (Publication)
"Bank-From-Home system by Periphonics Corporation"
"Bill Payment Success Story", Periphonics Corporation
"A History of Imagination", Periphonics
"Banking Success Story", Periphonics Corporation
"DataVoice and the PDT II", Periphonics Corporation
"Banking Success Story", Periphonics Corporation - (Brochures)

Schulman, Roger, "TeleLearning: The Computer Brings the Classroom Home", Family Computing, Sept. 1984, pp. 50-53 - (Article)

"ICS launches new ?-home interactive video service package", Cable Vision, Sept. 3, 1984, pp. 71/73 - (Article)

"The Remarketing of Prestel", Which Computer?, Aug. 1984, pp. 106, 107 and ? - (Article)

"Four-Line TeleClerk Calls, Answers, Stores, Surveys", Hardcopy, Jan. 1985, Vol. 14, No. 1 - (Article)

"Peripheral Speaks On Phone", Hardcopy, Dec. 1984 - (Article)

Page from What's new in Computing, April 1985 - (Article)

Page from Today, A Compuserve Publication, June 1985 - (Article)

Page from Computer Communications, Feb. 1984, Vol. 7, No. 1 - (Article)

Gits, Victoria, "Interactive device doesn't interrupt telephone calls", Cable Vision, June 17, 1985, p.20 - (Article)

Cuilwik, Tony, "Reach Out & Touch The Unix System", Unix Review, June 1985, pp. 50, 52, 53, 56 - (Article)

Blackwell, Gerry, "Dial-a-Quote: first Canadian commercial audiotex service", Computing Canada - (Article)

Applebaum, Simon, "Two-way television" Cable Vision, Aug. 8, 1983, p. 66 - (Article)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is Item [56], References Cited, OTHER PUBLICATIONS, cont'd, Sw??ne, Michael, "Fiber-optic TV network lets viewers talk back", Info World - (Article)

Morrill, C.S., et al., "User Input Mode and Computer-Aided Instruction", Human Factors, 1968, 10(3), pp. 225-232 - (Chapter from a Book)

Results of Lexis Search Request for "Dial Info or Dialinfo", Date of Search April 13, 1992, pp. 1-38

Results of Lexis Search Request for "Phone Programs or International Information Network", Date of Search April 15, 1992, pp. 1-35

Van Gieson, Jr. W.D., et al., "Machine-Generated Speech For Use With Computers, and the problem of fitting a spoken word into one half second", Computers and Automation, Nov. 1968, pp. 31-34 - (Article)

Patel, Jay, "Utility of voice response system depends on its flexibility", Bank Systems & Equipment, Dec. 1988, pp. 101/103 - (Article)

Buron, R.H., "Generation of a 1000-Word Vocabulary for a Pulse-Excited Vocoder Operating as an Audio Response Unit", IEEE Transactions On Audio And Electroacoustics, March 1986, Vol. AU-16, No. 1, pp. 21-25 - (Article)

Gaines, B.R., et al., "Some Experience in Interactive System Development and Application", Proceedings of the IEEE, June 1975, Vol. 63, No. 6, pp. 894-911 - (Article)

"Application For Registration Of Equipment To Be Connected To The Telephone Network", Federal Communication Commission, FCC Form 730

Dudley, Homer, "The Vocoder", Circuit Research Department, Dec. 1939, pp. 122-128 - (Chapter from a Book)

"Voice Response System Order Entry, Inventory Control"

"Vendor Index", Audiotex Directory & Buyer's Guide, Fall/Winter 1989/90, pp. 114-156

Francas, M., et al., "Input Devices For Public Videotex Services", Human-Computer Interaction - INTERACT '84, 1985, pp. 171-175 - (Paper)

Labrador, C., et al., "Experiments In Speech Interaction With Conventional Data Services", Human-Computer Interaction - INTERACT '84, 1985, pp. 225-229 - (Paper)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Long, J., et al., "Transaction Processing Using Videotex or: Shopping on Prestel", Human-Computer Interaction - INTERACT '84, 1985, pp. 251-255 - (Paper)

Electrical Communication, 1981, Vol. 56, Nos. 1-4, pp. 1-110 - (Paper)

Conway, R.W., et al., "Tele-CUPL: A Telephone Time Sharing System", Communication of the ACM, Sept. 1967, Vol. 10, No. 9, pp. 538-542 - (Article)

Marill, T., et al., "DATA-DIAL: Two-Way Communication with Computers From Ordinary Dial Telephones", Communications of the ACM, Oct. 1963, Vol. 6, No. 10, pp. 622-624 - (Article)

Witten, I.H., "Communicating With Microcomputers", pp. 121-158 - (Chapter from a Book)

"Call-It-Co. Hangs Up On Dial-It In Four Markets", The 976 Exchange, 1984, Vol. 2, pp. 1-6 (Article)

"DECtalk Help Boston's Shawmut Bank Cut Costs And Improve Service", Digital - (Article)

"VTK 81 Voice Computer", Voicetek, 1987 (Brochure)

"How a Computerized "Voice" Answers Customers' Inquiries", Bank Automation Newsletter, Feb. 1985, Vol. 19, No. 2 (Article)

Rickman, J., et al., "Speech Synthesizers - Communications Interface - Implementing A Touch Tone Telephone Talker With DECtalk", The DEC Professional, May 1985, pp. 38, 39, 42-44 (Article)

"DECTALK DELIVERS", Digital Review, Sept. 1985 - (Article)
"DECtalk turns a telephone into a terminal", -
"UNIX and Digital", -
"Legal protection for semiconductor chips", -
"Product safety", - DECWORLD, April 1985, Vol. 9, No. 2, pp. 1, 3, 5, 6-8 - (Article)

"DECtalk: A New Text-to-Speech Product"
Digital Guideline, March 1984, Vol. 8, No.3, pp. 1-8 - (Article)

UNITED STATES PATENT AND TRADEMARK OFFICE
CERTIFICATE OF CORRECTION

PATENT NO.    : 6,335,965 B1
DATED         : January 1, 2002
INVENTOR(S)   : Ronald A. Katz It is certified that error appears in the above-identified patent and that said Letters Patent is hereby corrected as shown below:

Item [56], References Cited, OTHER PUBLICATIONS, cont'd,

Straight Talk, A Newsletter about the DECtalk Speech Synthesizer from Digital Equipment Corporation, Vol. 1, No. 1, pp. 1-6
Straight Talk, A Newsletter about the DECtalk Speech Synthesizer from Digital Equipment Corporation, Vol. 1, No. 2, pp. 1-7
Straight Talk, A Newsletter about the DECtalk Speech Synthesizer from Digital Equipment Corporation, Vol. 1, No. 3, pp. 1-8
Straight Talk, A Newsletter about the DECtalk Speech Synthesizer from Digital Equipment Corporation, Vol. 1, No. 4, pp. 1-8
Straight Talk, A Newsletter about the DECtalk Speech Synthesizer from Digital Equipment Corporation, Vol. 2, No. 2, pp. 1-8
Straight Talk, A Newsletter about the DECtalk Speech Synthesizer from Digital Equipment Corporation, Vol. 2, No. 4, pp. 1-8
Various References/Articles attached with a letter from Smithwin Associates, dated April 22, 1992:
Riley, A.A., "Latest: 2-way communication by computer and telephone"
??evens, W.?., "Computer Helps Children to Add", The New York Times, April 20, 1970
Harvey, R.W., Times, The Kiplinger Magazine
"A Computerized System ???", Nov. 23, 1970, p. 14, (unidentifiable Article)
"Hardware for the 'cashless society'", Electronic Design 3, Feb. 4, 1971, p. 26
Tennant, R.P., "Advanced credit system smooths operation and hastens payout", Data Processing Magazine, June 1971, Vol. 13, No. 6, pp. 34-35
"Computers that talk back to you", Business Week, Date ??
Smith, Gene, "Chatting Via Computer", New York Times, Sept. 12, 1971
EDP Weekly, (unidentifiable Article)
"Did Anybody Here Call a Computer", Data Management, Feb. 196?
Skala, Martin, "Straight talk from a computer", Christian Science Monitor, June 14, 1973
"Computer for Watergate Probe", Science, June 15, 1973
"Tapping AT&T for a $50-million refund", Business Week, June 9, 1973
"Distrust of computer kills home service plan"
Scherer, Ron, "Chitchat with a computer", Christian Science Monitor, April 16, 1975, p. 2

UNITED STATES PATENT AND TRADEMARK OFFICE
CERTIFICATE OF CORRECTION

PATENT NO.    : 6,335,965 B1
DATED         : January 1, 2002
INVENTOR(S)   : Ronald A. Katz It is certified that error appears in the above-identified patent and that said Letters Patent is hereby corrected as shown below:

Item [56], References Cited, OTHER PUBLICATIONS, cont'd,

"Trying Out the Pay-by-Phone Service", Technology Review, March/April 1976, p. 15
"Pentagon seeks more control", Electronics, April 5, 1976, p. 39
"Everyman's Computer Terminal", Industrial Research, March/April 1976, p. 14
"DOD could save on test equipment"  .....

...continued
"Talking computer speeds Ford parts", April 25, 1976
"Customers of Ten Banks Paying Bills by Phone", Computer World, 1976, p. 12
"FAA to test computerized voice response to queries from pilots", Electronics, Nov. 25, 1976, p. 43
Miller, F.W., "Voice Response Comes to Life with Order Entry", Infosystems, Oct. 1981, pp. 62/64
Suppes, Patrick, "University-Level Computer-Assisted Instruction At Stanford: 1968-1980", Institute for Mathematical Studies In The Social Sciences, Stanford University, 1981, pp. 589-716
Lerner, E.J., "Products that talk", IEEE spectrum, July 1982, pp. 32-37
Carlsen, Clifford, "Megaphone plans to blare message on national scale", Times, March 2, 1987
Michelson, Marlene, "All kinds of information at your fingertips by phone", Business Times, Sept. 8, 1986, Vol. 3, No. 19
Lacter, Mark, "At Megaphone, It's Always Show Time", San Francisco Chronicle, June 9, 1986
Table of Contents, Megaphone Press Book, pp. 1-3

UNITED STATES PATENT AND TRADEMARK OFFICE
CERTIFICATE OF CORRECTION

PATENT NO.   : 6,335,965 B1
DATED        : January 1, 2002
INVENTOR(S)  : Ronald A. Katz It is certified that error appears in the above-identified patent and that said Letters Patent is hereby corrected as shown below:

Item [56], References Cited, OTHER PUBLICATIONS, cont'd,

"Miss Simpson, will you dial-a-joke for me please?", Cartoon
Lacter, Mark, "At Megaphone, It's Always Show Time", San Francisco Chronicle, June 9, 1986, Year No. 123, (different perspective)
Lacter, Mark, "Narrating Fantasy Messages - It's No Dream Job", San Francisco Chronicle, June 9, 1986
"Megaphone Serves High-Tech Showbiz", San Francisco Chronicle, June 9, 1986
"Megaphone Reaches Unique Market", San Francisco Chronicle, June 9, 1986
Feuer, Jack, "Asher/Gould: Megaphone Dials-a-Shop", Adweek, May 12, 1986
Symanovich, Steve, "Novelty over for phone porn vendors", and continuation "Big firms breathing down necks of small phone porn outfits" San Francisco Business Journal, May 5, 1986
Wilke, John, "A 'Dream' Business That's Just A Phone Call Away", Information Processing
Ketcham, D.E., "Dial-a-You-Name-It", San Francisco Chronicle, 1986
Carter, Alan, "What? You didn't know Erica was engaged again?", Daily News, March 12, 1986
"Firm plugs into sales with time, temp lines", Crain's New York Business, March 3, 1986, Vol. II, No. 9
Pitts, Gail, "Phone-in trivia games ring up profits", The Denver Post, Feb. 3, 1986
"Merge Towards Success" IIN and Megaphone", The 976 Exchange. Winter 19?6, Vol. 4

Nelson, David, "From dating to soap operas, 976 numbers come on line", San Jose Business Journal Magazine, Jan. 27, 1986
Greengard, Samuel, "Dial-A-Deluge", Business, Nov. 1985
"Numbers, Please", Business, Nov. 1985         .....

... continued
"The 976 Telelease Co.", Business Opportunities Journal, Dec. 1985
"One-time refund for '976' charges", San Francisco Examiner, Nov. 7, 1985

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Kent, Debra, "Interactive phone network stretches for calls", Advertising Age, Oct. 17, 198?
    "Making Your Phone Talk To Computers", U.S. News, Sept. 23, 1985
    Mulqueen, John, "Int'l Information Network Eyes Contact With British Telecom", Communications Week, Sep.??
    Moorhead, Derrol, "Humor, romance: just a call away", Rocky Mountain Collegian, Sept. 19,1985, Vol. 94, Iss. 32
    Keppel, Bruce, "Move Under Way to Curb Abuse of Popular Dial-It Service", Los Angeles Times, Sept. 1, 1985
    "Dial-a-stock", Forbes, Aug. 1985
    Sowa, Tom, "Games people play now include phone trivia", Spokesman-Review, July 1985
    Dougherty, P.H., "Advertising Telephone Is Growing As Medium", The New York Times, July 17, 1985
    Larson, Judy, "976 numbers entice adults - and kids", Fremont Argas, July 8, 1985
    Barbieri, Richard, "Prime Time for the Telephone", Channels, May/June 1985, pp. 54-55
    "Bank Provides Financial Fuel To Fast Track Company", The Financial Center Bank, First Quarter 1985, Vol. II, No. 1
    "Don't Phone Santa", San Francisco Chronicle, Letters to the Editor, March 29, 1985
    Carvalho, Deborah, "Will Hillary find happiness with Bob?", Contra Costa Times, March 15, 1985
    Murphy, Win, "Dial-a-romance", March 13-19, 1985
    ?, Martha, "Love, laughs, luck: Just a phone call away", Burlington County Times, Feb. 17, 1985
    Robinett, Stephen, "Blood From A Rock", Venture, Jan. 1985, pp. 38-41, 44-45
    Du Brow, Rick, "Lates hot lines for instant trivia pursuit", Los Angeles Herald Examiner, Dec. 6, 1984
    "Keep up with your favorite soap operas", Contra costa Times, Nov. 30, 1984
    Hanna, Barbara, "Inside Radio/TV"
    Behr, Debra, "'Victory' makes and writes its own on-the-road news", and "Whose calling? Michael fans most likely...", Los Angeles Times, Nov. 29, 1984
    "Newcomer MEGAPHONE Has Magnanimous Goals", The 976 Exchange, Fall 1984, Vol 2
    "Phone Santa", Vecaville Reporter, Nov. 10, 1984
    "Dial 976 for Profits", Time, Sept. 3, 1984
    Pendleton, Mike, "For A Fee Your Phone Can Inform", Burrelle's, July 19, 1984

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"Phone numbers to get details about soaps'", Burrelle's, July 18, 1984
Gansberg, A.L., "976 phone prefix as new entertainment fad", The Hollywood Reporter, June 21, 1984
Carvalho, Deborah, "Another 'GH' actor discontented with the soap", Contra Costa Times, May 26, 1984, p. 4
"Keep up with your favorite soap operas", San Francisco Examiner
Du Brow, Rick, "'Dial-a-soap' service offers daily TV summaries", Los Angeles Herald Examiner, April 26, 1984 .....

News briefs, Feb. 1966

Martin, J., et al., "The Computerized Society - An apprisal of the impact of computers on society over the next fifteen years", Chapter 10, pp. 211-226 - (Chapter from a Book)

New products, Datamation, July 1966, Vol. 12, No. 7, pp. 7/89 - (Article)

Meacham, L.A., et al., "Tone Ringing and Pushbutton Calling", The Bell System Technical Journal, 1958, pp. 339-360 - (Book)

Suppes, Patrick, "The Uses of Computers in Education", Scientific American, Sept. 1966, Vol. 215, No. 3, pp. - (Article)

Bruckert, E., et al., "Three-tiered software and VLSI aid developmental system to read text aloud", Electronics, April 21, 1983, pp. 133-138 - (Article)

Hochman, David, "Implementing Automatic Number Identification", Telecommunications, Dec., 1978, Vol. 12, No. 12 - (Article)

Martin, James, "Telecommunications and the Computer", 2nd Edition, Introduction, pp. 20-23, Chapter 5, pp. 94-95, Chapter 18 - (Chapter from a Book)

Martin, James, "Telematic Society", Chapter 6, pp. 45-48, Chapter 9, pp. 67-69, Chapter 20, pp. 181-188 - (Chapters from a Book)

Martin, James, "The Wired Society", pp. 53-55, 71-79, 99-100, 204-205, 229-231 - (Chapters from a Book)

Martin, James, "Future Developments in Tele-Communications", 2nd Edition, Box A, Chapter 1, p. 5, Chapter 7, pp. 95-111, Chapter 9, pp. 149-105, Chapter 12, pp. 207-209, Chapter 18, pp. 310-311, Chapter 19, pp. 314-317, 320, Chapter 20, pp. 330, Chapter 23, pp. 379-401 - (Chapters from a Book)

Ferrarini, E.M., "Infomania", pp. 59-61, 176-177, 191, 213-214, 223, 245, 250, 257, 285, 286 - (Book)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Kimura, Y., et al., "Audio Response System", Vol. 55, No. 10, pp. 49-54 - (Article in Japanese)

Takano, H., "Characteristics of Multipair Exchange Area Telephone Cable with Cellular Polyethylene Insulation by Gas Injection Blouing", p. 55 - (Article in Japanese)

Takahashi, T., et al., "SR-2000 Voice Processor and Its Application", NEC Research and Development, 1984, No. 73, pp. 98-105 - (Paper)

"Concept Diagram Voicemail International System"
"Voicemail Instruction Manual", Televoice International, June 1981, Index Eckhouse, John, "Voice mail spells relief for phone frustration", San Francisco Examiner, Feb. 7, 1982 - (Article)

Meade, Jim, "Throw away those pink Call-back slips", InterOffice, Jan/Feb. 1984, vol 3, No. 1 - (Article)

Welsh, Jack, "Everybody's Talking About Talking Bouquets", Design for Profit, Spring 1986, pp. 7-10 - (Article)

Mosco, Vincent, "Pushbutton Fantasies", Contents, Chapter 3 and 4, pp. 67-118 - (Chapters from a Book)

Bretz, Rudy, "Media for Interactive Communication", Chapter 5, pp. 110-116, Chapter 7, pp. 143-153 - (Chapters from a Book)

Robinson, G., et al., ""Touch-Tone" Teletext A Combined Teletext-Viewdata System", IEEE Transactions on Consumer Electronics, July 1979, Vol. CE-25, No. 3, pp. 298-303 - (Article)

Voice News, March 1982
Voice News, June 1982, William W. Creitz
Voice News, Oct. 1982, p. 5
Voice News, Nov/Dec. 1983

"Consultant Report 28?", AIS American Bell Advanced Information Systems, April 1983, pp. 27, 118-119, 123-124 - (Report)

"T-1 Board Sets Deliver High Performance All Digital T-1 Solutions", NMS Natural MicroSystems - (Product Bulletin)

"VBX Product Family Overview", NMS Natural MicroSystems, pp. 1-20 - (Brochure)

"Machine Operation Manual", May 12, 1978, Issue 1, pp. 1-3, 9-10 - (Manual)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Davey, J.P., "Dytel Western Region Sales Training Manual", 1985 - (Manual)

Gutcho, Lynette, "DECtalk - A Year Later", Speech Technology, Aug/Sept. 1985, pp. 98-102 - (Article)

Daniels, Richard, "Automating Customer Service", Insurance Software Review, Aug/Sept. 1989, pp. 60-62 - (Article)

Golbey, S.B., "Fingertip Flight Service", Oct. 1985 - (Article)

"ARO Goes Pushbutton", Newsletter, Nov. 1985, p. 9 - (Article)

"ROLM Centralized Attendant Service", ROLM Corporation, 1979

"AIS, Versatile Efficient Information Service", Fujitsu Limited, 1972, pp. 153-162 - (Brochure)

Smith, S.L., et al., "Alphabetic Data Entry Via the Touch-Tone Pad: A Comment", Human Factors, 1971, 13(2), pp. 189-190 - (Book)

Holtzman, Henry, "Still an Infant Technology VOICE MAIL", Modern Office Technology, June 1985, pp. 78-80, 82, 84, 90 - (Article)

Leander, Monica, "Voice Response - A Technology for Solving Management Problems", Speech Technology, March/April 1986, pp. 50-52 - (Article)

Stolker, Bud, "CompuCorder speech storage and output device. (evaluation)", Creative Computing, July 1983, pp. 1-7

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Witten, I.H., et al., "The Telephone Enquiry Service: a man-machine system using synthetic speech", Int. J. Man-Machine Studies, July 1977, 9, pp. 449-464 - (Book)

Gould, R.L., "Fidelity's Automated Voice Response System", Telecommunications, Jan. 1981, pp. 27-28 - (Article)

"Fidelity Automated Service Telephone", Fidelity Group, 4 pages - (Manual)
"Data Set 407 Interface Specification", Manager - Data Systems & Operations, June 1975, Issue 2, pp. 1-69 plus Table of Contents - (Manual)

Fitzwilliam, J.W., et al., "Transaction Network, Telephones, and Terminals", The Bell System Technical Journal, Dec. 1978, Vol. 57, No. 10, pp. 3325-3537 - (Book)

Inbound Outbound, May 1988, complete issue

Koch, Helmut, "Concord Design Services, Inc. Corporate Description", Exacom

Federal Communications Commission, FDC Form 484, Registration, Registrant: Concord Design Services, Inc.

Exacom Telecommunication Systems – Brochure

General Description Installation and Operation Manual for Direct Inward Dial (DID) Trunk Interface Unit, Exacom Telecommunication Systems, Nov. 21, 1989, Issue 3 - (Manual)

General Description Installation and Operation Manual for Answering Service Monitor System, Concord Design Services, Inc., Dec. 19, 1986, Issue 1 – Manual "Dialogic Voice Solutions", Dialogic Corporation, pp. 1-72

"Why Is T-1 Important And How Can It Be Used", Dialogic Corporation, Application Note, pp. 1-6

"Use of Dialogic T-1 For Telemarketing Applications", Dialogic Corporation, Application Note, pp. 1-6

"Use of Dialogic T-1 In Operator Service Applications", Dialogic Corporation, Application Note, pp. 1-6

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"Use of Dialogic T-1 In Telephone Company Networks", Dialogic Corporation, Application Note, pp. 1-10

"Use of Dialogic T-1 Equipment in CPE Gateways", Dialogic Corporation, Application Note, pp. 1-4

"Integrating Analog Devices into Dialogic-Based T-1 Voice Processing Systems", Dialogic Corporation, Application Note, pp. 1-16

"Use of Dialogic Components in Automatic Number Identification (ANI) Systems", Dialogic Corporation, Application Note, pp. 1-16

"Dialogic Unit Pricing", pp. 1-6

"Voice '92 Spring Conference & Exposition", 1992, pp. 1-24 - (Brochure)

"Telecom Developers '92", Jan. 1992 - (Advertisement)

Newton, Henry, "The Sheer Thrill Of It All", Teleconnect, May 1991,

"AFIPS Conference Proceedings", 1987 National Computer Conference, June 15-18, 1987, Chicago, Illinois
"Dynamic Network Allocation"

"Calling your computer is as easy as calling your broker, says AT&T", Record, Nov. 1985
Singleton, L.A., "Telecommunications in the Information Age", Chapter 12, pp. 115-125 - (Chapter from a Book)

Weitzen, H.S., "Telephone Magic", pp. 28-31, 38-39, 54-55, 62-67, 70-79, 82-85, 88-91, 106-115, 118-121, 126-127, 134-137, 176-177, Index - (Chapters from a Book)

Weitzen, H.S., et al., "Infopreneurs", pp. 18-19, 138-145, 206-209, Index - (Chapters from a Book)

Sullivan, Kathleen, "Paper firm relies on voice-based inventory system", IDG Communications, Inc., Sept. 10, 1984 - (Script)

"VTK Training Section" and "Disk Initialization Procedures for VTK-30/60", Voicetek Corporation - (Manual)

"VoiceStor Systems Integration Guide", Voicetek Corporation, May 2, 1983 - (Manual)

"VTK 60 Voice Computer - Technical Description", Voicetek Corporation, Oct. 1986 - (Manual)

"Voicetek VS-50 Telephone Interface System", April 25, 1984, System Integration Guide - (Manual)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"VTK Voice System - Programmers Guide", Voicetek - (Manual)

"Disk Initialization Procedures for VTK-30/60", Voicetek Corporation - (Manual)

"VTK81 Voice Computer - Technical Description", Voicetek Corporation, Oct. 1986 - (Manual)

"VTK Voice System - VTK/CE Guide", Voicetek, July 6, 1987 - (Manual)

Newton, Harry, "Newton's Telecom dictionary", Telecom Library Inc., 1991 - (Advertisement)

"1987 Buyers Guide", Teleconnect, July 1987, pp. 194, 197-210 - (Brochure)

Syntellect Inc. – Advertisements

Various copies of Business cards

Guncheon, M.C., "The Incredible Dial-A-Message Directory", Contemporary Books, Inc., 1985 - (Directory)

"Voice Box Maintenance Manual", Periphonics, 1986 - (Manual)

"Voicepac Maintenance Manual", Periphonics, 1984 - (Manual)

Dyer, Ellen, "Wichita Firm Sells 25% Share", Dec. 14, 1987, and "Spectrum Carving Role In Volatile Business", July 7, 1986, Search Results "Don't Miss The Unique Gift Idea Of The Year", Yam Educational Software, 1987 - (Advertisement)

"Welcome to the future of advertising.", Teleline, Inc., 1990 - (Presentation)

"Greeting Card Project", Teleline, Inc., Nov. 7, 1988 - (Flow Chart)

Sharkey, Betsy, "Dialing for Dollars and Data", Adweek, Nov. 16, 1987, pp. 6-8 - (Article)

Gay, Verne, "CBS may tie rates to buying p?", 1988 - (Article)

Flanagan, J.L., et al., "Synthetic Voices For Computers", IEEE International Conference on Communications, 1970, pp. 45-9 - 45-10 - (Conference Record)

Rabiner, L.R., et al., "Computer Voice Response Using Low Bit Rate Synthetic Speech", Digest IEEE 71 International Convention, March 22-25, 1971, p. 1-2, Fig. 1-2 - (Paper)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"DT1000 DIGITALKER Speech Synthesis Evaluation Board", National Semiconductor Corp., Oct. 1980 - (Manual)

"Data Set 407C Interface Specifications November 1977", Bell System Technical Reference, Nov. 1977, pp. 1-50 - (Paper)

Broomfield, R.A., et al., "Making a data terminal out of the Touch-Tone telephone", Electronics, July 3, 1980, pp. 124-129 - (Paper)

Godfrey, D., et al., "The Telidon Book - Designing and Using Videotex Systems", pp. 1-103 - (Book)

"Industry Marketing Bulletin", Honeywell EDP Wellesley Hills, Aug. 9, 1967

"Honeywell Communications Configuration Charts And Aids In Designing", Data Communications, pp. 3-1 - 3-7 and A "Burroughs Audio Response System", Reference Information for Sales Representatives, pp. 1-6

"New Product Announcement", Burroughs Corporation, Feb. 5, 1968

"Stand-Alone Lockbox Application Voice Response (Slave) Communication System Functional Specification", Cognitronics Corporation, Feb. 19, 1982, p. 21

"Unlock lockbox reporting. with Cognitronics Voice Response Communications System/Banking.", Speech-maker a division of Cognitronics Corporation "Voice Response for Banking", Cognitronics Corporation (Brochure)

"Voice response application brief", Speech-maker - (Brochure)

"Instant credit authorization is an easy touch when any telephone is a voice response computer terminal", Speech-maker a division of Cognitronics Corporation - (Article)

Slutsker, Gary, "Relationship marketing", Forbes, April 3, 1989 - (Article)

Finnigan, P.F., "To Our Shareholders", June 1985, April 7, 1986, April 10, 1987 - (Letters)

"International Programs" (Voicemail)

Finnigan, P.F., "Our guest", Radio-Schweiz AG Telekommunikation und Flugsicherung, Jan. 1983, pp. 12-14 - (Bulletin)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Finnigan, P.F., "Voice mail", 1983 National Computer Conference, May 16-19, 1983, Anaheim, CA, pp. 375-377 and Abstract "Conversations in Your Mailbox", Software News, Jan. 1985 - (Article)

Fredric, Paul, "Voicemail Int'l, Radio Page America To Offer A 'Pocket News Network'", Communications Week, July 8, 1985 - (Article)

"Voice-Messaging System: Use It While You're In, Not Out", Information WEEK - (Article)

"Corporate Performance - Companies To Watch", Fortune, Sept. 30, 1985 - (Article)

"Dream Weaver", Jon Lindy, Aug. 1986, pp. 32-35, 37 - (Article)

"Turn any telephone into a complete electronic message service", Voicemail - (Brochure)

Pages from Company Brochure, Televoice International, Inc.

"VMI Big Talker", Voicemail International, Inc. - (Newsletter)

"Newsline", Voicemail International, Inc., Oct. 1984 and Nov. 1984

"Voiceletter No. 1", Voicemail International, Inc., Dec. 1985

"A New, More Productive Way to Use the Telephone", Voicemail International, Inc. - (Brochure)

"While You Were Out..." - (Brochure)

"?For People Who Can't Afford To Miss Messages", Voicemail International, Inc. - (Brochure)

"Voicemail The electronic news service saves time, money and nerves", Radio-Suisse Ltd., (Voicemail Agent for Europe) - (Brochure)

"Are You Being Robbed of Your Time ...?", Voicemail International, Inc. - (Brochure)

"Voicemail Instruction Manual B - 85", Televoice International, Nov. 1980 - (Manual)

"Local Telephone Numbers" (for Voicemail) and "Televoice Is As Easy As 1, 2, 3 !", Televoice International - (Manual)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"Voicemail Instruction Manual C - 25", Televoice International, June 1981 - (Manual)

"Telephone Numbers" (for Voicemail) and "How To Use Voicemail", Televoice International - (Manual)

"Message Receiving/Sending" (and others), Voicemail International, Inc. - (Manual)

"You Can Use Voicemail To Send And Receive Messages At Anytime Anywhere In The World", Voicemail International, Inc., 1981 - (Brochure)

"Advanced User Guide", Voicemail International, Inc. - (Manual)

"Voicemail's Basic User's Guide", Voicemail International, Inc. - (Manual)

"Welcome To Dowphone", Dowphone, Jan. 1986 - (Manual)

"Telephone 1-800 Check-PDR", Officers of Medical Economics Company, Inc., 1986 - (Circulation/Brochure)

"Turn your telephone into an efficient electronic "mailbox"", Western Union, Jan. 1984, - (Brochure)

"Western Union Voice Message Service User's Guide", Western Union, July 1984 - (Brochure)

"PSA's 24 hour reservation system", PSA, Sept. 1986 - (Brochure)

"To Better Serve Your Business, We're On Call Days, Nights and Weekends.", Maryland Business Assistance Center - (Brochure)

"Voice Response: Breaks Trough Call Blockage.", Business Week, Aug. 26, 1985 - (Advertisement for Preception Technology Corporation)

"Tools for heavy hitters", Forbes, May 6, 1985

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"The Fidelity Automated Service Telephone", Fidelity Group - (Manual/Brochure)

"Stockquote Hotline", Norwest Brokerage Services - (Brochure)

"All You Need To Get The Stock Quotes And News You Want." Dowphone, 1984 - (Advertisement)

"The Most Respected Name In Telemarketing", West Interactive Corporation - (2 Brochures)

Borison, V.S., "TRANSACTION - telephone gets the fact at the point of sale", Bell Laboratories Record, Oct. 1975, pp. 377-383 - (Article)

Demeautis, M., et al., "The TV 200 A Transactional Telephone", Commutation & Transmission n 5, 1985, pp. 71-82 - (Article)

Eriksson, G., et al., "Voice and Data Workstations and Services in the ISDN", Ericsson Review., May 1984, pp. 14-19 - (Article)

Schrage, Michael, "A Game Von Meister in Pursuit of Profits", Washington Post, Sept. 23, 1985 - (Article)

Svigals, J., "Low Cost Point-Of-Sale Terminal", IBM Technical Disclosure Bulletin, Sept. 1982, Vol. 25, No. 4, p. 1835

Turbat, A., "Telepayment And Electronic Money The Smart Card", Commutation & Transmission n 5, 1982, pp. 11-20 - (Article)

"Voice Mail", Sound & Communications, April 1983, Vol. 28, No. 12, pp. 84-85 - (Article)

Aso, Satoshi, "Trends and Applications of Voice Output Devices", 2209 J.E.E. Journal of Electronic Engineering, Feb. 1982, Vol. 19, No. 182, pp. 102-107 - (Article)

Kroemer, F., "TELEBOX", Unterrichtsblätter, year 38/1985, No. 4, pp. 131-141 (Article) - no translation Kroemer, F., "TELEBOX", Unterrichtsblätter, year 41/1988, No. 2, pp. 67-83 (Article) - no translation C.R. Newson, "Merlin Voice Mail VM600," British Telecommunications Engineering, vol. 4, April 1985, pp. 32-35

A.S. Yatagai, "Telephonic Voice Synthesis Systems," Telecommunications, Aug. 1985, pp. 56h-I, 68

A.J. Waite, "Getting Personal With New Technologies For Telemarketers," DM News, Feb. 15, 1987 at 50

"Shopping via a network is no longer just talk," Data Communications, Aug. 1981 at 43

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"Growth-Oriented Systems, " Restaurant Technology, Nation's Restaurant News Newspaper, Jul. 1, 1985 at 51

"Let your fingers do the tapping... ...and the computer the talking," Modern Office Tech., May 1984 at 80

"American Software unveils systems for IBM mainframes," Computerworld, Mar. 26, 1984 at 59

"Business Units Get Order Entry," Computerworld, July 12, 1982 at 36

Dial Info Articles (various articles with various dates) (R0016101-R0016188)

Svigals, J., "Security Method For Remote Telephone Banking," IBM Technical Disclosure Bulletin, Vol. 23, No. 12, May 1981, pp. 5306-5307 (pb424)

AT&T Conversant Voice Response Systems Historical Overview, January 1988 (FD 023585-FD023596)

"All About Automated Attendant Systems," Datapro Research Corporation, March 1987 (SM 1000682-SM 1000691)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"New Product - Dytel's Automated Switchboard Attendant," reprinted from Business Communications Review, March-April 1984, pp. 39-41 (SM10006976-SM1000699)

Arbogast, James G. et al., "Home Diabetes Monitoring Through Touch-Tone Computer Data Entry and Voice Synthesizer Response," Annual Symposium on Computer Applications in Medical Care 8th Care Proceedings - Eighth Annual Symposium on Computer Applications in Medical Care, 1984 (MMI 020731)

Perdue, Robert J., et al., "AT&T Voice Processing System Architectures," AT&T Technical Journal, September/October 1990, pp. 52-60 (MMI 024142-MMI 024151)

Sable, E.G., et al., "AT&T Network Services Architecture Capabilities, Administration and Performance," AT&T Technical Papers, International Switching Symposium-ISS '87, AT&T Network Systems, March 15, 1987

"The Stored Program Controlled Network" The Bell System Technical Journal, September 1982

The World's Telephones, a Statistical Compilation as of January 1980, AT&T Long Lines, 1981 (Book)

Engineering and Operations in the Bell System, AT&T Bell Laboratories, 1983 (Book)

Joel, A.E., "A History of Engineering and Science in the Bell System, Switching Technology (1925-1975)," Bell Telephone Laboratories, 1982 (Book)

"ISDN - Proceedings of the conference held in San Francisco, November 1986," OnLine, New York: London Raack, G.A., et al., "Customer Control of Network Services," IEEE Communications Magazine, October 1984 (A21717089) also ISS 84, Florence Italy, May 1984

Soderberg, J.H., "Machines at your Fingertips," Bell Laboratories Record, July 1969 (A21717175)

Gawrys, G.W. et al., "A New Protocol for Call Handling Functions for the SPC Network," Globecrom '82 Conference Record, November/December 1982

Buss, C.M., "Tuning the Human/Machine Interface for AT&T Advanced 800 Service," IEEE, July 1985

Asmuth, R.L., et al., "Transaction Capabilities for Network Services," Globecom '85 IEEE Global Telecommunications Conference, New Orleans, December 1985

Mahood, Gerald K., "Human Factors in TOUCH-TONE Data Systems," Bell Laboratories Record, December 1971 (A21717170)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"4 ESS System Evolution," Bell System Technical Journal, August 1981

Inquiry Letter To The F.C.C., From Attorneys For the Prior Title Holder Seeking Rulings That A Particular Game wold Not Be Considered A Lottery Under F.C.C. Reply Letter From The F.C.C. To The Inquiry Letter Stating The Requested Rulings Reply Letter From The F.C.C. To The Inquiry Letter Stating The Requested Rulings A page (page 7) from literature on the Charles Schwab corporation, which is not dated nor identified.

A page (page 4) from an annual report dated March 1, 1989, though the actual date on which the report was distributed to the public is unknown.

An early brochure based on a March, 1989, survey by Charles Schwab & Co., Inc.

A trademark scan (U.S. Federal) indicating a first date of use for Telebroker in June 18, 1988.

Bulfer, Andrew F., "AT&T's Pay-Per-View Television Trial", published in AT&T Technical Journal, May/June, 1987

Friedes, A., et al., "ISDN opportunities for large business - 800 service customers," IEEE International Conference on Communications '86, June 22-25, 19086, Vol. 1, pp. 28-32

Allyn, Mark R. et al., "Planning for people: Human factors in the design of a new service," Bell Laboratories Record, May 1980, pp. 155-161

Hanson, Bruce L., et al., "No. 1A VSS New custom calling services," Bell Laboratories Record, June 1980, pp. 174-180

Aarons, D., "The Voice of the 80's," PC Magazine, Volume 4, Number 5, March 5, 1985, p. 114 (A21707135)

"ACD 'Magic' from AT&T's Merlin," Telecommunications Product Review, Volume 13, Number 4, April 1986 (A21708371)

"Actor Promotes Phone Services," Hammond Louisiana Star, August 23, 1984 (A21708860)

Allerbeck, M., "Experience with the Voice Mail System EMS 2000 Info – Results of an Acceptance Study," ISS '84 Florence, May 1984, Session 14 A, Paper 6, Page 1

Amano, Fumio, et al., "Imagephone!!: Integrated Voice/Data Terminal With Hand-Drawing Man-Machine Interface," IEEE, 1985 (A03701430)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Ambrosio, Johanna, "Electronic and Voice Mail; They're No Match for Each Other-Yet," Computerworld, May 19, 1986, p. 53 (A21708461)

"American-Network: Files Complaint Against Pacific Northwest Bell," Business Wire, June 4, 1986 (A21708495)

"American-Network: Signs Letter of Intent to Merge L D Communications Long Distance Service into the Company," Business Wire, August 14, 1984 (A21708856)

Andrews, Edmund L., "Patents: Computer System Lets TV Audience Join Show," The New York Times, December 24, 1988 (A01331146)

Arnst, Catherine, Press Release, Reuters, September 16, 1984 (A21708908)

"AT&T Announces Major Additions to Telemarketing Products and Services," Telephone News, December 14, 1987 (A21723927)

"AT&T; AT&T Announces New Software Enhancements," Business Wire, February 10, 1987 (A21707782)

"AT&T Announces New Software Enhancements for its PBX," PR Newswire, February 10, 1987 (A21707779)

"AT&T Computer System will be Produced Here," The Columbus Dispatch, September 9, 1985 (A01354694)

"AT&T CPU Puts Voice Recog on Any Phone," Article Source Unknown (A01354681)

"AT&T Conversant Voice Response System," Information Packet, Date Unknown

"AT&T's Digital MERLIN," Telecommunications Product Review, Volume 13, Number 7, July 1987 (A21724743)

"AT&T's Flagship System 75: A Comprehensive Analysis of the System 85's 'Little Cousin,'" Telecommunications Product Review, Volume 11, Number 7, July 1984 (A21724612)

"AT&T Forms Unit to Sell Synthetic Speech Systems," Wall Street Journal, September 10, 1985 (A01354689)

"AT&T Plans Computer Unit," The New York Times, September 10, 1985 (A01354690)

"AT&T; Showtime's Viewer's Choice, Viacom Cable and AT&T to Test Pay-Per-View Ordering System," Business Wire, December 5, 1985 (A21708103)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"AT&T Sports Service," PR Newswire, September 24, 1980 (A21710432)

"The AT&T System 25," Telecommunications Product Review, Volume 13, Number 8, August 1986 (A21706368)

Press Release, PR Newswire, November 1, 1984 (A21708963)

AT&T Technical Journal – The 5ESS Switching System, Volume 64, Number 6, Part 2, July-August 1985 (A21723626)

Excerpt from AT&T Technical Journal, September-October 1990, pp. 53-60 (A21723942)

"Automated Switchboard Attendant Helps Insurance Company Control Net Expenses," Communications News, July 1985 (A21726011)

Aversano, Nina, "The Telephone as Computer," Review of Business, Fall 1989, p.5 (A21723928)

Ayres, Paul, "Voice Response Pay-By-Phone Matures," Computerworld, November 9, 1979, p. 47 (A21725960)

Baker, Janet M., "Voice-Store-And-Forward: The Voice Message Medium," Speech Technology, August-September 1984 (A21724633)

Bakke, Bruce B., "Electronic Voice Mailbox: Potential for Fast Growth," BC Cycle, June 29, 1984 (A21708785)

Bakke, Bruce, B., "GTE's 'Voice Mailboxes' Page the World," U.P.I., April 11, 1983 (A21713359)

Barbetta, Frank, "AT&T Offers Digital PBX Enhancements," Electronic News, Volume 30,, November 5, 1984, p. 69 (A21708967)

Barbetta, Frank, "Custom Functions Offered in New AT&T Co. Package," Article Source Unknown (A21726008)

Barkauskas, B. J., et al., "Network Services Complex: A Generalized Customer Interface to the Telephone Network," IEEE International Conference on Communications, Conference Record, Volume 2, June 1983, p. 805 (A21725715)

Barlin, David, "Switch-Hitter: A Data Man's Guide to the World of Voice," Data Communications, October 1984, p. 114 (A21708926)

Basso, Richard J., et al., "Expanding the Capabilities of the ? Traffic Service Position System," Bell Laboratories Record, February 1983, pp. 22-27 (A21724556)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Belcher, Jerry, "Earthquakes in Mexico; U. S. Relief Includes Hardware, Experts; Cash Aid Suggested," Los Angeles Times, September 22, 1985 (A21708026)

"Bell Files Tariffs on CO-Based Switching System in PA.," Communications, Date Unknown (A21725944)

Bell Laboratories Record, August 1984, Cover Page and Table of Contents (A21708811)
The Bell System Technical Journal, May-June 1982 (A21709814)

Excerpt from The Bell System Technical Journal, October 1980, pp. 1384-1395

Bertoglio, O., et al., "An Interactive Procedure for Voice Messaging Services in a Traditional Network," CSELT Technical Reports, Volume 12, Supplement 10, Number 3, June 1984 (A21708755)

Bingham, Sanford, "Groceries By Phone," Inbound/Outbound, August 1988 (A21725728)

"Some Tips on Integration," Inbound/Outbound, August 1988 (A21725731)

Black, Philip, "How ISDN Services Could Make or Break the Big Network," Data Communications, June 1984, p. 247 (A21708771)
"'Blast' from Data Systems Runs Under DG's AOS/VS," Computerworld, May 3, 1982, p. 38 (A21724423)

Booker, Ellis, "How to Save Big Bucks on Phone Calls," Computer Decisions, Volume 16, November 15, 1984, p. 16 (A21708983)

Borchering, J. W., et al., "Customized Switching Systems," ISS '84 Florence, May 1984, Session 14 A, Paper 4, pp. 1-5 (A21725533)

Bowling, Tom, "Pay TV: A Pay-Per-Minute System Prototype," Television: Journal of the Royal Television Society, March-April 1984, pp. 79-83 (A21724588)

Brady, Erik, "Players, Fans Get Back in the Swing," USA Today, Date Unknown (A21706710)

Brady, Erik, "Resentful Fans Verbally Strike Back," USA Today, Date Unknown (A21706709)

Brooke, Jill, "A Hi-Tech Interactive TV Service is Planned," New York Post, January 20, 1989 (A01331148)

Brown, Jim, "Contracts; Rolm Wins College Bid," Network World, March 9, 1987, p. 4 (A21707859)

Brown, Jim, et al., "ICA Preview; AT&T May Steal Show," Network World, May 26, 1986, p. 1 (A21708473)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Brown, Jim, "PBX Market; Rolm Beefs up CBX Line Capacity," Network World, February 9, 1987, p. 4 (A21707777)

Brown, Jim, "VMX 5000 Series; Voice Messager Debuts," Network World, October 13, 1986, p. 6 (A21706653)

Brown, Jim, "Voice Mail; Rolm to Accounce New Low-Cost Phonemail," Network World, February 2, 1987 (A21707763)

Buckhout, Wayne, "Columbus-Born AT&T Computer Listens, Talks and Shows Promise," Article Source Unknown, September 10, 1985 (A01354692)

Bulfer, Andrew F., et al., "A Trial of a National Pay-Per-View Ordering and Billing System," NCTA, 1986 (A21724669)

Burstyn, H. Paris, "Phone Features: The Next Wave," High Technology, June 1986 (A21726009)

Capital Cities/ABC Video Enterprises, Inc. Teams with FDR Interactive Technologies to Explore Applications for New Telephone Technology," Capital Cities/ABC, Inc. Broadcast Group, January 19, 1989 (A01331147)

Carlson, Rolf, et al,, "Text-To-Speech conversion in Telecommunications," Proceedings of the Tenth International Symposium on Human Factors in Telecommunications, June 1983, pp. 239-245 (A21725801)

Press Release, PR Newswire, December 5, 1985 (A21708106)

Chapin, Dwight, "A Kids' Game," Article Source Unknown (A21706674)

Charlish, Geoffrey, "Telephone Message that Failed to Get Across to the U. K.," Financial Times, January 16, 1986 (A21708203)

Collins, Francis R., "Reality of Equal Access: Implementation Problems," Telephone Engineer & Management, Volume 88, September 1, 1984, p. 128 (A21708884)

"Company News: Phone Service to be Tested," The New York Times, January 20, 1989 (A01331395)

"Components," Electronic News, 1984 (A21726007)

"Computerized Telecommunications Switching Systems," Article Source Unknown

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Connolly, James, "Republican Convention Set to Test Telecommunications," Computerworld, July 9, 1984, p. 17 (A21708804)

Conroy, Cathryn, "Audiotex Arrives," Monitor, Date Unknown (W71189)

"Corporate Preoccupation with Costs Spurs Telephone Management Sales," Computerworld Focus, May 14, 1986, p. 13 (A21708457)

Cox, John D., "Talk Into Telephone, Command a Computer," The Sacramento Bee, September 10, 2985 (A01354683)

"CPU, PBX Vendors Drawing Alliances," Computerworld, April 23, 1984, p. 15 (A21708674)

Crawford, K. E., et al., "4A Toll Crossbar Application," The Bell System Technical Journal, Volume 57, Number 2, February 1978, pp. 283-323 (A21716223)

Croxall, L. M., et al., "Operational Experience with the 5ESS™ Switch," ISS Florence, Session 42 A, Paper 4, May 1984 (A21725550)

Cummings, Steve, "Voice-Mail Systems Attract Tentative Interest," PC Week, Volume 3, Number 49, December 9, 1986, p. 140 (A21707565)

Curtis, Janice, "At a Turning Point, VMX Makes Moves to Boost Voice Messaging Business," Dallas Business Courier, Volume 2, Number 13, Section 1, July 14, 1986, p. 19 (A21706328)

Daniel, Heidi C., "Inventor Battles Computer Giants," South Florida Business Journal, August 12, 1985 (A21707969)

Press Release, Communications Daily, Volume 4, Number 177, September 11, 1984, p. 7 (A21708903)

Danner, Patrick, "Dial Info Charges Electronics Giant Disconnected Deal," San Francisco Business Times, Volume 2, Number 33, April 18, 1988 (A21724767)

Excerpt from Data Communications, September 1985, pp. 399-410 (A21707991)

Davis, Judith R., "Voice Messaging Systems," Patricia Seybold's Office Computing Report, Volume 10, Number 9, p. 1-28 (A21716964)

Day, J. F., et al., "Networking Voice and Data with a Digital PBX," AT&T Technology, Date Unknown (A21707584)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Whitten, W. B., II, "Advanced Interfaces Speed Delivery of Services," AT&T Technology, Date Unknown (A21707593)

"Definity Announcement Includes Other New Products," Telecommunications Product Review, Volume 16, Number 3, March 1989 (A21712758)

DeLessio, N. X., et al., "An Integrated Operator Services Capability for the 5ESS System," ISS '84 Florence, May 1984, Session 22 C, Paper 3, Page 1-5 (A21725538)

Desmond, Paul, "Patented Call-Routing Tool Boon for Retail Industry; Instalink Will Use ISDN for Automatic Number ID," Network World, August 1, 1988 (A21712653)

"Dial-A-Drill," The New York Times, January 20, 1969 (A21725951)

"Dialing for Pennies," California Living Magazine, August 12, 1984 (A21708855)

"Distributed Data Processing and Messaging Systems," Data Communications, May 1986, p. 105 (A21708428)

Dix, John, "AT&T Breathes New Life into its Switch-and-Wire Beast," Network World, October 27, 1986, p. 1 (A21706662)

Dix, John, "AT&T Tries Different Tack," Computerworld, November 25, 1985, p. 19 (A21708097)

Dix, John, "AT&T Unleashes 'Gazelle,'" Computerworld, April 30, 1984, p. 2 (A21708710)

Dix, John, "Enhancements Out for AT&T's High-End PBX," Computerworld, November 12, 1984, p. 99 (A21708970)

Brown, Jim, "VMX 5000 Series: Voice Messager Debuts," Network World, October 13, 1986, p. 6 (A21706653)

Dix, John, "Ford Motor Co.; Driving Down Costs with Voice Mailboxes," Network World, July 14, 1986, p. 32 (A21706326)

Dix, John, "'Hello, This is a Voice Mail Recording.,'" Network World, July 14, 1986, p. 1 (A21706331)

Dix, John, "Rolm; Long-Awaited Redwood to Debut at ICA Today," Network World, June 2, 1986, p. 4 (A21708493)

Dix, John, "Switch Management: DEC Tools Debut at ICA," Network World, June 9, 1986, p. 8 (A21708497)

Dix, John, "Unified Messaging; AT&T Reveals New Message Blueprint," Network World, September 22, 1986, p. 1 (A21706473)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Dix, John, "Voice/Data PBXs: More than Today's Users Need?," Computerworld, April 23, 1984, p. 14 (A21708669)

Dorros, Irwin, "Evolving Capabilities of the Public Switched Telecommunications Network," Business Communications Review, January-February 1981 (A21725652)

Dowd, Ann Reilly, et al., "Dollars from Dialing," Fortune, March 16, 1987, p. 10 (A21707869)

Drinkwater, Larry, "Voice Processing: An Emerging Computer ? Technology," Speech Technology, August-September 1984, pp. 50-54 (A21708826) (illegible)

Edwards, M., "Digital PBXs Zero in on the Key Role as Hub of Office," Communications News, Volume 21, Number 12, December 1984, p. 44 (A21708992)

Egly, Diana G., et al., "Mnemonic Aids for Telephone-Based Interfaces," Proceedings of the Eleventh International Symposium on Human Factors in Telecommunications, September 1985 (A21725818)

Eichenwald, Kurt, "Just a Phone Call Away: More Dial-It Services," The New York Times, April 16, 1988 (A21725852)

Excerpt from Electrical Communication Facilities (in Japanese), Volume 33, Number 9, 1981 (A21724248)

"Electronic Switching: Digital Central Office Systems of the World," Edited by Amos E. Joel, Jr., IEEE Press, 1982 (A21716673)

"Electronic Voice Mail Revolutionizing Communications," Tulsa Business Chronicle, Volume 5, Number 26, June 30, 1986 (A21708510)

Press Release, PR Newswire, March 20, 1984 (A21708647)

Elliot, Thomas R., "A Voice in the Wilderness," Computerworld, June 13, 1984, p. 76 (A21708779)

Emerson, Jim, "Catalog Business," DM News, December 15, 1985 (A21708115)

Emerson, Jim, "Eliminating Live Operators," DM News, December 15, 1985 (A21708114)

Engelbardt, Robert M., "Island Paradise Gets System Update," Telephone Engineer & Management, Volume 88, September 15, 1984, p. 104 (A21708904)

Evans, S. A., et al., "Talking and Listening to the Conversant 1 Voice System," AT&T Technology, Date Unknown (A21710392)

UNITED STATES PATENT AND TRADEMARK OFFICE
CERTIFICATE OF CORRECTION

PATENT NO.   : 6,335,965 B1
DATED        : January 1, 2002
INVENTOR(S)  : Ronald A. Katz It is certified that error appears in the above-identified patent and that said Letters Patent is hereby corrected as shown below:

Item [56], References Cited, OTHER PUBLICATIONS, cont'd,

Exacom Model ASM-200 Answering Service Monitor System, General Description Installation and Operation Manual, Issue 1, December 19, 1986 (W11483)

Exacom Model ASM-200 Answering Service Monitor System, General Description Installation and Operation Manual, Issue 1, December 19, 1986 (W11483)

Fantel, Hans, "Video: Movies Hot Off the Tube," The New York Times, March 29, 1987 (A21707890)

"The Father of Voice Messaging," Network World, November 1984, p. 57 (A21708942)

Feldman, Robert, "New AT&T Packages Designed to Spruce up Systems 75/85," MIS Week, June 2, 1986, p. 30 (A21725895)

Fine, Happy, "Tavern on the Bluegrass," Eastern Basketball, Date Unknown (A21706749)

"Firm Created After Patent Suit Against First Data," Reuters, October 17, 1994 (A01331388)

Fischell, David R., et al., "Interactive Voice Technology Applications," AT&T Technical Journal, September-October 1990 (A34100164)

Foster, Robin Harris, "In the Forefront with Integrated Call Centers," AT&T Technology, Volume 7, Number 4, 1992 (A21712913)

Froehlich, F. E., et al., "The Switched Network Transaction Telephone System," The Bell System Technical Journal, Volume 57, Number 10, December 1978, pp. 3475-3485 (A21725995)

Froehlich, Leopold, "Are Smart Buildings a Dumb Idea? If They're Going to Prosper, Shared Service Providers Will Have to Move from Telephony into Office Automation," Datamation, Volume 31, October 1, 1985, p. 101 (A21708046)

Gates, G. W., et al., "Software," The Bell System Technical Journal, Volume 61, Number 5, May-June 1982, pp. 863-883 (A21725913)

Gawron, L. J., et al., "Scanned-Image Technologies Bring New Ways to Conduct Business," AT&T Technology, Volume 6, Number 4, 1991 (A21713611)

Gawronski, Jane Donnelly, et al., "Audio Response System to Practice Mental Computation Skills," Proceedings of the Digital Equipment Computer Users Society, Volume 1, Number 2, Fall 1974, pp.633-636 (A21725979)

Gawrys, G. W., "ISDN: Integrated Network/Premises Solutions for Customer Needs," IEEE, 1986, pp. 1.1.1-1.1.5 (A21725555)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Gaylord, D. M., "Better Health for Hospitals with DIMENSION 2000 PBX," Bell Laboratories Record, July-August 1981, pp. 170-173 (A21724371)

Gerald, Jeannette A., "A Voice Response System for General Aviation Pilots," Article Source Unknown (A21708877)

Gibson, Stanley, "Audix Upgrades Include Messaging, Billing, Management," Computerworld, December 15, 1986, p. 29 (A21707568)

Gibson, Stanley, "Octel Links Voice Mail System to Rolm PBX," Computerworld, December 8, 1986, p. 42 (A21707564)

Gillon, A. C., et al., "Voice Power Gives You Voice Messaging – And Then Some," AT&T Technology, Volume 4, Number 2, 1989 (A21712712) repeated (A21724818)

Gitten, L. J., et al., "5ESS System Evolution," ISS Florence, Session 41 A, Paper 1, May 1984 (A21725543)

Goecke, D., et al., "A Software Engineering Approach Applied to the Complete Design and Production Process of Large Communication Systems Software," ISS '84 Florence, Session 13 C, Paper 1, May 1984

Goldstein, Mark L., "Send A Message. Now! New Digital Networks Can Give Companies a Competitive Edge," Industry Week, July 21, 1986, p. 43 (A21706347)

"Gotcha!," Edited by John A. Conway, Forbes, March 10, 1986, p. 9 (A21708345)

Gottlieb, Dan, "Does the Bell Toll for Voice/Data Independents?," Purchasing, December 13, 1984, pp. 103-108 (A21724641)

Grau, Jeff, "IBM Hints at Entering Voice Response Market in 1992," Article Source Unknown, December 11, 1990 (A01346366)

Greene, James E., et al., "Voice Response System Sticks to the Script and Saves Time, Money and Tempers for University Students and Administrators," Communication Age, January 1986 (A21724080)

Grumhaus, Audrey, "What's New in Telephone Service: Some Bad News for Nuisance Callers," The New York Times, November 16, 1986 (A21725855) repeated (A21725857)

Grunbaum, Rami, "Genesis Electronics Heeds the Voice Mail Calling," The Business Journal – Sacramento, Volume 2, Number 49, March 10, 1986 (A21708341)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Gunderson, Gary W., "Computer Consoles; Can Your Community Save Lives when Seconds Count?," Business Wire, February 11, 1987 (A21707785)

Hafner, Katherine, "Hello Voice Mail, Goodbye Message Slips," Business Week, June 16, 1986 (A21708507)

Hafner, Katherine, "System 85 Targets Leading-Edge Users: NBI," Computerworld, September 5, 1983, p. 53 (A21724580)

Hafner, Katherine, "Temporary Telephones," Network World, May 2, 1984 (A21708739)

Hafner, Katherine, "The Venture Capital Adventure," Network World, August 1, 1984 (A21708837)

Hamel, Bob, "Voice Messaging; VMX Gives Firms Edge," Network World, March 16, 1987 (A21707864)

Hanson, Robert J., "The DSC-2000 VoiceServer System," Speech Technology, August-September 1984, pp. 55-65 (A21708818)

Herits, E., et al., "A New Look for the White Pages," Bell Laboratories Record, June 1980 (A21709547)

Hardy, James O., et al., "Handling Coin Toll Calls – Automatically," Bell Laboratories Record, September 1980, pp. 256-262 (A21710422)

Harrar, George, "Interview: Ed Landry; Making Office Connections at John Hancock," Computerworld, April 14, 1986, p. 63 (A21708404)

Hasui, Kouya, et al., "Man-Machine Interfaces in Office Communication Systems," IEEE Communications Magazine, Volume 24, Number 7, July 1986, pp. 18-23 (A03701435)

Coover, Edwin R., "Voice-Data Integration in the Office: A PBX Approach," IEEE Communications Magazine, Volume 24, Number 7, July 1986, pp. 24-29 (A03701442)

Haszto, E. D., et al., "ALLIANCE Teleconferencing Services Boost Business Efficiency," AT&T Technology, Volume 3, Number 1, 1988 (A21724796)

Heberle, W., "Accumulation of the Signals when Using the Pushbutton Telephone for Data Entry," Proceedings of the $5^{th}$ International Symposium on Human Factors in Telecommunications, September 1970 (A21725766)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Heffron, W. G., et al., "Transaction Network Service," The Bell System Technical Journal, Volume 57, Number 10, December 1978, pp. 3331-3347 (A21725986)

Henricks, Mark, "DSC Makes Japanese Connection," Dallas-Fort Worth Business Journal, Volume 9, Number 30, March 17, 1986 (A21708347)

Hillhouse, Joseph, "PABX, the Hub: Keeping Communications on Track," Computer Decisions, Volume 16, November 15, 1984, p. 84 (A21708974)

Hindlin, Eric, "PBXs Becoming Practical Alternative to LANs," PC Week, Volume 4, March 17, 1987, p. C16 (A21707870)

Hird, E. V., "Party Line Cost Cutters," Telephone Engineer & Management, Volume 90, May 1, 1986, p. 51 (A21708442)

Hollitz, John, "Giving Information without Human Intervention," The Business Journal – Sacramento, Volume 3, Number 26, Section 1, September 29, 1986, p. 25 (A21706505)

"Home Shopping Network Halts Talks," The Washington Post, February 19, 1987 (A21707804)

"The HORIZON Call Management System Tackles High Call Volume Demands," Telecommunications Product Review, January 1983 (A21724553)

Horton, L. A., et al., "AT&T Systems Link the University of Maryland," AT&T Technology, Volume 7, Number 2, 1992 (A21712897) repeated (A21725512)

Horwitt, Elisabeth, "AT&T Enchancements Fill Gaps in System 75 Digital PBX," Computerworld, June 16, 1986 (A21708505)

Horwitt, Elisabeth, "Rolm to Unveil Low-End PBX: Digital System Bucks Feature-Rich Trend," Computerworld, June 2, 1986, p. 8 (A21708489)

Howitt, Doran, "Boom For Voice Mail Systems," InfoWorld, October 29, 1984, pp. 37-38 (A21708940)

Hubbard, Thomas Leo, "Richardson: High-Tech Prosperity," Dallas Magazine, Volume 66, Number 2, February 1987 (A21707741)

Huber, K. M., et al., "Getting the Message with UMS," AT&T Technology, Volume 1, Number 1, 1986 (A21708123)

Swann, L., "Universal Operations Systems – Integrated Building Blocks," AT&T Technology, Volume 1, Number 1, 1986 (A21708141)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Hunter, John J., "Telephone Tag Alternative: Voice Messaging Unshackles Users from Traditional Telephone Limitations," Network World, July 13, 1987 (A21714278)

Hutchins, Dexter, "The Legal Battles Over Voice Messaging," Fortune, October 28, 1985 p. 104 (A21708066)

"IBM Gives Voice to PS/2, RS/5000 Platforms," Voice Processing Newsletter, Volume 10, Number 22, August 1, 1991 (A01346371)

"IBM Introduces 2 Phone Systems," The New York Times, Date Unknown (A01346365)

"IBM, Inventor Reach Patent Agreement," The Washington Post, August 30, 1985 (A21707976)

"IBM Reaches Patent Agreement with Inventor," U.P.I., August 29, 1985 (A21707974)

"IBM-Rolm Eye CBX-SNA Link," Computerworld, January 5, 1987 (A21707572)

"IBM Says New Line of Big Computers is Faster than Promised," Wall Street Journal, Date Unknown (A01346364)

"ICA Slates Huge Meeting, Exhibit; Includes Program and List of Exhibitors," Telephone Engineer & Management, Volume 88, April 15, 1984, p. 96 (A21708657)

IEEE Transactions on Consumer Electronics, Volume CE-25, Number 3, July 1979 (A21725141)
"Index to Theses," Edited by Geoffrey M. Paterson, et al., Volume XXVI, Part 1, 1977 (A21718028)

"Industry Leaders License Katz Interactive Technology Patents," PR Newswire, September 25, 1995 (A01331383)

Press Release, Communications Daily, Volume 5, Number 126, June 28, 1985, p. 5 (A21724661)
"Inside an Internetworking Voice-Mail Processor," Data Communications, October 1986, p. 158 (A21706523)

"Integratec's Niche is Collecting on Delinquent Bank Card Accounts," American Banker, August 10, 1988, p. 22 (A21724771)

"Card Titan Sees Gold in Electronic Commerce," Financial Service Online, July 1996, p. 8 (A21724775)

"International Communications Network Service Installed by Commercial Cable," The Magazine of Bank Management, June 1984, p. 126 (A21708770)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"International Information Network Acquisition," PR Newswire, November 7, 1985 (A21708093)

"International Information Network Agreement," PR Newswire, December 16, 1985 (A21708117)

"International Information Network Announces Agreements," PR Newswire, February 12, 1986 (A21708309)

"International Information Network Contract, Article Source Unknown, February 25, 1986 (A21708312)

"International Information Network Earnings," PR Newswire, December 9, 1985 (A21708110)

"International Information Sets Financing Program," PR Newswire, October 22, 1985 (A21708064)

Press Release, Communications Daily, Volume 6, Number 41, March 3, 1986, p. 11 (A21708337) repeated (A21706387)

"Megaphone Intl Wins Calif. Lottery Contract," PR Newswire, August 4, 1986 (A21706387)

"Introducing Voice Quote," The Washington Post, October 9, 1986 (A21707805)

Press Release, Communications Daily, Volume 6, Number 189, September 30, 1986, p. 7 (A21706510)

Press Release, Communications Daily, Volume 6, Number 189, September 30, 1986 (A21706511)

Jenkins, Avery, "Iowa State Launching Campus Wide Network," PC Week, Volume 4, February 3, 1987, p. C14 (A21707767)

Jerman, Max, et al., "A CAI Program for the Home," Educational Technology, December 1971, p. 49 (A21725984)

Johnson, Eric, "Analysts Say that Voice-Message Will Talk up $1 Billion," Data Communications, January 1984, p. 50 (A21708551)

Johnson, J. W., et al., "Integrated Digital Services on the 5ESS™ System," ISS '84 Florence, May 1984, Session 14 A, Paper 3, Pages 1-8 (A21725525)

Johnston, David, "'Pay Radio' Tunes in Charities, Turns off Some Consumer Groups," Los Angeles Times, Part 6, August 24, 1986, Page 1 (A21706399)

Excerpt from Journal of Information Processing Society of Japan (in Japanese), Volume 23, 1981 (A21724246)

UNITED STATES PATENT AND TRADEMARK OFFICE
CERTIFICATE OF CORRECTION

PATENT NO.    : 6,335,965 B1
DATED         : January 1, 2002
INVENTOR(S)   : Ronald A. Katz It is certified that error appears in the above-identified patent and that said Letters Patent is hereby corrected as shown below:

Item [56], References Cited, OTHER PUBLICATIONS, cont'd,

Excerpt from Journal of the Institute of Electronics and Communication Engineers of Japan (in Japanese), Volume 60, Number 10, 1977 (A21725080)

Kaplan, Jeffrey M., "4th Generation Lacking," Network World, October 6, 1986, p. 38 (A21706646)

Kaplan, Jeff, "The Uncertain Future of Centrex," Network World, March 14, 1984, p. 17 (A21708640)

Karpinski, Richard, "IBM Offers Voice Processing Line," Telephony, August 5, 1991 (A01346377)

"Katz Scratch Fever," Telemedia News and Views, Date Unknown (A01331216)

Katzel, Jeanine, "Selecting and Installing a Plant PBX System," Plant Engineering, Volume 37, March 3, 1983 (A21713341)

Kawakami, Tokuhiro, et al., "Speaker Independent Speech Recognition and Audio Response System and Facsimile Response System," NEC Technical Journal, Volume 39, Number 7, 1986, pp. 54-79 (A21708159)

Kelleher, Joanne, "Users; Mastering DEC," Computerworld Extra!, September 24, 1986, p. 61 (A21706475)

Kemezis, Paul, "The Shared Tenant-Services Debacle and Lessons from it" Data Communications, September 1986, p. 94 (A21706444)

Koike, H., et al., "An Office-Use Voice Storage System with Elaborate User's Operativity," Proceedings of the Tenth International Symposium on Human Factors in Telecommunications, June 1983, pp. 197-203 (A21725793)

Koike, Tsunehiko, et al., "Parcor-Type Audio Response Unit (in Japanese)," Article Source Unknown (A21724841)

"Kokusai Voicemail to Start International Voicemail Service," COMLINE Daily News Telecommunications, March 10, 1987 (A21707861)

Kolodziej, Stan, "Where is the Electronic Messaging Explosion?," Computer World, October 16, 1985, p. 21 (A21708056)

Korzeniowski, Paul, "Voice Messaging; ETS Demise Hits Rolm, Octel Users," Network World, August 4, 1986, p. 1 (A21706390)

Kylin, J. C. et al., "Benefits of Integrating Data Bases into the SPC Network," ICC '79 Conference Record, Volume 1, June 1979 (A21726001)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Lawson, Michael, "AT&T Leaves 'Super-PBX' money on the table for Northern Telecom," Data Communications, September 1987 (A21712210)

Lazarus, George, "Pepsi Also Won the Super Bowl," Chicago Tribune, January 30, 1987 (A21707647)

Lee, Linda, et al., "Meridian SL Information Services," Telesis, 1985, pp. 13-19

Leibowitz, Ed, "The Wonder Years: Intriguing ACD Trends for the 1990s," Teleconnect, Volume 8, Number 4, April 1990, p. 84 (A21712064)

Levin, David, "Private Branch Exchanges: The Best Time to Shop Might Be Right Now," Data Communications, August 1987, p. 100 (A21714315)

Lineback, J. Robert, "VMX Girds for a Fight in Market it Pioneered," Electronics, May 12, 1986 pp. 55-56 (A21708453)

Lukeson, David R., "CLASS: The Smart Local Telephone Network," Proceedings of the International Congress on Technology and Technology Exchange, October 1984, pp. 100-103 (A21725864)

"The LUMA Visual Telephone," Telecommunications Product Review, Volume 13, Number 7, July 1986 (A21706313)

Lyman, Guy C., III, "Voice Messaging Comes of Age," Speech Technology, August-September 1984, pp. 45-49 (A21724634)

Mankin, Eric, "Playing TV Telephone: New System Opens Door for Audience Participation," Electronic Media, April 24, 1989 (A01331389)

Marino, P. J., et al., "AT&T Communications ISDN Plans," IEEE, 1985, pp. 247-251 (A21723894) repeated (A21725560)

"Marubeni to Install Voice-Box-Mail System," Japan Economic Journal, March 13, 1984, p. 9 (A21708639)

Mason, G. C. W., "Use of Recorded Announcements for Guidance of Users of Telecommunications Networks," Proceedings of the Eighth International Symposium on Human Factors in Telecommunications, September 1977, pp. 257-262 (A21725784)

Massey, David K., "Voicetek Hears Sweet Success with Market Strategy," Boston Business Journal, Volume 7, Number 21, Section 1, July 20, 1987, Page 6 (A21714290)

"The Master of Trivia," The Sporting News, August 19, 1985 (A21706671)

Matheson, David, "ISDN: The Technology has Discovered its Purpose," Telemarketing, May 1990 (A40002414)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Maxemchuk, N. F., "An Experimental Speech Storage and Editing Facility," The Bell System Technical Journal, volume 59, Number 8, October 1980 (A21724241)

Mearns, Allison B., et al., "Calling Card – Don't Tell It-Dial It," Bell Laboratories Record, May-June 1982, pp. 117-119 (A21709811) repeated (A21709808)

Michaelson, Marlene, "Business, Services Use 'Dial A' Formats," Contra Costa Times, September 8, 1986 (A21707858)

Mier, Edwin E., "A Big Bonanza in Little Switches," Data Communications, June 1984, p. 68 (A21708764)

Miles, J. B., "AT&T System Upstages its FTS Rivals at Shows; The FTS 2000 Telecommunications Contract," Government Computer News, Volume 6, Number 4, February 27, 1987, p. 1 (A21707808)

Miles, J. B., "Bypass Starts to Soar; More Businesses are Avoiding the Public Phone Network as New Technologies Surface and Telecomm Costs Rise," Computer Decisions, Volume 17, November 5, 1985, p. 82 (A21708087)

Miles, J. B., "Network Control Under Control; Corporations Seeking Unified Network Management Systems May Find Hope in Several New Offerings," Computer Decisions, Volume 18, July 15, 1986, p. 70 (A21706340)

Excerpt from Modern Office Technology, July 1986 (A21706315)

Moore, Steve, "Project Management; Anatomy of a Cutover, Part 1" Network World, August 25, 1986, p. 26 (A21706408)

Moore, Steve, "Project Management; Anatomy of a Cutover, Part 2" Network World, September 1, 1986, p. 35 (A21706447)

Press Release, Data Communications, August 1984, p. 58 (A21708825)

"MTV-Networks Signs with American Express Affiliate FDR Interactive Technologies," Business Wire, March 28, 1989 (A01331393)

"NAB in the 'Big D.,'" Broadcasting, Volume 112, March 30, 1987, p. 83 (A21707892)

"National Railways' Seat Reservation System by Touch Tone Telephone," Electrical Communication Facilities, Volume 38, Number 339, 1975 (A21724984)

"Newly Formed company Assigned Several Interactive Technology Patents Following the Settlement of Multimillion Dollar Patent Lawsuit," Business Wire, October 17, 1994 (A01331386)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"New AT&T Device Made in Columbus," Columbus Citizen Journal, September 7, 1985 (A01354693)

"New Products Telecommunications," Sound & Communications, Volume 28, Number 12, April 1983, pp. 84-85 (A21713354)

"New Systems Stem Losses from Credit Card Debt; Technology Streamlines Phone Contacts," American Banker, August 10, 1988 (A21724777)

"New Voice Processing Products Mean Improved Customer Service," Article Source Unknown, (A01346357)

Newton, Harry, "AT&T Information Systems One Year Later," Office Administration and Automation, Volume 45, January 1984, p. 37 (A21708557)

Newton, Harry, "Dumb Smart Switches," Teleconnect, May 1991, pp. 14-18

Newton, Harry, et al., "Send Us Your Pre-1989 Brochures," Computer Telephony, October 1996, pp. 16-26 (A01331210)

Nishikado, Iwamasa, et al., "Voice Storage System for Centralized Extension System," Review of the Electrical Communication Laboratories, Volume 32, Number 6, 1984, pp. 1010-1018 (A21725924)

Press Release, The American Banker, October 20, 1986, p. 13 (A21706658)

"Northern-Telecom-2; (NT) Northern Telecom Announces Software Feature Package," Business Wire, February 18, 1987 (A21707802)

"No. Telecom Upgrades Digital PBX," Electronic News, Volume 30, April 30, 1984, p. 63 (A21708708)

Nowogrocki, Jim, "City, County Spend About $ 1 Million on 911," St. Louis Business Journal, Volume 6, Number 43, Section 3, August 4, 1986, p. 1C (A21706393)

"Office Automation Advances 'White Collar' Productivity," Dun's Business Month, Volume 126, March 1986, p. 59 (A21708336)

The Official Proceedings of Speech Tech '85, Media Dimensions, Inc., April 1985, Cover and General Information Pages Excerpt in Japanese, Article Reference Unknown (A21724849)

Press Release, PR Newswire, May 9, 1986 (A21708451)

Paznik, Megan Jill, "Voice Mail: Pitfalls and Promises," Administrative Management, Volume 48, March 1987, p. 16 (A21707849)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"The PBX Marketplace; Private Branch Exchanges," Administrative Management, Volume 47, January 1986, p. 45 (A21708194)

"Peek at Future of 'General Hospital'" Times-Picayune, Date Unknown (A21708536)

Pelline, Jeff, "AT&T System Links Voice to Computer," San Francisco Chronicle, September 10, 1985 (A01354691)

"Perception Technology; (PCEP) Perception Technology Announces ANI, DID Enhancements," Business Wire, February 27, 1987 (A21707811)

Petit J. C., et al., "GALAXIE: Toward Adaptive Distributed Control Systems," ISS '84 Florence, May 1984, Session 41 A, Paper 3

Petrosky, Mary, "Interactive Speech System From AT&T's Business Unit," Infoworld, Volume 7, Issue 38, September 23, 1986 (A21708029)

Pfister, George M., "The PBX: What Matters, What Doesn't," Datamation, Volume 30, August 1, 1984, p. 121 (A21708831)

Plakias, Mark, "The Katz that Ate the Canary," Telemedia News and Views, Volume 2, Number 11, November 1994 (A01331037)

Pollack, Andrew, "Audiotex: Data By Telephone," The New York Times, January 5, 1984 (A21725850)

Portantiere, Nick, "AT&T Introduces System 25 Digital PBX," Electronic News, July 7, 1986, p. 34 (A21706324)

Power of Attorney for USPA 5,109,404 Inventor Ronald A. Katz

Prell, E. M., et al., "The Changing Role of the Operator," International Switching Symposium, May 1979, pp. 697-703 (A21725933)

Prince, Terry, et al., "A Telephone for the 'Checkless' Society," Bell Laboratories Record, September 1972, pp. 249-253 (A21725647)

"Profit from Impulse Pay-Per-View," Advertisement for Science Dynamics Corporation, Telephony, July 14, 1986 (A21706337)

"Prudential Insurance Mortgage by Phone Program," PR Newswire, February 19, 1986 (A21708310) repeated (A21708311)

Pulford, Jack, "Aurora System is Built to Grow," Telephone Engineer & Management, Volume 88, August 1, 1984, p. 78 (A21708841)

Putnam, Jane, "Winners," Contra Costa Sun, August 14, 1985 (A21706705)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"Putting an End to Telephone Tag," ABA Banking Journal, February 1987, (A21707747)

Raack, G. A., et al., "Customer Control of Network Features," ISS '84 Florence, May 1984, Session 14 A, Paper 2 (A21725520) repeated (A21725717)

Raimondi, Donna, "AT&T Debuts Primary Rate for System 85," Computerworld, February 23, 1987, p. 41 (A21707806)

Rappaport, David M., "Voice Mail: Key Tool or Costly Toy," Data Communications, October 1986, p. 153 (A21706526)

"Redwood by Rolm," Telecommunications Product Review, Volume 13, Number 6, June 1986 (A21708487)

Rees, Norm, "Flexible Voice Response Software Speeds Development for Resellers," Speech Technology, March-April 1988, pp. 46-49

Results of Lexis Search Request for "Call Interactive," Date of search August 5, 1996 (A01331399)

Rice, Valerie, "AT&T Enters Speech-Processing Business, Names First Customers," Investor's Daily, September 10, 1985 (A01354684)

Riederer, S. A., "Conversant VIS Means Business," AT&T Technology, Volume 5, Number 4 (A21711986)

Rangnekar, S., et al., "AT&T Voice Mail Service," AT&T Technology, Volume 5, Number 4 (A21711992)

"Ring System; Provides District of Columbia with Automatic Number and Location Identification to Aid in Emergency Services Response," Business Wire, August 7, 1986 (A21706396)

Press Release, PR Newswire, March 3, 1986 (A21708338)

Rippeteau, Jane, "'Smart' Way to Get Message Across," Financial Times, June 12, 1986 (A21708502)

Rogers, Thomas, et al., "Scouting – A Worthwhile Trivial Pursuit," The New York Times, August 9, 1985 (A21707968)

"Rolm-Corp; Appoints Harvey and Zalisk as Vice President," Business Wire, May 21, 1986 (A21708472)

"Rolm-corp; Introduces Redwood for Branch Offices and Small Businesses," Business Wire, June 2, 1986 (A21708491)

"Rolm; Links PhoneMail to IBM VM Host," Business Wire, May 5, 1986 (A21708447)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"Rolm Releases Four-Channel Phonemail Voice Message Unit," Computerworld, January 28, 1985

"Rolm; Rolm Announces PhoneMail Network," Business Wire, February 9, 1987 (A21707775)

"Rolm; Rolm Awarded Major contract by Columbia University," Business Wire, March 2, 1987 (A21707855)

"Rolm; Rolm CBX II 9000AE Offers Abundant System Power for Applications Growth," Business Wire, February 3, 1987 (A21707765)

"Rolm; 15-Node Rolm System to be Installed at University of Rochester," Business Wire, November 11, 1985 (A21708096)

Roman, David R., "Building Up Your Personal Computer; Part II: Data-Input Devices," Computer Decisions, Volume 16, March 1984, p. 110 (A21708630)

Rosenbaum, Art, "This 'Maniac' Spreads His Loot Around," San Francisco Chronicle, July 24, 1986 (A21706875)

Rosinski, R. R., "Uses of AT&T Speech Processing Technology," AT&T Technology, Volume 5, Number 4, Date Unknown, pp. 4-5 (A21723940)

Ruhl, H. W., et al., "Sprein – A Voice I/O Mail Order System with Telephone Access," Article Source Unknown Salter, Stephanie, "When the 'Say Hey Kid' Met the 'Say How' Bunch," San Francisco Examiner, Date Unknown (A21706704)

Sanger, David E., "A Driving Force Leaves Rolm," The New York Times, January 15, 1986 (A21708200)

Press Release, PR Newswire, September 17, 1985 (A21708022)

Schindler, Paul E., Jr., "AT&T Talking up Conversant 1 Unit," Information Week, September 16, 1985 (A21723912)

Schinke, David, "Speaker Independent Recognition Applied to Telephone Access Information Systems," Speech Tech '86, 1986 (A21718178)

Schulman, Henry, "AT&T Device: Talk to Computer By Phone," The Oakland Tribune, September 10, 1985 (A01354685)

Schumaker, Robert M., Jr., "Phone-Based Interfaces: Research and Guidelines," Proceedings of the Human Factors Society 36th Annual Meeting, 1992, pp. 1051-1055

Schwartz, Jeffrey, "IBM Enhances Voice Processing," Article Source Unknown (A01346375)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Schwartz, P., et al., "JISTEL 500 – Time Division Exchange Including Voice and Data with Voice Messaging," ISS '84 Florence, May 1984, Session 21 A, Paper 6, pp. 1-4

Scully, Sharon, "Product News; Saturn PBX Revamped," Network World, May 19, 1986, p. 4 (A21708470)

Seaman, John, "Voice Mail: Is Anybody Listening?," Computer Decisions, Volume 16, May 1984, p. 174 (A21708731)

"Select List of Telecommunications Providers," The Magazine of Bank Management," August 1986, p. 32 (A21706373)

Semilof, Margie, "High-End Voice/Data PBXs: Voicing Doubts about Data," Network World, March 31, 1986, p. 65 (A21708354)

"Senate Panel Meets Today; C&P Objects to House Decision Awarding Telephone Contract to AT&T-IS," Communications Daily, Volume 5, Number 238, December 10, 1985, p. 4 (A21708112)

Session Number 13 – Contemporary Developments in Addressability and Pay-Per-View, Pay-Per-View Conference, April 28, 1985, p. 21 (A21707196)

Sharma, Ranjana, "PBX Users Benefit from Vitality of ACD Market," Network World, October 17, 1988 (A21712686)

Shaw, Peter, "The Need for BT's Managed Information Services," British Telecommunications Engineering, Volume 11, April 1992, pp. 2-6

Shepherd, John, et al., "Managed Recorded Information Services – An Overview," British Telecommunications Engineering, Volume 11, April 1992, pp. 7-13

Shimizu, Hiroshi, "Advanced Credit Call Service," Japan Telecommunications Review, October 1986, pp. 247-250

Press Release, PR Newswire, December 5, 1985 (A21708108)

Siragusa, Gail, "Voice Mail Takes Off: Send and Receive Messages by Phone," Administrative Management, Volume 47, April 1986, p. 43 (A21708393)

"Small Company Initial Public Offerings: December 1983," Goldhirsch Group, Inc., March 1984, p. 138 (A21708624)

Smith, Tom, "Production Use of ISDN Lives up to Expectations," Network World, February 26, 1990 (A21712004)

Snow, Stephen A., "Consumers Show Strong Preference for Automated Telephone Call Processing," Business Wire, October 19, 1988 (A21724781)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"AT&T to Offer New Service," Reuter Newswire, November 21, 1988 (A21724788)

"Soap Opera Updates Now Available in Area," Contra Costa Times/TV, May 28, 1984, p. 4 (A21708748)

"Something for Everyone at NAB's Equipment Exhibition," Broadcasting, Volume 112, March 23, 1987, p. 63 (A21707873)

Song, D, et al., "System 12 Line and Trunk Testing," ISS Florence, May 1984, Session 32 A, Paper 5, Page 1

"Special Information Tones Provide Computer with Vital Call Data," Bell Laboratories Record, November 1981 (A21710768)

Staehler, R. E., "Toward a More Automated Network – TSPS Enhancements Lead the Way," Telephony, February 8, 1982, pp. 45-48 (A21725941)

"The Stamp of Approval for Voicemail," Article Source Unknown, (A21707760)

Stern, Aimee, "Cable Operators Fight Back; Pay-Per-View TV," Dun's Business Month, Volume 129, February 1987 (A21707748)

Stewart, Alan, "Signaling Changes for Interconnects; NATA 86 Trade Show," Telephone Engineer and Management," Volume 90, December 15, 1986, p. 72 (A21707569)

Stix, Gary, "Many Bands = Light Work," Computer Decisions, Volume 17, September 10, 1985, p. 92 (A21708015)

Press Release, Communications Daily, Volume 5, Number 148, July 31, 1985, p. 7 (A21708033) repeated (A21724666)

"International Information Network Earnings," PR Newswire, September 30, 1985 (A21708033) repeated (A21724666)

"International Information Sets Financing Program," PR Newswire, October 22, 1985 (A21708034) repeated (A21724667)

Stoffels, Bob, "REA Takes its Show on the Road: Engineering and Management Seminars," Telephone Engineer & Management, Volume 88, May 15, 1984, p. 129 (A21708746)

"Strike Three," S. F. Progress, August 7, 1985 (A21706708)

Strom, David, "Telephone or MIS Managers: Who Flips the PBX Switch; Management and Use of New Communications Technology; Connectivity – Focus on LANs," PC Week, Volume 4, February 17, 1987, p. C1 (A21707798)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Sullivan, Linda, "Ameritech Services Signs Leading National Information Provider as a Master Dealer," Business Wire, September 25, 1989 (A21724794)

Susca, Paul, "Telemarketing: Reach Out and Sell Someone," Network World, May 4, 1987 (A21714122)

Swan, Gary E., "Gift to Kids Wasted if Ballplayers Strike," San Francisco Chronicle, Date Unknown (A21706673)

"System 85 Voice Messaging Due in '85," Data Communications, December 1984, p. 204 (A21709005)

Tagg, Ed, "Automating Operator-Assisted Calls Using Voice Recognition," Speech Technology, March-April 1988, pp. 22-25

Takahashi, Y., "Technique to Use Chinese Letters for the On-Line System in Marketing Business," Packaging Technology, Volume 19, Number 11, 1981 (A21724264)

Talmadge, Candace, "MetroCal Dumps Richards for K-C," Adweek, January 5, 1987 (A21707728)

"Tech Deals," Phillips Business Information, Volume 7, Number 120, June 25, 1996 (A01331382)

Telecommunication Technology, Volume 4, Number 4, April 1986, p. 68 (A21724070)

"'Teleguide' Network Gives Tourists the Answers," ComputerData, April 1983 (A21724569)

"Telephone Service Offers the Latest News on the Soaps," Augusta, GA Chronicle-Herald, July 28, 1984 (A21724626)

Telephony, September 29, 1980 (A21716447)

"Test Your Baseball I. Q. and Win Four Tickets to All-Star Workout Day," Contra Costa Times, Date Unknown (A21706787)

Tetschner, Walt, "PC-Based Voice Processing Software Tools," Speech Technology, March-April 1988, pp. 42-45

Tetschner, Walt, "The Voicetek VTK 90 Voice Computer," Speech Technology, March-April 1987, pp. 102-106

"They've Got Your Number in AT&T's first Primary-Rate Test," Data Communications, February 1988, p. 15 (A21712494)

"Toshiba Telecom Introduces Universal Instrumentation for Entire Line of Key and PBX Systems," Telecommunications Product Review, Volume 11, Number 2, February 1984 (A21708573)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"Tracking the Trucks," Network World, September 5, 1984, p. 55 (A21708897)

Excerpt from Transportation Technology (in Japanese), Volume 30, Number 7, 1975 (A21725045)

"Trivia Promo Chips Away for Frito-Lay," Advertising Age, Date Unknown (A21707650)

"Trivial Tickets," The fort Wayne Journal-Gazette, August 11, 1985 (A21706713)

"Two Firms Introduce FMS Products," Energy User News, Volume 9, August 6, 1984, p. 12 (A21708848)

Tyson, David O., "Voice Mail Technology Streamlines Bank Telephone Messaging Services," The American Banker, October 15, 1986, p. 13 (A21706655)

Upton, Molly, "No Clear Winner in War of Mails," Computerworld, May 19, 1986, p. 60 (A21708459)

Vanandel, M. A., "While You're Away, AUDIX Will Answer," AT&T Technology, Volume 3, Number 3, 1988 (A21724808)

"Vendor Support Eases GOP Costs," Computerworld, August 27, 1984 (A21708865)

"View from Silicon Valley: Silicon Valley Companies Battle for Advantage, Compatibility," Communications Daily, Volume 4, Number 90, May 8, 1984, p. 1 (A21708743)

Virzi, Robert A., "Skip and Scan Telephone Menus: User Performance as a Function of Experience," Proceedings of the Human Factors Society 36$^{th}$ Annual Meeting-1992, p. 211-215

Vizcarrondo, John, et al., "HOBIS: New Designs on Hotel Billing," Bell Laboratories Record, January 1980 (A21709392)

"VMX Announces InfoLink: New capability in Voice Messaging Arena," Business Wire, June 16, 1987 (A21714159)

"VMX/Honneywell; (VMXI) (HON) Take Voice Messaging 'Down Under' After Signing Distribution/OEM Agreement for Australia and Pacific Basin," Business Wire, September 3, 1986 (A21724699) repeated (A21706451)

"VMX, Inc. Adds Internal Revenue Service to Voice Message (SM) Users," Southwest Newswire, February 8, 1984 (A21708587)

"VMX, Inc. Announces Another Good Quarter," Southwest Newswire, August 1, 1984 (A21708846)

"VMX, Inc. Announces First Quarter Results," Southwest Newswire, October 18, 1985 (A21708063)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"VMX, Inc. Announces Landmark Approval of first Voice Message System in Japan," Southwest Newswire, June 1, 1984 (A21708776)

"VMX; (VMXI) AT&T Tops List of Seven License Agreements Granted in Third Quarter," Business Wire, September 9, 1986 (A21706457)

"VMX-Inc; (VMXI) Hosts First International Networking Seminar," Business Wire, July 18, 1986 (A21706345)

"VMX, Inc. Provides First Voice Message (SM) Systems to Three Bell Operating Companies," Southwest Newswire, December 11, 1984 (A21709007)

"VMX, Inc. Releases Audited Fiscal 1984 Financials – It was a Very Good Year," Southwest Newswire, August 7, 1984 (A21708852)

"VMX; (VMXI) Voice Messaging Leader VMX, Inc. Launches New Generation Technology with VMX(R) 5000 Series," Business Wire, October 7, 1986 (A21706650)

"VMX; (VMXI) Voice Messaging Patent-Holder VMX Inc. Moves into France after Signing Distribution Agreement with Jeumont-Schneider," Business Wire, September 15, 1986 (A21706459)

"VMX; (VMXI) VMX 5000 Series Voice Messaging System Scores High Sales During First Quarter," Business Wire, March 10, 1987 (A21707862)

Press Release, Communications Daily, Volume 4, Number 209, October 26, 1984, p. 6 (A21708939)

Press Release, Computerworld, October 7, 1985, p. 68 (A21708055)

Press Release, PR Newswire, January 18, 1984 (A21708570)

Press Release, PR Newswire, April 10, 1984 (A21708655)

Press Release, PR Newswire, October 16, 1984 (A21708935)

Press Release, PR Newswire, January 24, 1986 (A21708207)

Voice Mail Brochure, Radio-Suisse Ltd., Date Unknown (W70172)

"Voice Messaging Capability from VMX," The Magazine of Bank Management, October 1985, p. 86 (A21708037)

Voice Processing International Conference Program, July 1986 (A21723351)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Voice Processing – The New Revolution, Proceedings of the International Conference, July 1986 (A21722980)

"Voice System Tunes up Automaker's Communications," Computerworld, November 12, 1984, p. 35 (A21708972)

"Voice '92," Conference Information and Program, 1992 (W11651)

Press Release, Communications Daily, Volume 4, Number 110, June 6, 1984, p. 9 (A21708778)

"Votrax Announces Centrum 9000, Model 5," Source Unknown, October 16, 1987 (A21724763)

Waite, Andrew J., "Applying IVR Systems," Inbound/Outbound, September 1988, pp. 30-39 (A21725733)

Walker, Murt, "CCS7 Offers New Paths to Revenue Generating Services,""AT&T Technology, Volume 6, Number 2, 1991, pp. 8-19 (A21713600)

Wallace, Bob, "All Voice Systems Are Not Alike," Network World, September 14, 1987 (A21712240)

Wallace, Bob, "Comnet '87; AT&T Announces ISDN Interface for System 85," February 16, 1987 (A21707796)

Walters, R. E., et al., "Voice Processing Systems in British Telecom," British Telecommunications Engineering, Volume 9, July 1990, pp. 88-97

Warner, Edward, "Bank's Speech Synthesizers Greet Financiers' Calls with Daily Balance," Computerworld, October 22, 1984, p. 6 (A21708937)

Watt, Peggy, "Local Phone Companies Eyeing Market for Voice Mail Services," Computerworld, March 24, 1986, p. 23 (A21708350)

Watt, Peggy, "Republicans Ready for High-Tech: GOP Convention will Feature Voice Message System," InfoWorld, August 27, 1984 (A21708862)

Weinstein, Bob, "Stock Exchange Gets News by Phone," Inbound/Outbound, October 1988, pp. 39-46 (A21725744)

Weinstein, Bob, "Stopping the Broker's Bottleneck," Inbound/Outbound, November 1988, pp. 22-23 (A21725753)

West Interactive Settles with FDR: Patent Suit Settlement Could Have major Industry Impact," Enterprise Communications, November 1994 (A01331040)

Whalen, Bernie, "Marketers Expand Applications of Dial-It 900 Technology," Marketing News, November 26, 1982 (A21725861)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

"What's An 'Automated' Attendant," Inbound/Outbound, July 1989, pp. 40-42 (A21724789)

"Whether to Answer the Phone," The Washington Post, December 7, 1986 (A21707563)

Whitten, W. B., "Advanced Interfaces Speed Delivery of Services," AT&T Technologies, Volume 2, Number 3 (A21707593)

"Who Switches Data Along with Voice? PBX Users, Increasingly," Data Communications, February 1987, p. 77 (A21707751)

Wilpon, Jay G., et al., "Speech Recognition: From the Laboratory to the Real World," AT&T Technical Journal, September-October 1990, pp. 14-24 (A21723481)

Wise, Deborah C. "This Computer Even Deciphers Noo Yawk Talk," Business Week, September 23, 1985, pp. 40-42 (A01354687)

Witten, Ian H., "Making Computers Talk: An Introduction to Speech Synthesis," Prentice-Hall, 1986 (A21708148)

Wolfe, R. M., et al., "Telecommunications Data Base Application with the 3B™20 Processor," ISS '84 Florence, May 1984, Session 22 A, Paper 2 (A21725518)

Wollenberg, Skip, "American Express Affiliate Plans Interactive Phone Service," The Associated Press, January 19, 1989 (A01331396)

Wong, Stephanie Lam, "Just a Phone Call Away," San Francisco Chronicle, Date Unknown (A21707649)

Wood, Lamont, "Stretching the Workday; Corporate Users Find that Voice Mail Saves them Time in Transmitting Important Messages," Computer Decisions, Volume 18, December 2, 1986, p. 44 (A21707561)

Wood, Lamont, "Will New Alliances Forge Better Links? Private Branch Exchange Vendors Merge with Computer Firms," Computer Decisions, Volume 18, July 29, 1986, p. 40 (A21706353)

Worrall, D. P., "New Custom Calling Services," The Bell System Technical Journal, Volume 61, Number 5, May-June 1982 pp. 821-839 (A21725897)

"Worthwhile Trivia," The New York Times, Date Unknown (A21706711)

"Yes! Songs For You," Advertisement, Source Unknown (W73764)

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Item [56], References Cited, OTHER PUBLICATIONS, cont'd,

Youngs, E. A., "The Changing Role of Human Factors Work Supporting New Telecommunications Products and Service," Proceedings of the Tenth International Symposium on Human Factors in Telecommunications, June 1983 (A21725809)

Youngs, E. A., "Effects of Automating Operator Services on Customers and Operators," Proceedings of the Eighth International Symposium on Human Factors in Telecommunications," September 1977, pp. 251-255 (A21725776)

"Zenith; Centel Plans Zenith Phonevision Pay-Per-View Cable TV System," Business Wire, December 5, 1985 (A21708105)

Zeno, Charlie, "Trivia Buff's Special Party for 678 Kids," Contra Costa Times, Date Unknown (A21706788)

Zuckerman, Steve, "Ogilvy & Mather/Dallas Looks for Partner to Go After Bigger Accounts," Dallas Business Courier, Volume 2, Number 21, Section 1, September 8, 1986, p. 12 (A21706454)

Column 1,
Line 5, "May 5, 1991" should be -- April 5, 1991 --.

Column 8,
Line 52, delete the period after "digital data".
Line 53, "the accommodation" should be -- The accommodation --.

Column 12,
Line 19, before "customer's" delete "is".

Column 15,
Line 63, after "step" insert -- of: -- and paragraph break.

Column 16,
Line 22, "signal" should be -- signals --.

Column 18,
Line 30, delete comma after "wherein said".

UNITED STATES PATENT AND TRADEMARK OFFICE
CERTIFICATE OF CORRECTION

PATENT NO.    : 6,335,965 B1
DATED         : January 1, 2002
INVENTOR(S)   : Ronald A. Katz It is certified that error appears in the above-identified patent and that said Letters Patent is hereby corrected as shown below:

Column 19,
Line 8, before "card" insert -- credit --.
Line 45, "wit" should be -- wit --.

Column 21,
Line 25, "or" should be -- and --.

Column 22,
Line 52, "terminal" should be -- terminals --.

Column 24,
After line 8, add the following claims:
-- 74.  A method according to claim 250, further comprising the step of:
         providing said audio signals recorded in digital format to a
       terminal via coupling means. --

Signed and Sealed this

Twenty-ninth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,335,965 B1
DATED : January 1, 2002
INVENTOR(S) : Ronald A. Katz

It is certified that error appears in the above-identified patent and that said Letters Patent is hereby corrected as shown below:

Column 22,
Line 47, change "claim 68" to -- claim 78 --.

Signed and Sealed this

Fifteenth Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,335,965 B1 Page 1 of 1
APPLICATION NO. : 08/306456
DATED : January 1, 2002
INVENTOR(S) : Ronald A. Katz It is certified that error appears in the above-identified patent and that said Letters Patent is hereby corrected as shown below:

IN THE CLAIMS:

Col. 24, after Ln. 8, add the following new claim 83:

-- 83 [74]. A method according to claim 20 [250], further comprising the step of:
providing said audio signals recorded in digital format to a terminal via a coupling means. --

Signed and Sealed this

Nineteenth Day of February, 2008

JON W. DUDAS
*Director of the United States Patent and Trademark Office*

(12) EX PARTE REEXAMINATION CERTIFICATE (8706th)
United States Patent
Katz

(10) Number: US 6,335,965 C1
(45) Certificate Issued: *Nov. 29, 2011

(54) VOICE-DATA TELEPHONIC INTERFACE CONTROL SYSTEM

(75) Inventor: Ronald A. Katz, Los Angeles, CA (US)

(73) Assignee: General Electric Capital Corporation, Atlanta, GA (US)

Reexamination Request:
No. 90/010,045, Nov. 29, 2007

Reexamination Certificate for:
| | |
|---|---|
| Patent No.: | 6,335,965 |
| Issued: | Jan. 1, 2002 |
| Appl. No.: | 08/306,456 |
| Filed: | Sep. 14, 1994 |

(*) Notice: This patent is subject to a terminal disclaimer.

Certificate of Correction issued Apr. 29, 2003.

Certificate of Correction issued Mar. 15, 2005.

Certificate of Correction issued Feb. 19, 2008.

Related U.S. Application Data

(63) Continuation of application No. 08/058,452, filed on May 7, 1993, now Pat. No. 5,359,645, which is a continuation-in-part of application No. 07/481,403, filed on Feb. 20, 1990, now Pat. No. 5,014,298, which is a continuation-in-part of application No. 07/312,792, filed on Feb. 21, 1989, now Pat. No. 5,073,929, which is a continuation-in-part of application No. 07/194,258, filed on May 16, 1988, now Pat. No. 4,845, 739, which is a continuation-in-part of application No. 07/018,244, filed on Feb. 24, 1987, now Pat. No. 4,792,968, which is a continuation-in-part of application No. 06/753, 299, filed on Jul. 10, 1985, now abandoned.

(51) Int. Cl.
| | |
|---|---|
| *H04M 3/50* | (2006.01) |
| *H04M 3/487* | (2006.01) |
| *H04M 3/42* | (2006.01) |
| *H04M 3/36* | (2006.01) |
| *H04M 3/38* | (2006.01) |
| *H04M 3/436* | (2006.01) |
| *H04M 3/46* | (2006.01) |
| *G07C 11/00* | (2006.01) |
| *G07C 15/00* | (2006.01) |
| *A63F 3/08* | (2006.01) |
| *H04M 3/493* | (2006.01) |
| *H04M 3/51* | (2006.01) |
| *H04M 11/00* | (2006.01) |
| *H04Q 3/00* | (2006.01) |
| *H04Q 3/545* | (2006.01) |
| *H04Q 3/66* | (2006.01) |
| *H04Q 3/72* | (2006.01) |
| *H04Q 3/74* | (2006.01) |
| *H04Q 3/64* | (2006.01) |

(52) U.S. Cl. ............... 379/93.12; 379/88.16; 379/88.21; 379/114.19; 379/142.04; 379/142.15

(58) Field of Classification Search ........................ None
See application file for complete search history.

(56) References Cited

To view the complete listing of prior art documents cited during the proceeding for Reexamination Control Number 90/010,045, please refer to the USPTO's public Patent Application Information Retrieval (PAIR) system under the Display References tab.

*Primary Examiner* — James Menefee

(57) ABSTRACT

In an audio-digital telephone interface system, selective operation prompts a caller with oral instructions to provide: digital control signals, digital data signals (numeric) or audio signals. Inbound and outbound operations are involved and inbound callers are qualified as by automatic number identification (ANI) signals and consumable key operation. A data cell is loaded in accordance with an operating program and the resulting data packet is flagged depending on the presence of audio signals. Data packets are returned to storage, as for subsequent addressing to call up, as to process or cue a caller. The illustrative format receives and organizes order data for goods or services or to isolate a subset or a sub-subset, of callers.

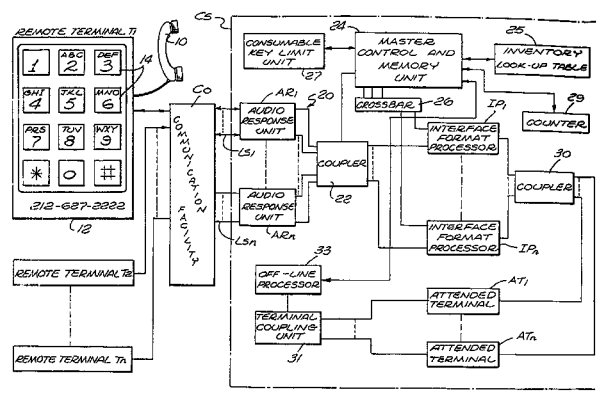

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 34, 43, 51 and 62 are cancelled.

Claims 1-33, 35-42, 44-50, 52-61 and 63-83 were not reexamined.

* * * * *